US011229022B2

(12) United States Patent
Lin et al.

(10) Patent No.: US 11,229,022 B2
(45) Date of Patent: Jan. 18, 2022

(54) DETERMINATION OF PHYSICAL DOWNLINK CONTROL CHANNEL (PDCCH) ASSIGNMENT IN POWER SAVING MODE

(71) Applicant: Samsung Electronics Co., Ltd., Suwon-si (KR)

(72) Inventors: Qiongjie Lin, Sunnyvale, CA (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 67 days.

(21) Appl. No.: 16/827,298

(22) Filed: Mar. 23, 2020

(65) Prior Publication Data

US 2020/0314811 A1    Oct. 1, 2020

Related U.S. Application Data

(60) Provisional application No. 62/823,932, filed on Mar. 26, 2019, provisional application No. 62/836,363, filed on Apr. 19, 2019, provisional application No. 62/841,488, filed on May 1, 2019, provisional application No. 62/849,258, filed on May 17, 2019, (Continued)

(51) Int. Cl.
*H04W 72/04* (2009.01)
*H04W 52/02* (2009.01)

(52) U.S. Cl.
CPC ..... *H04W 72/042* (2013.01); *H04W 52/0216* (2013.01)

(58) Field of Classification Search
CPC .......... H04W 72/042; H04W 52/0216
See application file for complete search history.

(56) References Cited

U.S. PATENT DOCUMENTS

2013/0183987 A1    7/2013  Vrzic et al.
2020/0137666 A1*  4/2020  Agiwal ............... H04W 48/10

FOREIGN PATENT DOCUMENTS

WO    2019033017 A1    2/2019

OTHER PUBLICATIONS

"3rd Generation Partnership Project; Technical Specification Group Radio Access Network; NR; Physical channels and modulation (Release 15)", 3GPP TS 38.211 V15.4.0, Dec. 2018, 96 pages.
(Continued)

*Primary Examiner* — Ronald B Abelson

(57) ABSTRACT

A user equipment (UE), a base station, and a method for receiving physical downlink control channels (PDCCHs). The UE includes a receiver and a processor and is configured to receive a configuration for one or more search space sets (SSS) for reception of PDCCHs. The UE is configured to determine a PDCCH reception occasion according to the configuration of the one or more search space sets. The PDCCH reception occasion is prior to an ON duration of a discontinuous reception (DRX) cycle after a second DRX cycle. The UE is also configured to determine an indication to either receive the PDCCHs when the PDCCH reception occasion does not overlap with an extended Active Time of the second DRX cycle or to suspend reception of the PDCCHs when the PDCCH reception occasion overlaps with the extended Active Time of the second DRX cycle. The UE is also configured to receive the PDCCHs at the PDCCH reception according to the determined indication.

20 Claims, 22 Drawing Sheets

Related U.S. Application Data provisional application No. 62/850,740, filed on May 21, 2019.

(56) References Cited

OTHER PUBLICATIONS

"3rd Generation Partnership Project; Technical Specification Group Radio Access Network; NR; Multiplexing and channel coding( Release 15)", 3GPP TS 38.212 V15.4 0, Dec. 2018, 100 pages.
"3rd Generation Partnership Project; Technical Specification Group Radio Access Network; NR; Physical layer procedures for control (Release 15)", 3GPP TS 38.213 V15.4.0, Dec. 2018, 104 pages.
"3rd Generation Partnership Project; Technical Specification Group Radio Access Network; NR; Physical layer procedures for data (Release 15)", 3GPP T 38.214 V15.4.0, Dec. 2018, 102 pages.
"3rd Generation Partnership Project; Technical Specification Group Radio Access Network; NR; Physical layer measurements (Release 15)", 3GPP TS 38.215 V15.4.0, Dec. 2018, 15 pages.
"3rd Generation Partnership Project; Technical Specification Group Radio Access Network; NR; Medium Access Control (MAC) protocol specification (Release 15)", 3GPP TS 38.321 V15.4.0, Dec. 2018, 77 pages.
"3rd Generation Partnership Project; Technical Specification Group Radio Access Network; NR; Radio Resource Control (RRC) protocol specification (Release 15)", 3GPP TS 38.331 v15.4 0, Dec. 2018, 474 pages.
"3rd Generation Partnership Project; Technical Specification Group Radio Access Network; NR; Study on UE Power Saving (Release 16)", 3GPP TR 38.840 V0.1.1, Feb. 2019, 33 pages.
Vivo, "UE adaptation to traffic and power consumption characteristics", 3GPP TSG RAN WG1 #96, Feb. 25-Mar. 1, 2019, R1-1901710, 13 pages.
Oppo, "UE Adaptation to the Traffic and UE Power Consumption", 3GPP TSG RAN WG1 #96, Feb. 25-Mar. 1, 2019, R1-1902745, 14 pages.
Catt, "UE Power saving schemes and power saving signal/channel", 3GPP TSG RAN WG1 Meeting #96, R1-1902025, 25 pages.
MediaTek Inc., "DRX Cycle adaptation for NR UE power saving", 3GPP TSG RAN WG1 Meeting AH-1901, Feb. 25-Mar. 1, 2019, R1-1901806, 14 pages.
Notification of Transmittal of the International Search Report and the Written Opinion of the International Searching Authority, or the Declaration dated Jul. 2, 2020 in connection with International Patent Application No. PCT/KR2020/004140, 9 pages.
Extended European Search Report regarding Application No. 20777192.4, dated Nov. 23, 2021, 11 pages.
Catt, "PowerSaving Signal/Channel and Related Procedures", 3GPP TSG-RAN WG2 Meeting #105, R2-1900202, Feb. 2019, 6 pages.
Samsung, "Remaining issues for PDCCH-based power saving signal/channel", 3GPP TSG RAN WG1 #99, R1-1912486, Nov. 2019, 7 pages.

* cited by examiner

DETERMINATION OF PHYSICAL DOWNLINK CONTROL CHANNEL (PDCCH) ASSIGNMENT IN POWER SAVING MODE

CROSS-REFERENCE TO RELATED APPLICATION AND CLAIM OF PRIORITY

This application claims priority under 35 U.S.C. § 119(e) to U.S. Provisional Patent Application No. 62/823,932 filed on Mar. 26, 2019, to U.S. Provisional Patent Application No. 62/836,363 filed on Apr. 19, 2019, to U.S. Provisional Patent Application No. 62/841,488 filed on May 1, 2019, to U.S. Provisional Patent Application No. 62/849,258 filed on May 17, 2019, and to U.S. Provisional Patent Application No. 62/850,740 filed on May 21, 2019. The above-identified provisional patent applications are hereby incorporated by reference in its entirety.

TECHNICAL FIELD

The present disclosure relates to a pre-5$^{th}$-Generation (5G) or 5G communication system to be provided for supporting higher data rates Beyond 4$^{th}$-Generation (4G) communication system such as Long-Term Evolution (LTE). More particularly, some embodiments of the present disclosure are directed receiving PDCCHs.

BACKGROUND

To meet the increased demand for wireless data services since the deployment of 4G communication systems, efforts have been made to develop an improved 5G or pre-5G communication system. Therefore, the 5G or pre-5G communication system is also called a "Beyond 4G Network" or a "Post LTE System". A 5G communication system can be implemented in higher frequency (mmWave) bands, e.g., 60 GHz bands, compared to a 4G communication system to provide higher data rates. To decrease a propagation loss of radio waves and increase a transmission distance, beamforming, massive multiple-input multiple-output (MIMO), Full Dimensional MIMO (FD-MIMO), array antenna, analog beamforming, and large-scale antenna techniques are considered in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SUMMARY

Embodiments of the present disclosure include a user equipment (UE) and a base station (BS) for receiving physical downlink control channels (PDCCHs). One embodiment is directed to a UE that includes a receiver configured to receive a configuration for one or more search space sets for reception of PDCCHs. The UE also includes a processor operably connected to the receiver, the processor configured to determine a PDCCH reception occasion according to the configuration of the one or more search space sets. The PDCCH reception occasion is prior to an ON duration of a discontinuous reception (DRX) cycle that is after a second DRX cycle. The processor is also configured to determine an indication to either receive the PDCCHs when the PDCCH reception occasion does not overlap with an extended Active Time of the second DRX cycle or to suspend reception of the PDCCHs when the PDCCH reception occasion overlaps with the extended Active Time of the second DRX cycle. The processor is also configured to provide the determined indication to the receiver. Additionally, the receiver is also configured to receive the PDCCHs at the PDCCH reception occasion according to the determined indication.

Another embodiment is directed to a base station that includes a transmitter configured to transmit a configuration for one or more search space sets for transmission of PDCCHs. The base station also includes a processor operably connected to the transmitter, the processor configured to determine a PDCCH transmission occasion according to the configuration of the one or more search space sets. The PDCCH transmission occasion is prior to an ON duration of a discontinuous reception (DRX) cycle that is after a second DRX cycle. The processor is also configured to determine an indication to either transmit the PDCCHs when the PDCCH reception occasion does not overlap with an extended Active Time of the second DRX cycle or to suspend transmission of the PDCCHs when the PDCCH reception occasion overlaps with the extended Active Time of the second DRX cycle. The processor is also configured to provide the determined indication to the transmitter. Additionally, the transmitter is also configured to transmit the PDCCHs at the PDCCH transmission occasion according to the determined indication.

Yet another embodiment is directed to a method for receiving PDCCHs. The method includes receiving a configuration for one or more search space sets for reception of the PDCCHs. The method also includes determining a PDCCH reception occasion according to the configuration of the one or more search space sets. The PDCCH reception occasion is prior to an ON duration of a discontinuous reception (DRX) cycle that is after a second DRX cycle. The method also includes determining an indication to either receive the PDCCHs when the PDCCH reception occasion does not overlap with an extended Active Time of the second DRX cycle or to suspend reception of the PDCCHs when the PDCCH reception occasion overlaps with the extended Active Time of the second DRX cycle. The method also includes providing the determined indication to the receiver, and receiving the PDCCHs at the PDCCH reception occasion according to the determined indication.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
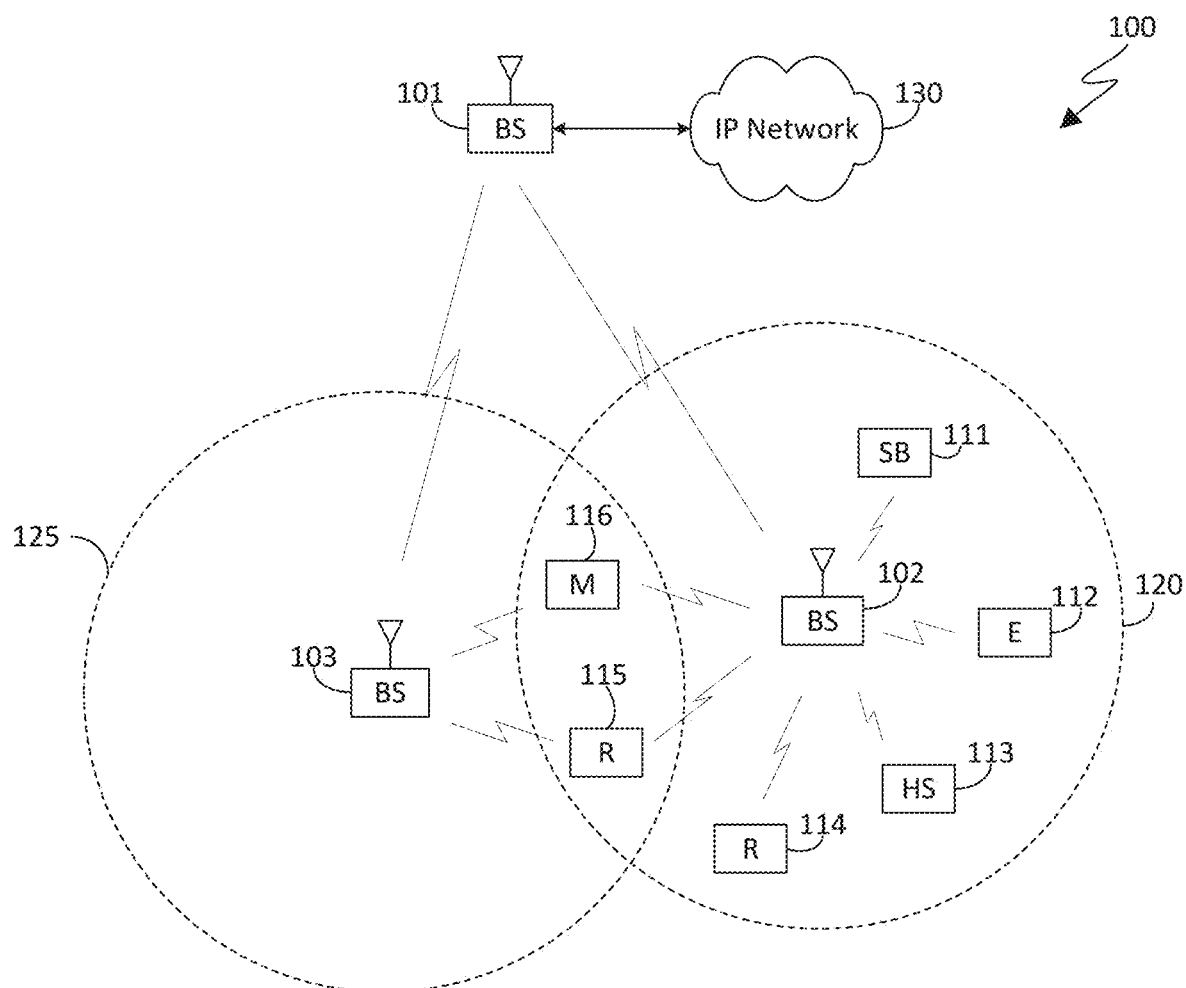
FIG. 1 illustrates an exemplary wireless communication network according to various embodiments of this disclosure.

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

The following documents are hereby incorporated by reference into the present disclosure as if fully set forth herein: 3GPP TS 38.211 v15.4.0, "NR; Physical channels and modulation", hereinafter "REF 1"; 3GPP TS 38.212 v15.4.0, "NR; Multiplexing and channel coding", hereinafter "REF 2"; 3GPP TS 38.213 v15.4.0, "NR; Physical layer procedures for control", hereinafter "REF 3"; 3GPP TS 38.214 v15.4.0, "NR; Physical layer procedures for data", hereinafter "REF 4"; 3GPP TS 38.215 v15.4.0, "NR; Physical layer measurements", hereinafter "REF 5"; 3GPP TS 38.321 v15.4.0, "NR; Medium Access Control (MAC) protocol specification", hereinafter "REF 6"; 3GPP TS 38.331 v15.4.0, "NR; Radio Resource Control (RRC) protocol specification", hereinafter "REF 7"; and 3GPP TR 38.840 v0.1.1, "NRl Study on UE power Saving", hereinafter "REF 8".

A time unit for downlink (DL) signaling or for uplink (UL) signaling on a cell can include one or more symbols of a slot that includes a predetermined number of symbols, such as 14 symbols, and has predetermined duration. A bandwidth (BW) unit is referred to as a resource block (RB). One RB includes a number of sub-carriers (SCs) and one SC in one symbol of a slot is referred to as resource element (RE). In one example, a slot can have duration of 1 millisecond and an RB can have a bandwidth of 180 KHz when the RB includes 12 SCs with inter-SC spacing of 15 KHz. In another example, a slot can have duration of 0.25 milliseconds and an RB can have a bandwidth of 720 KHz when the RB includes 12 SCs with inter-SC spacing of 60 KHz. A slot can include symbols used for DL transmissions or for UL transmissions including all symbols being used for DL transmissions or all symbols being used for UL transmissions. For more detail, refer to REF 1.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A gNB transmits one or more of multiple types of RSs including channel state information RS (CSI-RS) and demodulation RS (DMRS), as discussed in more detail in REF 1. A CSI-RS is primarily intended for UEs to perform measurements and provide channel state information (CSI) to a gNB. A DMRS is received only in the BW of a respective PDCCH or PDSCH reception and a UE typically uses the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access (as discussed in more detail in REF 1). A UE transmits data information or UCI through a respective physical UL shared channel (PUSCH) or a physical UL control channel (PUCCH). When a UE simultaneously transmits data information and UCI, the UE can multiplex both in a PUSCH. UCI includes hybrid automatic repeat request acknowledgement (HARQ-ACK) information, indicating correct or incorrect detection of transport blocks (TBs) with data information in a PDSCH, scheduling request (SR) indicating whether a UE has data to transmit in its buffer, and CSI reports enabling a gNB to select appropriate parameters for PDSCH or PDCCH transmissions to a UE (as discussed in more detail in REF 4).

UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, also DL CSI. Additionally, in order to establish synchronization or an initial RRC connection with a gNB, a UE can transmit a physical random-access channel (PRACH), as discussed in more detail in REF 3 and REF 5. To reduce control overhead for scheduling receptions or transmission over multiple RBs, an RB group (RBG) can be used as a unit for PDSCH receptions or PUSCH transmissions where an RBG includes a predetermined number of RBs (see also REF 2 and REF 4).

Figure 5:
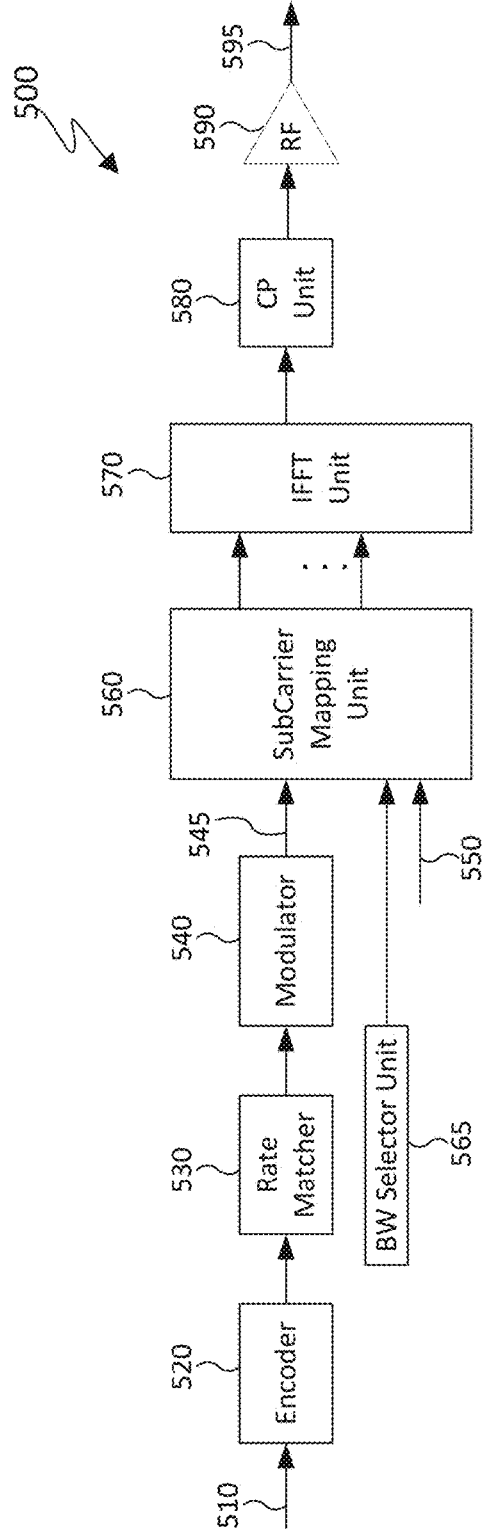
FIG. 5 illustrates an exemplary transmitter according to various embodiments of this disclosure.
Figure 6:
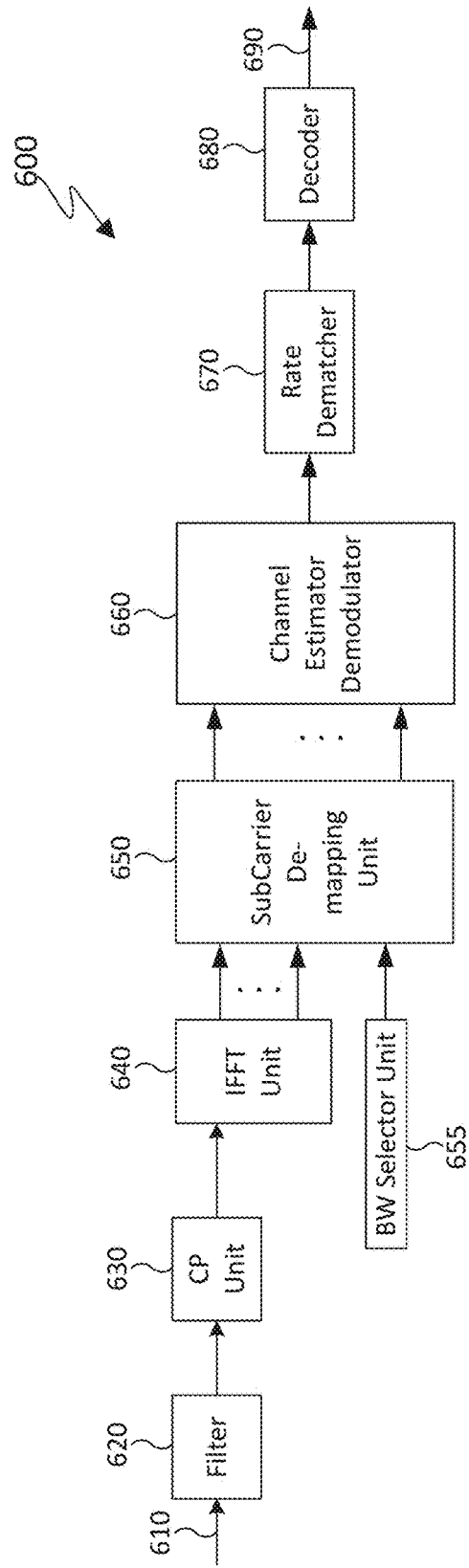
FIG. 6 illustrates an exemplary receiver according to various embodiments of this disclosure.

DL transmissions or UL transmissions can be based on an orthogonal frequency division multiplexing (OFDM) waveform including a variant using DFT precoding that is known as DFT-spread-OFDM, as discussed in more detail in REF 1. Exemplary transmitters and receivers using OFDM are depicted in FIGS. 5 and 6 that follow.

A UE typically monitors multiple candidate locations for respective potential PDCCH receptions to decode one or more DCI formats in a slot, for example as described in REF 3. A DCI format includes cyclic redundancy check (CRC) bits in order for the UE to confirm a correct detection of the DCI format. A DCI format type is identified by a radio network temporary identifier (RNTI) that scrambles the CRC bits, as described in REF 2. For a DCI format scheduling a PDSCH or a PUSCH to a single UE, the RNTI can be a cell RNTI (C-RNTI) and serve as a UE identifier. For a DCI format scheduling a PDSCH conveying system information (SI), the RNTI can be a SI-RNTI. For a DCI format scheduling a PDSCH providing a random-access response (RAR), the RNTI can be a RA-RNTI. For a DCI format providing transmit power control (TPC) commands to a group of UEs, the RNTI can be a TPC-RNTI. Each RNTI type can be configured to a UE through higher layer signaling such as RRC signaling, as discussed in REF 5. A DCI format scheduling PDSCH transmission to a UE is also referred to as DL DCI format or DL assignment while a DCI format scheduling PUSCH transmission from a UE is also referred to as UL DCI format or UL grant.

A PDCCH transmission can be within a set of PRBs. A gNB can configure a UE with one or more sets of PRB sets, also referred to as control resource sets (CORESETs), for PDCCH receptions (see also REF 3). A PDCCH transmission can be in control channel elements (CCEs) of a CORE- SET. A UE determines CCEs for a PDCCH reception based on a search space set (see also REF 3). A set of CCEs that can be used for PDCCH reception by a UE define a PDCCH candidate location.

An exemplary encoding process and decoding process for a DCI format is discussed in FIGS. 7 and 8 below.

For each DL bandwidth part (BWP) configured to a UE in a serving cell, the UE can be provided by higher layer signaling a number of CORESETs. For each CORESET, the UE can be provided:

a CORESET index, p;
a DM-RS scrambling sequence initialization value;
a precoder granularity for a number of REGs in frequency where the UE can assume use of a same DM-RS precoder;
a number of consecutive symbols;
a set of resource blocks;
CCE-to-REG mapping parameters;
an antenna port quasi co-location, from a set of antenna port quasi co-locations, indicating quasi co-location information of the DM-RS antenna port for PDCCH reception; and
an indication for a presence or absence of a transmission configuration indication (TCI) field for DCI format 1_1 transmitted by a PDCCH in CORESET p. Additional detail is provided in REF 1, REF 2, and REF 3.

For each DL BWP configured to a UE in a serving cell, the UE is provided by higher layers with a number of search space sets where, for each search space set from the number search space sets, the UE is provided the following (see also REF 3):

a search space set index, s;
an association between the search space set, s, and a CORESET index, p;
a PDCCH monitoring periodicity of $k_s$ slots and a PDCCH monitoring offset of $o_s$ slots;
a PDCCH monitoring pattern within a slot, indicating first symbol(s) of the control resource set within a slot for PDCCH monitoring;
a number of PDCCH candidates, $M_s^{(L)}$, per CCE aggregation level, L;
an indication that search space set s is either a common search space set or a UE-specific search space set; and
a duration of $T_s < k_s$ slots indicating a number of slots that the search space set s exists.

For a search space set s associated with CORESET p, the CCE indexes for aggregation level L corresponding to PDCCH candidate $m_{s,n_{CI}}$ of the search space set in slot $n_{s,f}^\mu$ for a serving cell corresponding to carrier indicator field value $n_{CI}$ (also referred to as search space) are given as in Equation 1:

$$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} \right) \mod \lfloor N_{CCE,p}/L \rfloor \right\} + i \quad \text{(Equation 1)}$$

where:
for any common search space, $$Y_{p,n_{s,f}^\mu} = 0;$$

for a UE-specific search space, $$Y_{p,n_{s,f}^\mu} = \left( A_p \cdot Y_{p,n_{s,f}^\mu - 1} \right) \mod D,$$

$Y_{p,-1} = n_{RNTI} \neq 0$, $A_p = 39827$ for p mod 3=0, $A_p = 39829$ for p mod 3=1, $A_p = 39839$ for p mod 3=2 and D=65537;

i=0, . . . , L−1;

$N_{CCE,p}$ is the number of CCEs, numbered from 0 to $N_{CCE,p}-1$, in CORESET p;

$n_{CI}$ is the carrier indicator field value if the UE is configured with a carrier indicator field; otherwise, including for any common search space, $n_{CI}=0$;

$m_{s,n_{CI}}=0, \ldots, M_{p,s,n_{CI}}^{(L)}-1$, where $M_{s,n_{CI}}^{(L)}$ is the number of PDCCH candidates the UE is configured to monitor for aggregation level L for a serving cell corresponding to $n_{CI}$ and a search space set S;

for any common search space, $M_{s,max}^{(L)} = M_{s,0}^{(L)}$;

for a UE-specific search space, $M_{s,max}^{(L)}$ is the maximum of $M_{s,n_{CI}}^{(L)}$ across all configured $n_{CI}$ values for a CCE aggregation level L of search space set S in control resource set p; and the RNTI value used for $n_{RNTI}$.

Dynamic adaptation on PDCCH monitoring for a UE, such as skipping PDCCH monitoring for one or more search space sets during a period, or (de)activation of CORESETs/search space sets, and adapting PDCCH monitoring periodicity/duration, have been considered to enable UE power savings. In REF 8, various schemes for reducing PDCCH monitoring show 0.5%-85% power saving gains for a UE relative to the power required by the UE for PDCCH monitoring as previously described for Rel-15 NR. Lower power saving gains 0.5-15% occur for the continuous traffic corresponding to a full buffer for a UE. High power saving gains 50-85% were observed for sporadic traffic arrival corresponding to more typical, FTP-based, traffic patterns for a UE.

In NR Rel-15, a UE monitors PDCCH (decoded PDCCH candidates at corresponding PDCCH monitoring occasions) based on configured search space sets provided to the UE for each serving cell and activated BWP per serving cell by a serving gNB. The configuration of search space sets is provided to a UE by higher layer signaling and therefore does not allow for fast adaptation of PDCCH monitoring by the UE to address dynamic variations in the traffic patterns for the UE. A faster adaptation for PDCCH monitoring by a UE, such as one provided by a DCI format in a PDCCH or by a MAC control element, can offer material reduction in a power consumption by the UE for monitoring PDCCH by enabling/disabling decoding operations associated with PDCCH candidates in search space sets according to dynamic variations in traffic while avoiding a loss in throughput or an increase in scheduling latency that may occur when a UE is provided an insufficient number of PDCCH candidates.

Therefore, other novel aspects of this disclosure also recognize the need to enable an adaptation for PDCCH monitoring in search space sets through a signal/channel at the physical layer for UE power saving; to provide an indication for PDCCH monitoring occasions when PDCCH monitoring is adapted through a signal/channel at the physical layer for UE power saving; to determine the interpretation of a DCI format for triggering UE adaptation at least for power saving; to determine the monitoring occasion of signal/channel at physical layer for triggering UE adaptation associated with DRX operation in RRC_CONNECTED state; and to determine the monitoring occasion of signal/channel at physical layer for triggering UE adaptation without association with DRX operation in RRC_CONNECTED state.

FIG. 1 illustrates an exemplary wireless communication network 100 according to various embodiments of this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an gNodeB (gNB) 101, an gNB 102, and an gNB 103. The gNB 101 communicates with the gNB 102 and the gNB 103. The gNB 101 also communicates with at least one Internet Protocol (IP) network 130, such as the Internet, a proprietary IP network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WIFI hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116.

Depending on the network type, the term 'base station' can refer to any component (or collection of components) configured to provide wireless access to a network, such as transmit point (TP), transmit-receive point (TRP), a gNB, a macrocell, a femtocell, a WIFI access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, wireless network 100 can be a 5G communication system in which a UE, such as UE 116, can communicate with a BS, such as BS 102, to determine search space sets for receiving PDCCHs for UE power saving.

Although FIG. 1 illustrates one example of a wireless network 100, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNB 101, 102, and/or 103 could provide access to other or additional external networks, such as external telephone networks or other types of data networks.

Figure 2:
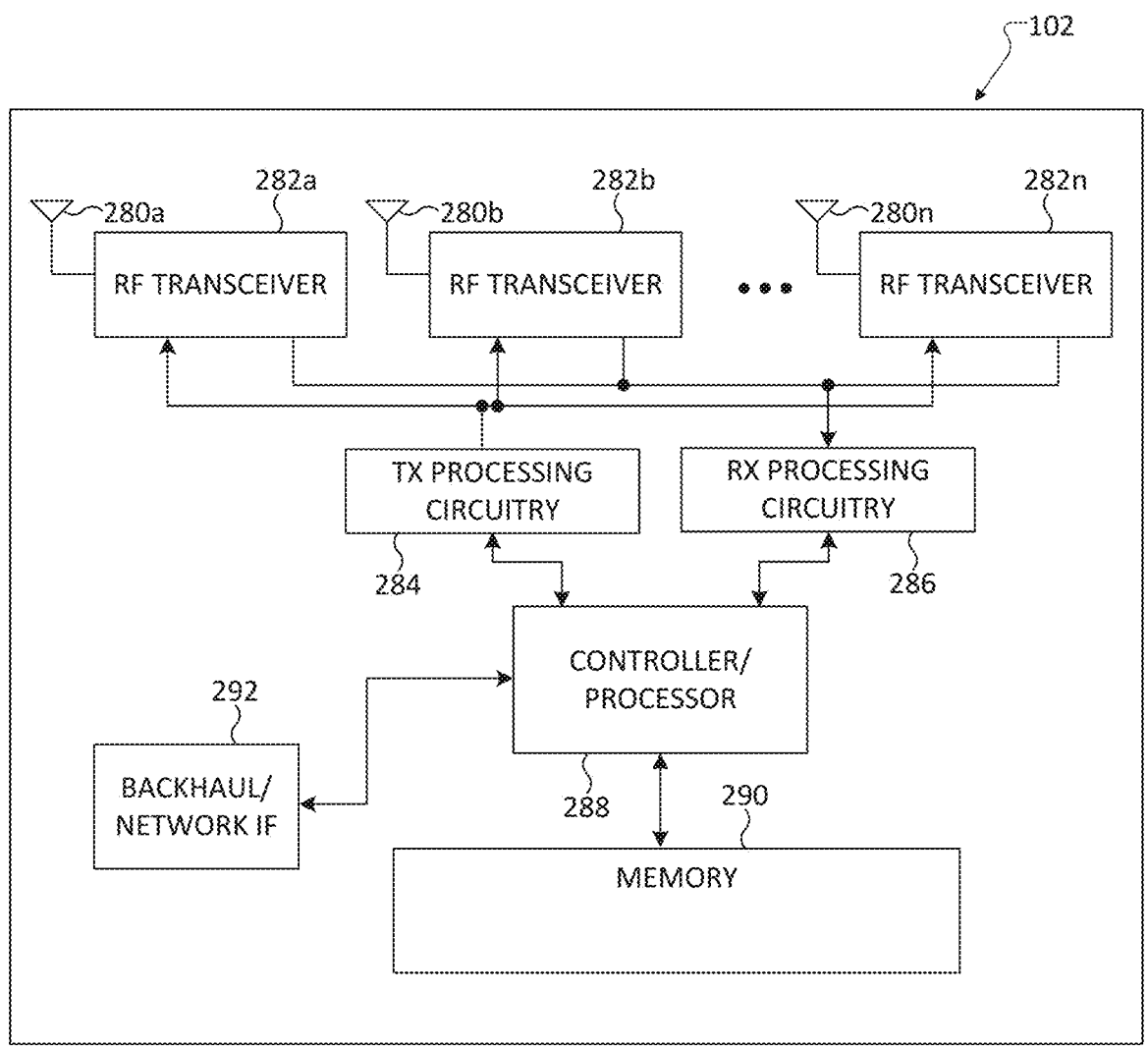
FIG. 2 illustrates an exemplary base station (BS) in the wireless communication network according to various embodiments of this disclosure.

FIG. 2 illustrates an exemplary base station (BS) according to various embodiments of this disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of an gNB.

As shown in FIG. 2, the gNB 102 includes multiple antennas 280a-280n, multiple RF transceivers 282a-282n, transmit (TX) processing circuitry 284, and receive (RX) processing circuitry 286. The gNB 102 also includes a controller/processor 288, a memory 290, and a backhaul or network interface 292.

The RF transceivers 282a-282n receive, from the antennas 280a-280n, incoming RF signals, such as signals transmitted by UEs in the network 100. The RF transceivers 282a-282n down-convert the incoming RF signals to generate IF or baseband signals. The IF or baseband signals are sent to the RX processing circuitry 286, which generates processed baseband signals by filtering, decoding, and/or digitizing the baseband or IF signals. The RX processing circuitry 286 transmits the processed baseband signals to the controller/processor 288 for further processing.

The TX processing circuitry 284 receives analog or digital data (such as voice data, web data, e-mail, or interactive video game data) from the controller/processor 288. The TX processing circuitry 284 encodes, multiplexes, and/or digitizes the outgoing baseband data to generate processed baseband or IF signals. The RF transceivers 282a-282n receive the outgoing processed baseband or IF signals from the TX processing circuitry 284 and up-converts the baseband or IF signals to RF signals that are transmitted via the antennas 280a-280n.

The controller/processor 288 can include one or more processors or other processing devices that control the overall operation of the gNB 102. For example, the controller/processor 288 could control the reception of forward channel signals and the transmission of reverse channel signals by the RF transceivers 282a-282n, the RX processing circuitry 286, and the TX processing circuitry 284 in accordance with well-known principles. The controller/processor 288 could support additional functions as well, such as more advanced wireless communication functions. For instance, the controller/processor 288 could support beam forming or directional routing operations in which outgoing signals from multiple antennas 280a-280n are weighted differently to effectively steer the outgoing signals in a desired direction. Any of a wide variety of other functions could be supported in the gNB 102 by the controller/processor 288. In some embodiments, the controller/processor 288 includes at least one microprocessor or microcontroller.

The controller/processor 288 is also capable of executing programs and other processes resident in the memory 290, such as a basic OS. The controller/processor 288 can move data into or out of the memory 290 as required by an executing process.

The controller/processor 288 is also coupled to the backhaul or network interface 292. The backhaul or network interface 292 allows the gNB 102 to communicate with other devices or systems over a backhaul connection or over a network. The interface 292 could support communications over any suitable wired or wireless connection(s). For example, when the gNB 102 is implemented as part of a cellular communication system (such as one supporting 5G, LTE, or LTE-A), the interface 292 could allow the gNB 102 to communicate with other gNBs over a wired or wireless backhaul connection. When the gNB 102 is implemented as an access point, the interface 292 could allow the gNB 102 to communicate over a wired or wireless local area network or over a wired or wireless connection to a larger network (such as the Internet). The interface 292 includes any suitable structure supporting communications over a wired or wireless connection, such as an Ethernet or RF transceiver.

The memory 290 is coupled to the controller/processor 288. Part of the memory 290 could include a RAM, and another part of the memory 290 could include a Flash memory or other ROM.

As described in more detail below, the BS 102 can communicate information to a UE, such as UE 116 in FIG. 1 over a network, to determine search space sets for receiving PDCCHs for UE power saving.

Although FIG. 2 illustrates one example of gNB 102, various changes may be made to FIG. 2. For example, the gNB 102 could include any number of each component shown in FIG. 2. As a particular example, an access point could include a number of interfaces 292, and the controller/processor 288 could support routing functions to route data between different network addresses. As another particular example, while shown as including a single instance of TX processing circuitry 284 and a single instance of RX processing circuitry 286, the gNB 102 could include multiple instances of each (such as one per RF transceiver). Also, various components in FIG. 2 could be combined, further subdivided, or omitted and additional components could be added according to particular needs.

Figure 3:
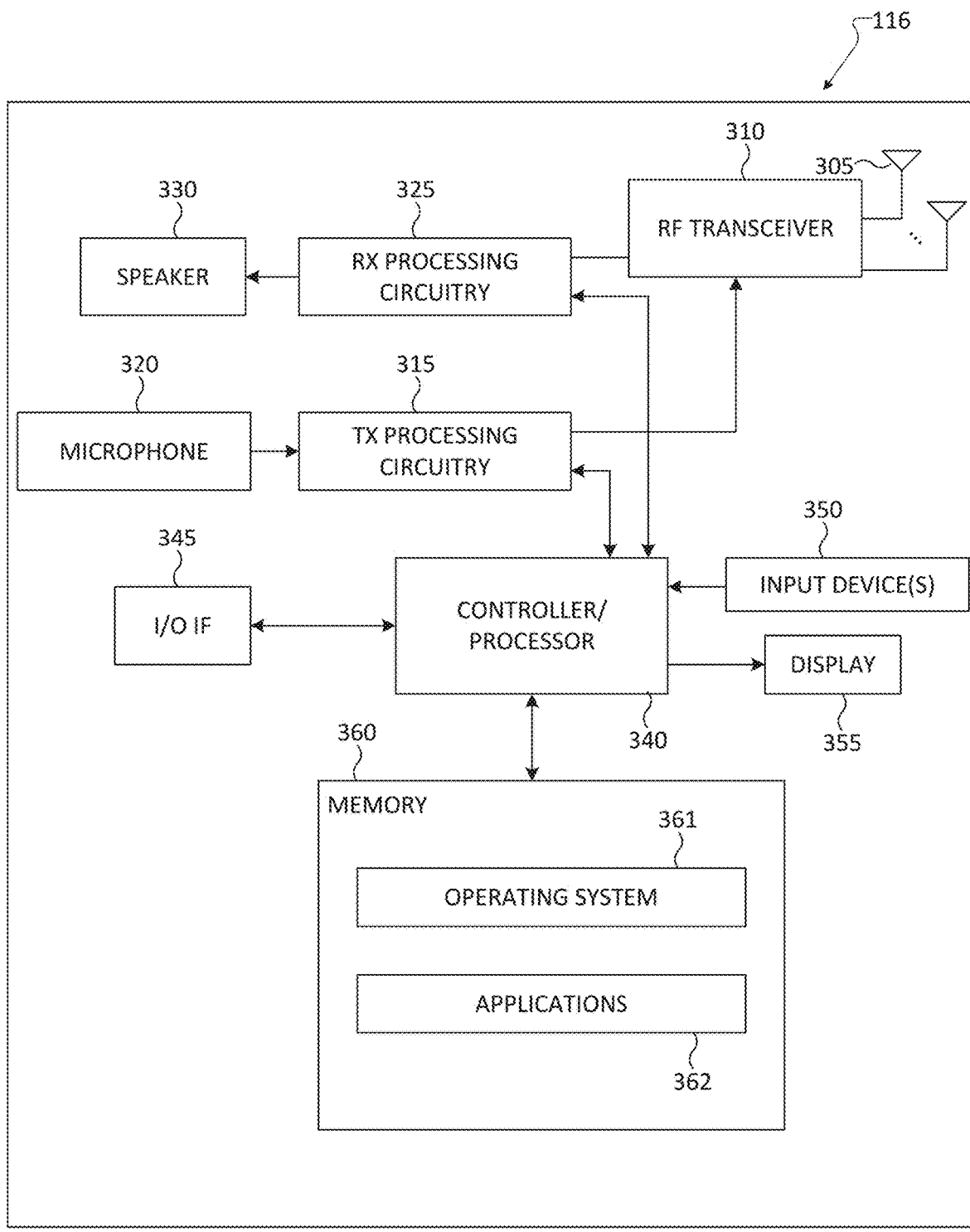
FIG. 3 illustrates an exemplary user equipment (UE) in the wireless communication network according to various embodiments of this disclosure.

FIG. 3 illustrates an exemplary user equipment (UE) according to various embodiments of this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from gNBs or an operator. The main processor 340 is also coupled to the I/O interface 345, which provides the UE 116 with the ability to connect to other devices such as laptop computers and handheld computers. The I/O interface 345 is the communication path between these accessories and the main processor 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random-access memory (RAM), and another part of the memory 360 could include a Flash memory or other read-only memory (ROM).

As described in more detail below, UE 116 can communicate with a BS, such as BS 102 in FIG. 2 over a network, to determine search space sets for receiving PDCCHs for UE power saving.

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
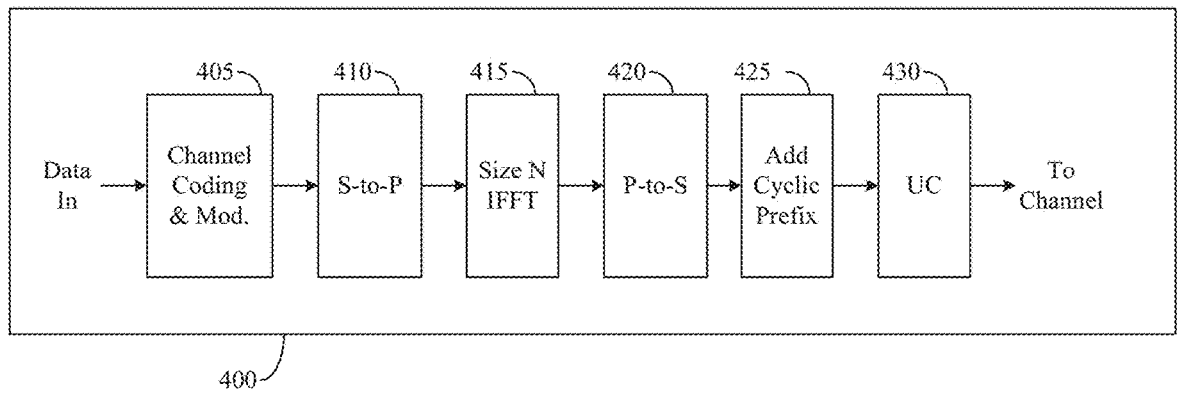
FIGS. 4A and 4B illustrate exemplary transmit and receive paths according to various embodiments of this disclosure.
Figure 4B:
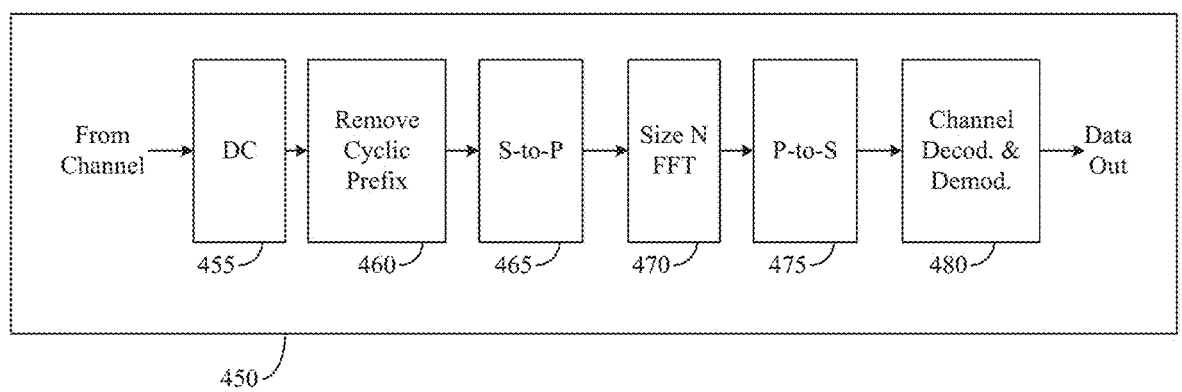

FIGS. 4A and 4B illustrate exemplary wireless transmit and receive paths according to various embodiments of this disclosure. In FIGS. 4A and 4B, for downlink communication, the transmit path circuitry can be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. The receive path 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in transmit path 400 and receive path 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In the following example, the transmit path 400 is implemented in a BS and the receive path is implemented in a UE. In transmit path 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal can arrive at a UE after passing through the wireless channel, and reverse operations to those at a gNB are performed. Down-converter 455 down-converts the received signal to baseband frequency and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path 400 that is analogous to transmitting in the downlink to user equipment 111-116 and may implement a receive path 450 that is analogous to receiving in the uplink from user equipment 111-116. Similarly, each one of user equipment 111-116 may implement a transmit path 400 corresponding to the architecture for transmitting in the uplink to gNBs 101-103 and may implement a receive path 450 corresponding to the architecture for receiving in the downlink from gNBs 101-103.

As described in more detail below the transmit path 400 and receive path 450 can be implemented in UEs, such as UE 116 in FIG. 3, and BSs, such as BS 102 in FIG. 2, for communicating information over a wireless communication network to determine search space sets for receiving PDCCHs for UE power saving.

Although FIGS. 4A and 4B illustrate examples of wireless transmit and receive paths, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

FIG. 5 illustrates an exemplary transmitter according to various embodiments of this disclosure. The transmitter 500 can be implemented in an electronic device communicating via wireless communication network, such as gNB 101 or UE 111.

Information bits 510, such as DCI bits or data bits, are encoded by encoder 520 and then rate matched to assigned time/frequency resources by rate matcher 530. The output from rate matcher 530 is modulated by modulator 540. The modulated and encoded symbols 545 and DMRS or CSI-RS 550 are mapped by SC mapping unit 560 based on SCs selected by BW selector unit 565. An inverse fast Fourier transform (IFFT) is performed by IFFT unit 570 and a cyclic prefix (CP) is added by CP insertion unit 580. The resulting signal is filtered by filter 590 to generated filtered signal 595, which is transmitted by a radio frequency (RF) unit (not shown).

FIG. 6 illustrates an exemplary receiver according to various embodiments of this disclosure. The receiver 600 can be implemented in an electronic device communicating via wireless communication network, such as gNB 101 or UE 111.

A received signal 610 is filtered by filter 620 and then passed through a CP removal unit 630 that removes a cyclic prefix. IFFT unit 640 applies a fast Fourier transform (FFT) and the resulting signals are provided to SCs de-mapping unit 650. The SC de-mapping unit 650 de-maps SCs selected by BW selector unit 655. Received symbols are demodulated by a channel estimator and demodulator unit 660. A rate de-matcher 670 restores a rate matching and a decoder 280 decodes the resulting bits to provide information bits 690.

Each of the gNBs 101-103 may implement a transmitter 400 for transmitting in the downlink to UEs 111-116 and may implement a receiver 600 for receiving in the uplink from UEs 111-116. Similarly, each of UEs 111-116 may implement a transmitter 400 for transmitting in the uplink to gNBs 101-103 and may implement a receiver 600 for receiving in the downlink from gNBs 101-103.

As described in more detail below, the transmitter 500 and receiver 600 can be included in UEs and BSs, such as UE 116 and BS 102, for communicating information over a wireless communication network to determine search space sets for receiving PDCCHs for UE power saving.

Each of the components in FIGS. 5 and 6 can be implemented using only hardware or using a combination of hardware and software/firmware. As a particular example, at least some of the components in FIGS. 5 and 6 may be implemented in software, while other components may be implemented by configurable hardware or a mixture of software and configurable hardware. For instance, the IFFT block 570 may be implemented as configurable software algorithms.

Furthermore, although described as using IFFT, this is by way of illustration only and should not be construed to limit the scope of this disclosure. Other types of transforms, such as Discrete Fourier Transform (DFT) and Inverse Discrete Fourier Transform (IDFT) functions, could be used.

Although FIGS. 5 and 6 illustrate examples of wireless transmitters and receivers, various changes may be made. For example, various components in FIGS. 5 and 6 could be combined, further subdivided, or omitted and additional components could be added according to particular needs. Also, FIGS. 5 and 6 are meant to illustrate examples of the types of transmitters and receivers that could be used in a wireless network. Any other suitable architectures could be used to support wireless communications in a wireless network.

Figure 7:
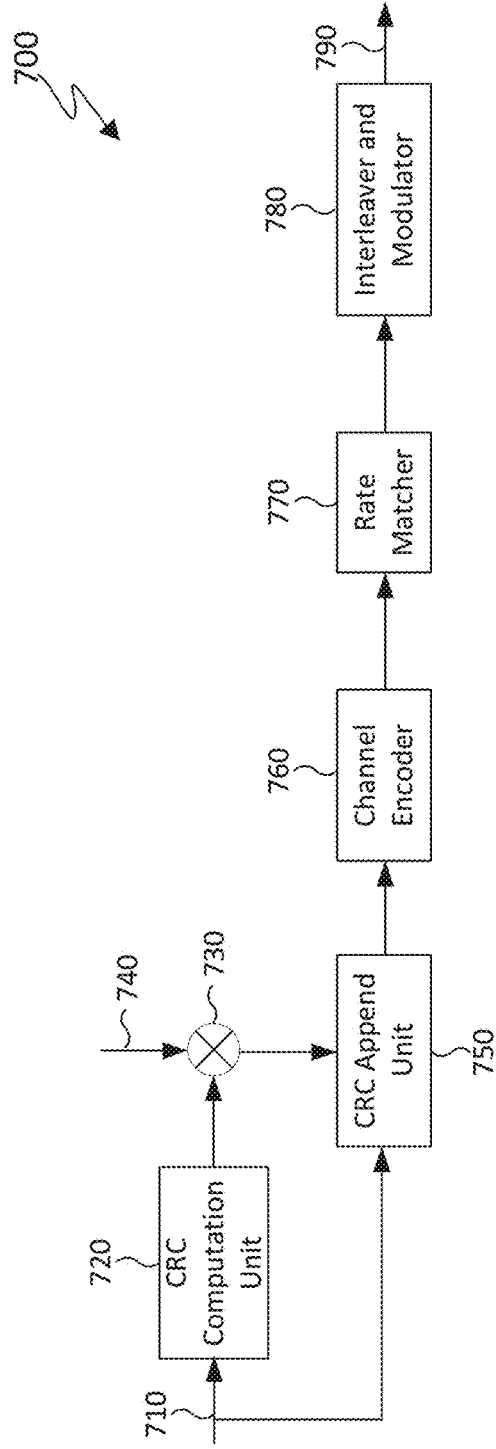
FIG. 7 illustrates an exemplary encoding flowchart for a DCI format in accordance with various embodiments of this disclosure.

FIG. 7 illustrates an exemplary encoding flowchart for a DCI format in accordance with various embodiments of this disclosure. The encoding flowchart 700 can be implemented in a BS, such as gNB 102 in FIG. 2.

A gNB separately encodes and transmits each DCI format in a respective PDCCH.

When applicable, a RNTI for a UE that a DCI format is intended for masks a CRC of the DCI format codeword in order to enable the UE to identify the DCI format. For example, the CRC can include 16 bits or 24 bits and the RNTI can include 16 bits or 24 bits. Otherwise, when a RNTI is not included in a DCI format, a DCI format type indicator field can be included in the DCI format. The CRC of non-coded DCI format information bits 710 is determined using a CRC computation unit 720, and the CRC is masked using an exclusive OR (XOR) operation unit 730 between CRC bits and RNTI bits 740. The XOR operation is defined as XOR(0,0)=0, XOR(0,1)=1, XOR(1,0)=1, XOR(1,1)=0. The masked CRC bits are appended to DCI format information bits using a CRC append unit 750. A channel encoder 760 performs channel coding (such as tail-biting convolutional coding or polar coding), followed by rate matching to allocated resources by rate matcher 770. Interleaver and modulator unit 780 applies interleaving and modulation, such as QPSK, and the output control signal 790 is transmitted.

Figure 8:
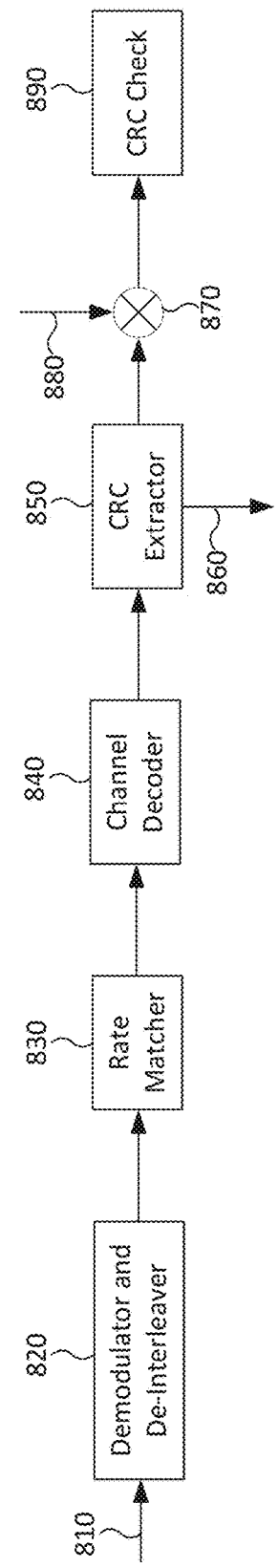
FIG. 8 illustrates an exemplary decoding flowchart for a DCI format in accordance with various embodiments of this disclosure.

FIG. 8 illustrates an exemplary decoding flowchart for a DCI format in accordance with various embodiments of this disclosure. The decoding flowchart 800 can be implemented in a UE, such as UE 116 in FIG. 3.

A received control signal 810 is demodulated and de-interleaved by a demodulator and a de-interleaver 820. Rate matching applied at a transmitter is restored by rate matcher 830, and resulting bits are decoded by decoder 840. After decoding, a CRC extractor 850 extracts CRC bits and provides DCI format information bits 860. The DCI format information bits are de-masked by an XOR operation unit 870 with an RNTI 880 (when applicable) and a CRC check is performed by CRC unit 890. When the CRC check succeeds (check-sum is zero), the DCI format information bits are considered to be valid (at least when corresponding information is valid). When the CRC check does not succeed, the DCI format information bits are considered to be invalid.

As described in more detail below, the encoding flowchart 700 and decoding flowchart 800 can be implemented in a BS and UE, respectively, such as BS 102 in FIG. 2 and UE 116 in FIG. 3, for communicating information over a wireless communication network to determine search space sets for receiving PDCCHs for UE power saving.

Determination of Activated/Deactivated Search Space Sets

One embodiment of this disclosure considers enabling an adaptation for PDCCH monitoring in search space sets through a signal/channel at the physical layer, for example, a DCI format provided by a PDCCH, such as a DL DCI format, or an UL DCI format, or a UE group common DCI format. The adaptation can at least be (de)activation of configured search space set(s); (de)activation of CORESETs; (de)activation of CCE ALs; scaling on PDCCH candidates per CCE AL; and adaptation on one or more configuration parameter(s) per search space set/CORESET. When the indication for an activation/deactivation of a CORESET, or of a search space set, is provided by a DCI format in a PDCCH, the PDCCH reception is in a search space set that cannot be deactivated.

A UE can determine the search space sets that can be adapted by a signal/channel at physical layer through one of the following methods.

In a first method of determining search space sets that can be adapted, the applicable search space sets for adaptation can be defined in the specification of the system operation. For example, the applicable search space sets can be any USS sets wherein each USS set is configured, as described in REF 5, by SearchSpace in PDCCH-Config with searchSpaceType=ue-Specific for DCI formats with CRC scrambled by C-RNTI, MCS-C-RNTI, SP-CSI-RNTI, or CS-RNTI(s). In another example, the applicable search space sets can be any Type3-PDCCH CSS set configured by SearchSpace in PDCCH-Config with searchSpaceType=common for DCI formats with CRC scrambled by C-RNTI, MCS-C-RNTI, or CS-RNTI(s) for the primary cell.

In a second method of determining search space sets that can be adapted, the applicable search space sets for adaptation can be indicated by RRC signaling along with the configuration of the search space sets or associated CORESETs. For example, a RRC parameter along with the configuration of the search space set can indicate whether or not this search space set can be adapted by signal/channel at physical layer. A UE is not expected to be configured to support adaptation to any of the following search space sets:

a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG;

a Type0A-PDCCH CSS set configured by searchSpace0-therSystemInformation in PDCCH-ConfigCommon for a DCI format with CRC scrambled by a SI-RNTI on the primary cell of the MCG;

a Type1-PDCCH CSS set configured by ra-SearchSpace in PDCCH-ConfigCommon for a DCI format with CRC scrambled by a RA-RNTI or a TC-RNTI on the primary cell; and a Type2-PDCCH CSS set configured by paging-SearchSpace in PDCCH-ConfigCommon for a DCI format with CRC scrambled by a P-RNTI on the primary cell of the MCG.

A UE monitors PDCCH candidates in one or more of the following search spaces set(s) when adaptation on search space sets can be triggered by a signal/channel at the physical layer.

One or more user-specific search space (USS) sets with default status of deactivated. Additionally, the USS set(s) can be configured as described in REF 5, i.e., by SearchSpace in PDCCH-Config with searchSpaceType=ue-Specific for DCI formats with CRC scrambled by C-RNTI, MCS-C-RNTI, SP-CSI-RNTI, or CS-RNTI(s). A deactivated USS set is activated by signal/channel at the physical layer such as by a field in a DCI format provided by a PDCCH.

One or more USS sets with default status of activated. Additionally, the USS set(s) can be configured by SearchSpace in PDCCH-Config with searchSpaceType=ue-Specific for DCI formats with CRC scrambled by C-RNTI, MCS-C-RNTI, SP-CSI-RNTI, or CS-RNTI(s). An activated USS set is not deactivated by a signal/channel at the physical layer. An activated USS set can be deactivated by higher layer signaling.

One or more Type3-PDCCH CSS set with default status of activated. The Type3-PDCCH CSS set(s) can be configured by SearchSpace in PDCCH-Config with searchSpaceType=common for DCI formats with CRC scrambled by C-RNTI, MCS-C-RNTI, or CS-RNTI(s) for the primary cell. An activated USS set is not deactivated by a signal/channel at the physical layer. An activated USS set can be deactivated by higher layer signaling.

Multiple search space sets can map to a same CORESET. For example, a UE can be configured with a maximum 10 search space sets wherein each search space set maps to one of a maximum of 3 CORESETs. Although a DCI format for a UE needs to only address search space sets that can be activated/deactivated by the DCI format and does not need to address search space sets that cannot be deactivated, savings in signaling overhead can result by associating search space sets that can be activated/deactivated by the DCI format with a single CORESET and, instead of individually activating/deactivating the search space sets, the CORESET can be respectively activated/deactivated. For each CORESET that is provided to a UE by a serving gNB through RRC signaling, the CORESET can be deactivated or activated by an RRC reconfiguration. For each activated CORESET, when a UE is provided a deactivation indication by a signal/channel at the physical layer, the UE assumes that all search space sets associated with the CORESET are deactivated and the UE can skip monitoring PDCCH candidates in the associated search space sets. For each deactivated CORESET, when a UE is provided an activation indication by signal/channel, the UE assumes that all search space sets associated with the CORESET are activated and the UE monitors PDCCH candidates in the associated search space sets.

Alternatively, all search space sets that can be activated/deactivated for a UE, can be simultaneously activated/deactivated without restricting corresponding associations to a same CORESET. For the DCI format outside of DRX Active Time, the deactivated/activated time of search space sets/CORESETs can be next $L1 \geq 1$ DRX cycle(s), where L1 can be defined in the specification of the system operation, e.g. L1=1, or provided to the UE through higher layer signaling or indicated by the DCI format. For the DCI format during the DRX Active Time or when no DRX is configured in RRC_CONNECTED state, the deactivated/activated time of search space sets/CORESETs can be next $L2 \geq 1$ PDCCH monitoring occasions/periodicities or L2 slots/milliseconds, where L can be defined in the specification of the system operation, e.g. L2=5 ms, or provided to the UE through higher layer signaling or indicated by the DCI format. When any of L1/L2 is indicated by the DCI format, a list of candidate values can be provided to the UE through higher level signaling, and the DCI format can indicate one of the candidates. The DCI format activating/deactivating search space sets can be associated with a USS or with a CSS. In the latter case, a UE is also configured a location in the DCI format for a field deactivating/deactivating search space sets.

Regarding the indication method for triggering activating/deactivating search space sets/CORESETs for a UE through a DCI format, any of the following two methods can be considered.

In a first method, the DCI format activating/deactivating search space sets/CORESETs for a UE can include a corresponding field comprising of a single bit to indicate activation/deactivation of search space sets/CORESETs.

In a second method, the detection of the DCI format can indicate activation/deactivation of respective search space sets/CORESETs that can be (de)activated. For example, a detection of the DCI format with successful CRC check can indicate deactivation/activation of respective search spaces sets/CORESETs that can be (de)activated. In another example, a miss-detection of the DCI format with unsuccessful CRC check can indicate a deactivation/activation of respective search spaces sets/CORESETs that can be (de)activated.

Search space sets/CORESETs that can be (de)activated can be either defined in the specification of the system operation or be provided to the UE through higher layer signaling. For example, the configuration of search space set/CORESET from RRC signaling can include an indication for whether or not the search space set can be deactivated/activated.

Figure 9:
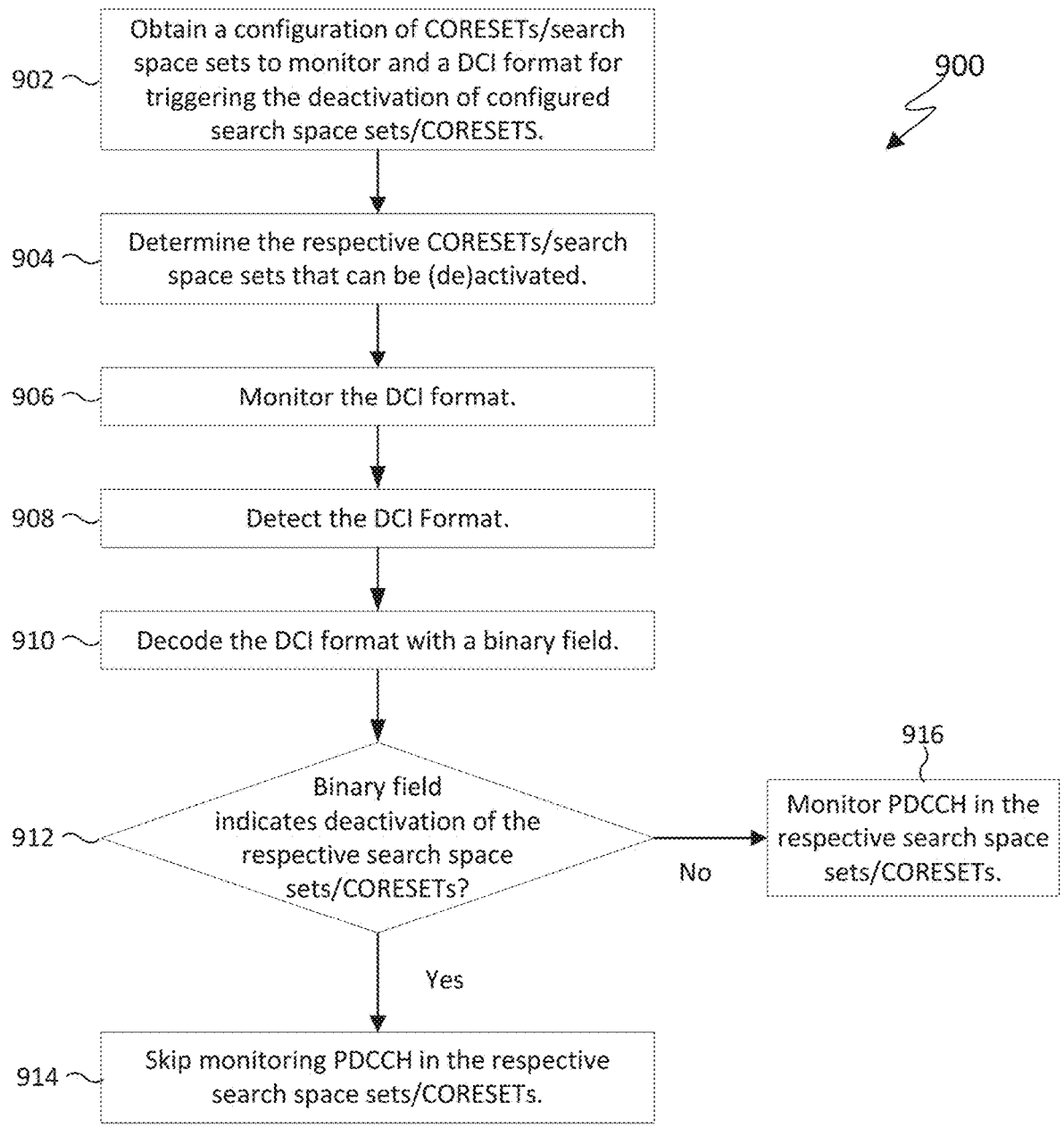
FIG. 9 illustrates a flowchart for activation/deactivation of search space sets/CORESETs using a binary value in a DCI format in accordance with various embodiments of this disclosure.

FIG. 9 illustrates a flowchart for activation/deactivation of search space sets/CORESETs using a binary value in a DCI format in accordance with various embodiments of this disclosure. Operations of flowchart 900 can be implemented in a UE, such as UE 116 in FIG. 3.

Flowchart 900 begins at operation 902 by obtaining a configuration of CORESETs/search space sets to monitor and a DCI format for triggering deactivation of search space sets/CORESETs. In operation 904, the respective CORESETs/search space sets that can be activated/deactivated are determined. The determination can be made based on the DCI format triggered by the configuration.

In operation 906, the DCI format is monitored in configured monitoring occasions and the DCI format is detected in operation 908. In operation 910, the DCI format is decoded based on a binary field. In one embodiment, the DCI content is decoded based on a binary field that indicate activation/deactivation of the respective search space sets/CORESETs.

In operation 912, a determination is made as to whether the binary field indicates deactivation of the respective CORESETs/search space sets. In one embodiment, a binary field with a value of 1 indicates deactivation of the respective CORESETs/search space sets. When the binary field indicates the deactivation of the respective CORESETs/search space sets, flowchart 900 proceeds to operation 914 where PDCCH monitoring is skipped in the respective CORESETs/search space sets. In some embodiments, PDCCH monitoring is skipped in all search space sets associated with the respective CORESETs. Returning to operation 912, if the binary field does not indicate deactivation, i.e., the binary field indicates the activation of the respective CORESETs/search space sets, then flowchart 900 proceeds to operation 916 where the UE then monitors the PDCCH in the respective search space sets or all search space sets associated with the respective CORESETs.

Figure 10:
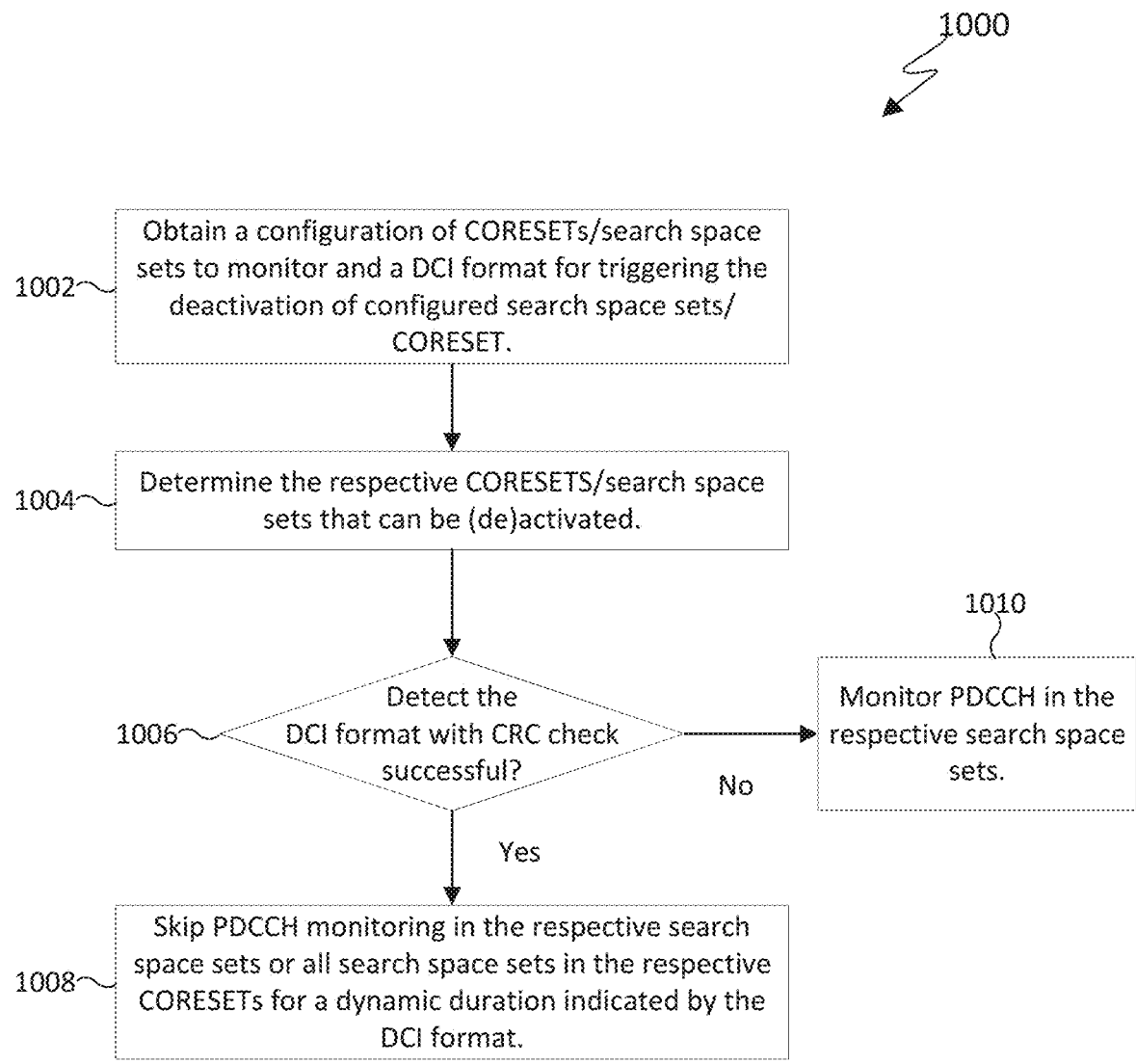
FIG. 10 illustrates a flowchart for deactivation of search space sets by detection of a DCI format in accordance with various embodiments of this disclosure.

FIG. 10 illustrates a flowchart for deactivation of search space sets by detection of a DCI format in accordance with various embodiments of this disclosure. Operations of flowchart 1000 can be implemented in a UE, such as UE 116 in FIG. 3.

Flowchart 1000 begins at operation 1002 where a configuration of CORESETs/search space sets to monitor and a DCI format for triggering deactivation of search space sets/CORESETs is obtained. In operation 1004, the respective CORESETs/search space sets that can be (de)activated are determined. In one embodiment, the determination is made based on the DCI format indicated by the configuration.

In operation 1006, a determination is made as to whether the DCI format is detected with a successful CRC check. In one embodiment, the determination can be made by monitoring the DCI format in the configured monitoring occasions and determining whether or not the DCI format can be decoded with successful CRC check. If the DCI format for triggering the deactivation of the respective CORESETs/search space sets is detected with a successful CRC check, then flowchart 1000 proceeds to operation 1008 where PDCCH monitoring is skipped in the respective search space sets or all search space sets associated with the respective CORESETs for a dynamic duration indicated by a field in the decoded DCI format. In another embodiment, in operation 1008, the respective search space sets/CORESETs are deactivated.

Returning to operation 1006, if the DCI format is not detected with a successful CRC check, then flowchart 900 proceeds to operation 1010 where the UE continues to monitor PDCCH in the respective search space sets or all search space sets associated with the respective CORESETs.

When a signal/channel at the physical layer such as a DCI format provided by a PDCCH provides adaptation for CCE aggregation levels (ALs) or for a number of candidates per CCE AL for a search space set, the search space set is defined by a set of activated CCE ALs, $L^{PS}$, and a number of activated PDCCH candidates per activated CCE AL L, $M^{L,PS}$. $L^{PS}$ is a subset of CCE ALs configured by higher layer (RRC) signaling and $M^{L,PS}$ is less than or equal to the PDCCH candidates for CCE AL L configured by RRC signaling. $L^{PS}$ or $M^{L,PS}$ can be indicated by a signal/channel at the physical layer. For example, $L^{PS}$ can be indicated by a field of a DCI format indicating a binary activated/deactivated value for each CCE AL. For example, $M^{L,PS}$ can be indicated by a field of a DCI format scaling a number of PDCCH candidates for CCE ALs. For example, $M^{L,PS}$ can be indicated by a binary field that activates or deactivates all PDCCH candidates for CCE AL L. The DCI format can indicate adaptation on CCE ALs or PDCCH candidates per CCE AL for one or more search space sets. The search space sets with CCE ALs or PDCCH candidates per AL that can be adapted can be either defined in the specification of the system operation or be provided to the UE through higher layer signaling. For example, the configuration of a search space set from RRC signaling can include an indication for whether or not the CCE ALs or PDCCH candidates per CCE AL of the search space set can be adapted.

Figure 11:
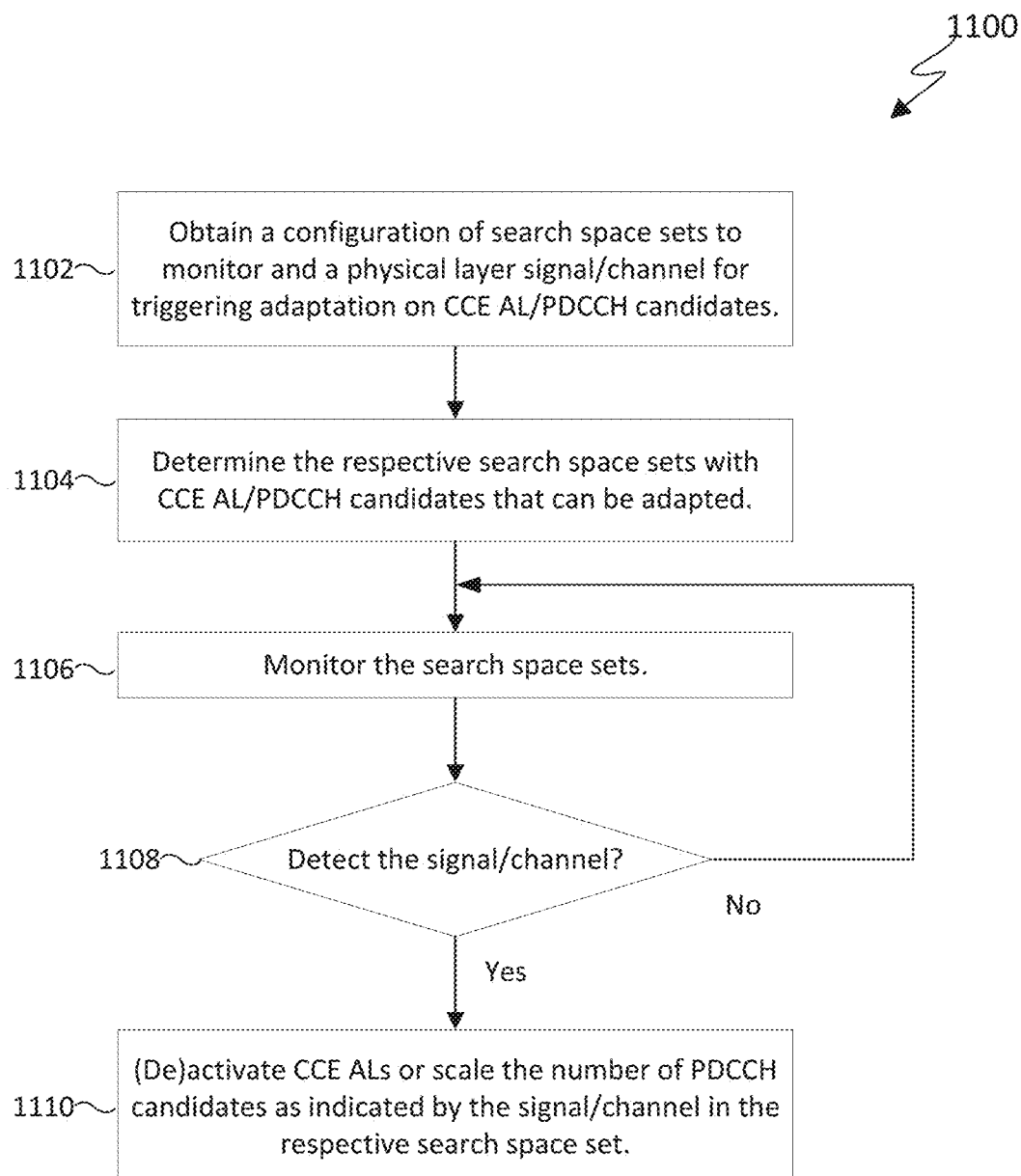
FIG. 11 illustrates a flowchart for adaptation on CCE ALs/PDCCH candidates of search space sets triggered by a physical layer/signal in accordance with various embodiments of this disclosure.

FIG. 11 illustrates a flowchart for adaptation on CCE ALs/PDCCH candidates of search space sets triggered by a physical layer/signal in accordance with various embodiments of this disclosure. Operations of flowchart 1100 can be implemented in a UE, such as UE 116 in FIG. 3.

Flowchart 1100 begins at operation 1102 by obtaining a configuration of search space sets to monitor and a DCI format for triggering adaptation on CCE ALs or PDCCH monitoring candidates. In operation 1104, respective search space sets with CCE ALs or PDCCH monitoring candidates that can be adapted by the signal/channel is determined based on the configuration.

In operation 1106, the search space sets are monitored. A determination is made in operation 1108 as to whether the signal/channel is detected. If the signal/channel is not detected, then flowchart 1100 returns to operation 1106. However, if the signal/channel is detected, then flowchart 1100 proceeds to operation 1110 where CCE ALs can be activated/deactivated, or the PDCCH candidates can be scaled per CCE ALs as indicated by the detected signal/channel for the respective search space sets.

When an adaptation of one or more CORESET(s) is indicated by a signal/channel at physical layer such as a DCI format provided by a PDCCH, for each DL BWP configured to a UE in a serving cell, the UE can be indicated by the signal/channel an adaptation for $P' <= N1$ CORESETs. For example, a configuration of a CORESET can include an indication for whether or not the CORESET can be adapted by a DCI format, such as a DL DCI format, or an UL DCI format, or a UE group common DCI format. If the CORESET can be adapted, the configuration can include a number of candidates for each of the adaptable parameters. For each adapted CORESET, the UE is indicated at least one of the following adaptive parameters by the signal/channel and each indication can overrides the configuration provided by RRC signaling.

Adaptive parameter 1: a CORESET index p, $0<=p<12$. The CORESET index can be indicated implicitly. In this case, the configured CORESETs that can be adapted can be ordered in ascending/desascending order, a field in the DCI format can carry a value of $mod(j, Y)+c2$, where i is the order index of the CORESET, Y can either be the number of configured CORESETs that can be adapted or the maximum of configured CORESETs, e.g. 3, and c2 is a integer, e.g. c2=0. The CORESET index p can indicate the respective CORESET for adaptive parameter(s) or (de)activation of the CORESET.

Adaptive parameter 2: a binary activated/deactivated value.

Adaptive parameter 3: a precoder granularity for a number of REGs in the frequency domain where the UE can assume use of a same DM-RS precoder.

Adaptive parameter 4: a number of consecutive symbols that provides a CORESET size in the time domain, N_OFDM. For example, a positive or negative offset of X symbols can be indicated by the signal/channel, such that N_OFDM=min(N_OFDM+X, N_max) or N_OFDM=max(N_OFDM−X, N_min), where X can either be predefined in the specification of the system operation, e.g. 1, or provided to the UE by higher layer signaling, N_max and N_min is the maximum and minimum consecutive symbols of CORESET with adaptation, for example, N_max=3, N_min=1.

Adaptive parameter 5: a set of resource blocks that provides a CORESET size in the frequency domain. For example, the configured resource blocks of CORESET can be dividied into multiple subsets, and a binary activation/deactivation value for each subset can be indicated by the signal/channel.

Figure 12:
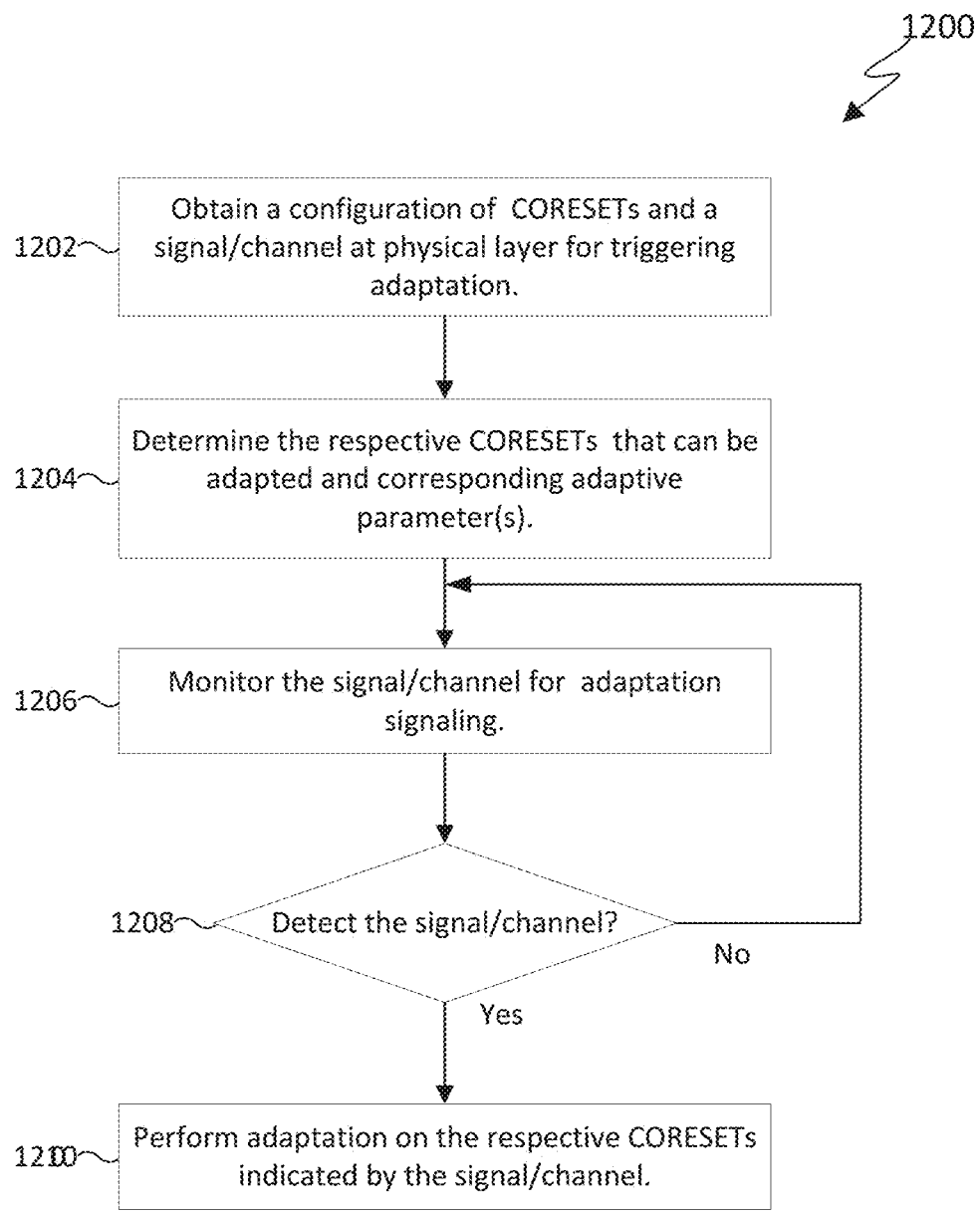
FIG. 12 illustrates a flowchart for adaptation on CORESET based on a signal/channel at a physical layer in accordance with various embodiments of this disclosure.

FIG. 12 illustrates a flowchart for adaptation on CORESET based on a signal/channel at a physical layer in accordance with various embodiments of this disclosure. Operations of flowchart 1200 can be implemented in a UE, such as UE 116 in FIG. 3.

Flowchart 1200 begins at operation 1202 by obtaining a configuration on CORESETs and a physical layer signal/channel to trigger UE adaptation by RRC signaling. In operation 1204, the respective CORESETs that can be adapted and their corresponding adaptive parameters are determined based on the configuration.

In operation 1206, the signal/channel is monitored for adaptation signaling. In one embodiment, monitoring of the signal/channel for adaptation signaling is performed on time/frequency resources based on the configuration.

A determination is made in operation 1208 as to whether the signal/channel for triggering adaptation is detected. If the signal/channel for triggering adaptation is not detected, then flowchart 1200 returns to operation 1206. However, if the signal/channel for triggering adaptation is detected, then flowchart 1200 proceeds to operation 1210 where the adaptation on the corresponding adaptive parameters of the respective CORESETs is performed as indicated by the signal/channel.

When an adaptation for a search space set is provided by a signal/channel at physical layer such as a DCI format provided by a PDCCH, for each DL BWP configured to the UE in a serving cell, the UE can be indicated by the signal/channel an adaptation for S'<=N2 search space sets. For example, a configuration of a search space set can include an indication for whether or not the search space set can be adapted by a DCI format, such as a DL DCI format, or an UL DCI format, or a UE group common DCI format and, in case the search space set can be adapted, the configuration can include a number of candidates for each of adaptable parameters. For each adapted search space set, the UE is indicated at least one of the following adaptive parameters by the signal/channel and each indication can overrides the configuration provided by RRC signaling.

A search space set index s, where 0<=s<40. The search space set index can be indicated implicitly. For example, the configured search space sets that can be adapted can be ordered in ascending/descending order, and a field in the DCI format can carry a value of mod(i, X)+c1, where i is the order index of the search space set s, X can either be the number of configured search space sets that can be adapted or the maximum of configured search space sets, e.g. 10, and c1 is a integer, e.g. c1=0. The search space set index can indicate the respective search space set for adaptive parameter(s) or (de)activation of the search space set.

A Binary Activated/Deactivated Value.

An Association Between the Search Space Set s and CORESET p.

A PDCCH monitoring periodicity of $k_s$ slots. In one example, a dynamic scalar for the PDCCH monitoring periodicity, $s_{k_s}$, is provided by the signal/channel. In this case, $k_s$ is derived as $k_s = s_{k_s} \cdot \bar{k}_s$ where $\bar{k}_s$ is a current PDCCH monitoring periodicity for search space set s. In another example, one of the preconfigured PDCCH monitoring periodicity candidates for adaptation can be indicated by the signal/channel.

A duration of $T_s < k_s$ slots indicating a number of consecutive slots, in the period of $k_s$ where the UE monitors PDCCH candidates for search space set s. In one example, a dynamic scalar on duration, $s_{T_s}$, is provided and $T_s$ is determined as $T_s = s_{T_s} \cdot \bar{T}_s$ where $\bar{T}_s$ is a current duration for search space set s.

A number of PDCCH candidates $M_s^{(L,PS)}$ per CCE aggregation level $L^{PS}$. When the DCI format for triggering the adaptation is associated with the search space set for adaptation, the DCI format can not deactivate all the PDCCH candidates of all ALs. In the other word, the search space set of the DCI format for triggering the adaptation cannot be deactivated. In one example, a binary deactivation/activation value per CCE AL can be provided by the DCI format. When the CCE AL is deactivated, the corresponding PDCCH candidates $M_s^{(L,PS)}=0$. In another example, multiple candidate scaling factor can be configured by RRC signaling in advance, and the DCI format can indicate one of the candidate scaling factors to indicate scaling on PDCCH candidates for all CCE ALs.

An indication to monitor PDCCH candidates either for DCI format 0_0 and DCI format 1_0, or for DCI format 0_1 and DCI format 1_1.

Figure 13:
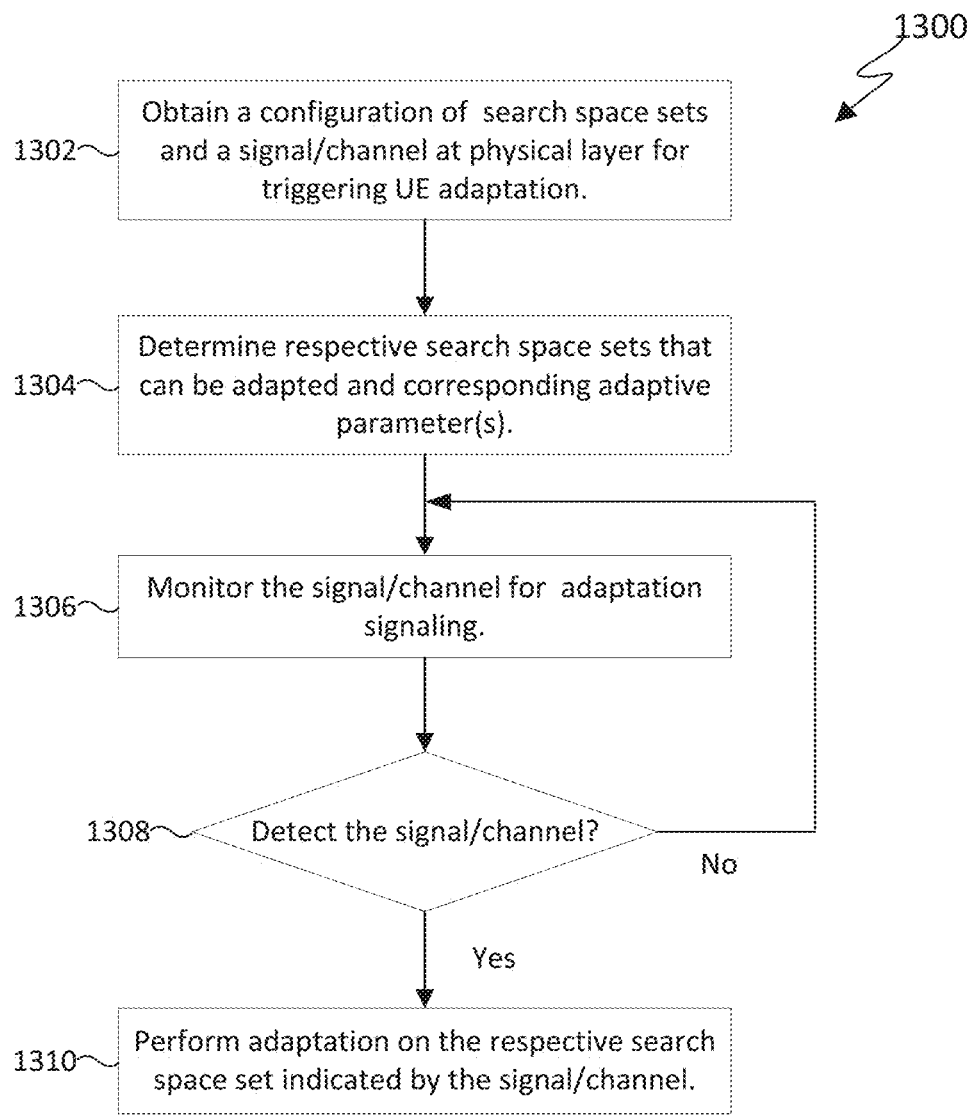
FIG. 13 illustrates a flowchart for adaption on search space sets based on a signal/channel at the physical layer in accordance with various embodiments of this disclosure.

FIG. 13 illustrates a flowchart for adaptation on search space sets based on a signal/channel at the physical layer in accordance with various embodiments of this disclosure. Operations of flowchart 1300 can be implemented in a UE, such as UE 116 in FIG. 3.

Flowchart 1300 begins at operation 1302 by obtaining a configuration on search space sets and a physical layer signal/channel to trigger UE adaptation by RRC signaling. In operation 1304, respective search space sets that can be adapted by the signal/channel and the corresponding adaptive parameters are determined based on the configuration.

In operation 1308 the signal/channel is monitored for adaptation signaling. In one embodiment, monitoring of the signal/channel for adaptation signaling is performed on time/frequency resources based on the configuration.

Thereafter, in operation 1308 a determination is made as to whether the signal/channel for triggering adaptation is detected. If the signal/channel is not detected in operation 1308, then flowchart 1300 returns back to operation 1306. However, if the signal/channel is detected in operation 1308, then flowchart 1300 proceeds to operation 1310 where adaptation is performed on the corresponding adaptive parameters of the respective search space sets as indicated by the signal/channel.

A UE can determine a maximum number of adapted CORESET(s)/search space set(s), i.e. N1 and N2, through one of the following methods:

Method 1: N1 or N2 can be fixed and predetermined in the specification of the system operation, for example N1=1 and N2=5;

Method 2: N1 or N2 can be provided to the UE through higher layer signaling; or

Method 3: N1 or N2 can be indicated by assistance information from the UE to the gNB prior to being provided to the UE through higher layer signaling by the gNB.

Determination of PDCCH Monitoring Occasions

Another embodiment of this disclosure considers an adaptation of PDCCH monitoring occasions through a signal/channel at the physical layer.

A UE determines a PDCCH monitoring occasion on an active DL BWP from the PDCCH monitoring periodicity, the PDCCH monitoring offset, and the PDCCH monitoring pattern within a slot configured by RRC signaling and adapted by a signal/channel. For an active search space set s, the UE determines that a PDCCH monitoring occasion(s) exists in a slot with number $n_{s,f}^{\mu}$ in a frame with number $n_f$ if $(n_f N_{slot}^{frame,\mu} + n_{s,f}^{\mu} - o_s) \mod k'_s = 0$. $k'_s = k_s^{PS}$, if the adaptation on PDCCH monitoring periodicity for search space set s, $k_s^{PS}$, is indicated by the signal/channel; otherwise $k_s'=k_s$, where $k_s$ is the PDCCH monitoring periodicity for search space set s configured to the UE by RRC signaling.

In one example of determining a PDCCH monitoring occasion on an active DL BWP from the PDCCH monitoring periodicity, a configuration of a search space set s can include an indication (1 bit) for whether or not a periodicity for PDCCH monitoring for the search space set s can be adapted by a field in a DCI format, such as a DL DCI format, or an UL DCI format, or a UE group common DCI format. If the periodicity can be adapted, then the configuration can include a set of periodicity values, e.g., two values. For example, for any search space set s that a periodicity for PDCCH monitoring can be adapted by a field in a DCI format, a field of 1 bit can have a value of 0 to indicate to the UE a first periodicity value or can have a value of 0 to indicate to the UE a second periodicity value. In a non-limiting example, the second periodicity value is an integer multiple of the first periodicity value.

In another example of determining a PDCCH monitoring occasion on an active DL BWP from the PDCCH monitoring periodicity, a configuration of a search space set s can include an indication (1 bit) for whether or not a periodicity for PDCCH monitoring for the search space set s can be adapted by a field in a DCI format, such as a DL DCI format, or an UL DCI format, or a UE group common DCI format. A field of the DCI format can indicate the minimum PDCCH monitoring periodicity, Tmin. For any search space set s that a periodicity for PDCCH monitoring can be adapted by the DCI format, the PDCCH monitoring periodicity should be no less than the indicated minimum applicable PDCCH monitoring periodicity, Tmin. The minimum PDCCH monitoring periodicity can be indicated explicitly. In this case, a list of candidate minimum PDCCH monitoring periodicity can be either defined in the specification of the system operation, such that {1, 2, 3, 4} with units of one slot/millisecond or provided to the UE through higher layer signaling. A field of the DCI format for triggering UE adaptation can indicate one of the candidates. For any search space set s that a periodicity for PDCCH monitoring can be adapted, if the PDCCH monitoring periodicity is smaller than the indicated Tmin, UE expects that the PDCCH monitoring periodicity is adapted to Tmin. Otherwise the PDCCH monitoring periodicity is maintained the same as before. Alternatively, Tmin can be indicated by a DCI format for triggering UE adaptation implicitly. In this case, the DCI format can indicate a PDCCH monitoring periodicity offset, Y, in a unit of one slot. For any search space set s that a periodicity for PDCCH monitoring can be adapted, the PDCCH monitoring periodicity ks is adapted to ks+Y.

Figure 14:
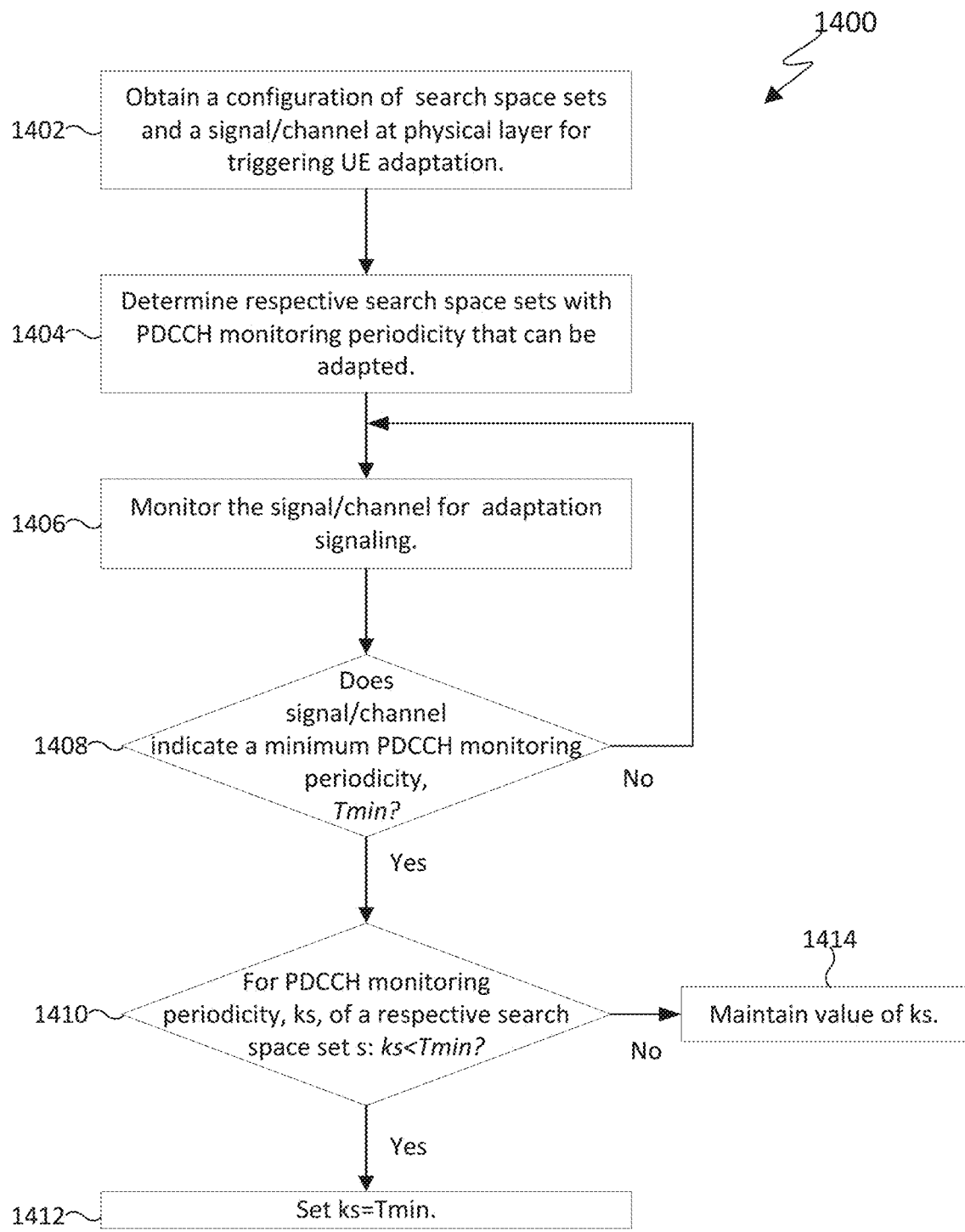
FIG. 14 illustrates a flowchart for adapting minimum PDCCH monitoring periodicity triggered by a signal/channel at the physical layer in accordance with various embodiments of this disclosure.

FIG. 14 illustrates a flowchart for adapting minimum PDCCH monitoring periodicity triggered by a signal/channel at the physical layer in accordance with various embodiments of this disclosure. Operations of flowchart 1400 can be implemented in a UE, such as UE 116 in FIG. 3.

Flowchart 1400 begins at operation 1402 by obtaining a configuration on search space sets to monitor PDDCH and a physical layer signal/channel for triggering UE adaptation.

In operation 1404, respective search space sets that PDCCH monitoring periodicity can be adapted are determined. In one embodiment, the determination is made according to the specification of the system operation. In another embodiment, the determination is made according to the configuration.

In operation 1406, the signal/channel is monitored for adaptation signaling. The monitoring can be performed on time/frequency resources based on the configuration. Thereafter, a determination is made in operation 1408 as to whether the signal/channel indicates a minimum PDCCH monitoring periodicity, Tmin. If the signal/channel does not indicate a minimum PDCCH monitoring periodicity, Tmin, then flowchart 1400 returns to operation 1406. If the signal/channel does indicate a minimum PDCCH monitoring periodicity, Tmin, then flowchart 1400 proceeds from operation 1408 to operation 1410 where a subsequent determination is made as to whether a PDCCH monitoring periodicity, ks, of a respective search space set s is less than Tmin, i.e., ks<Tmin. If the PDCCH monitoring periodicity, ks, of the respective search space set s is less than Tmin, then in operation 1412, ks is set to Tmin. However, if the PDCCH monitoring periodicity, ks, of the respective search space set s is not less than Tmin, then flowchart 1400 proceeds to operation 1414 where the value of ks is maintained for PDCCH monitoring periodicity of a respective search space set s.

The UE can monitor a PDCCH for search space set s for $T'_s$ consecutive slots, starting from slot $n_{s,f}^\mu$, and does not monitor PDCCH for search space set s for the next $k_s'-T'_s$ consecutive slots. $T'_s=T_s^{PS}$, if the adaptation on duration for search space set s, $T_s^{PS}$, is indicated by the signal/channel; otherwise $T'_s=T_s$, where $T_s$ is the duration for search space set s configured by RRC signaling. For example, a configuration of a search space set s can include an indication for whether or not a duration for the search space set s can be adapted by a field in a DCI format, such as a DL DCI format, or an UL DCI format, or a UE group common DCI format. For example, for any search space set s that a duration can be adapted by a field in a DCI format, a field of 1 bit can have a value of 1 to indicate to the UE to stop monitoring PDCCH ($T_s^{PS}=0$) until a first PDCCH monitoring occasion at a next PDCCH monitoring period, or can have a value of 0 to indicate to the UE to continue monitoring PDCCH as configured by RRC signaling.

A UE can receive a go-to-sleep indication from a signal/channel at physical layer. When the UE receives the go-to-sleep indication in a slot with index, $n_{s,f}^\mu$, the UE can skip PDCCH monitoring for one or more configured search space sets for a sleep duration, $T_{sleep}^{PS}$, n the unit of one slot or one millisecond. The UE can determine a value of $T_{sleep}^{PS}$ through one of the following methods.

In one method of determining sleep duration, $T_{sleep}^{PS}$ can be fixed and defined in the specification of the system operation. For example, $T_{sleep}^{PS}=5$ ms. For example, $T_{sleep}^{PS}=C1*2^u$, where u=0, 1, 2, 3, 4 is the index of subcarrier spacing (SCS), c1 is a positive integer, e.g. c1=5.

In another method of determining sleep duration, $T_{sleep}^{PS}$ can be associated with PDCCH monitoring periodicity. For example, $T_{sleep}^{PS}$ can be associated with a next PDCCH monitoring occasion, for example, $T_{sleep}^{PS}=n'_{s,f}^\mu-n_{s,f}^\mu$ where $n'_{s,f}^\mu$ is a slot index of a next PDCCH monitoring occasion. For example, $T_{sleep}^{PS}=c1*T\_PDCCH$, where T_PDCCH can be the minimum PDCCH monitoring periodicity of associated search space sets, c1 is an positive integer, which can either fixed, e.g. c1=1, or provided by higher layer signaling or indicated by the signal/channel.

In another method of determining sleep duration, $T_{sleep}^{PS}$ can be indicated by the signal/channel. For example, a set of candidate sleep duration can be configured by RRC signaling, and the signal/channel can indicate one of the preconfigured candidates.

In yet another method of determining sleep duration, $T_{sleep}^{PS}$ can be provided by higher layer signaling.

In yet another method of determining sleep duration, $T_{sleep}^{PS}$ can be provided by higher layer signaling in response to assistance information on a preferred value on $T_{sleep}^{PS}$ transmitted by the UE to gNB.

The UE can determine search space sets that the UE can skip PDCCH monitoring when the UE receives the go-to-sleep indication through one of the following methods.

In one method of determining search space sets that can be skipped during PDCCH monitoring, a configuration of a search space set s can include an indication for whether or not PDCCH monitoring for the search space set s can be adapted by a field in a DCI format, such as a DL DCI format, or an UL DCI format, or a UE group common DCI format. If PDCCH monitoring can be adapted, the configuration can include a number of PDCCH monitoring occasions that the UE can skip monitoring PDCCH. For example, for any search space set s that PDCCH monitoring can be adapted by a field in a DCI format, a field of 1 bit can have a value of 1 to indicate to the UE to skip the number of PDCCH monitoring occasions or can have a value of 0 to indicate to the UE to continue monitoring PDCCH as configured by RRC signaling.

In another method of determining search space sets that can be skipped during PDCCH monitoring, UE can skip PDCCH monitoring for all the configured search space sets when it receives the go-to-sleep indication.

In yet another method of determining search space sets that can be skipped during PDCCH monitoring, UE can skip PDCCH monitoring in all USS sets.

Figure 15:
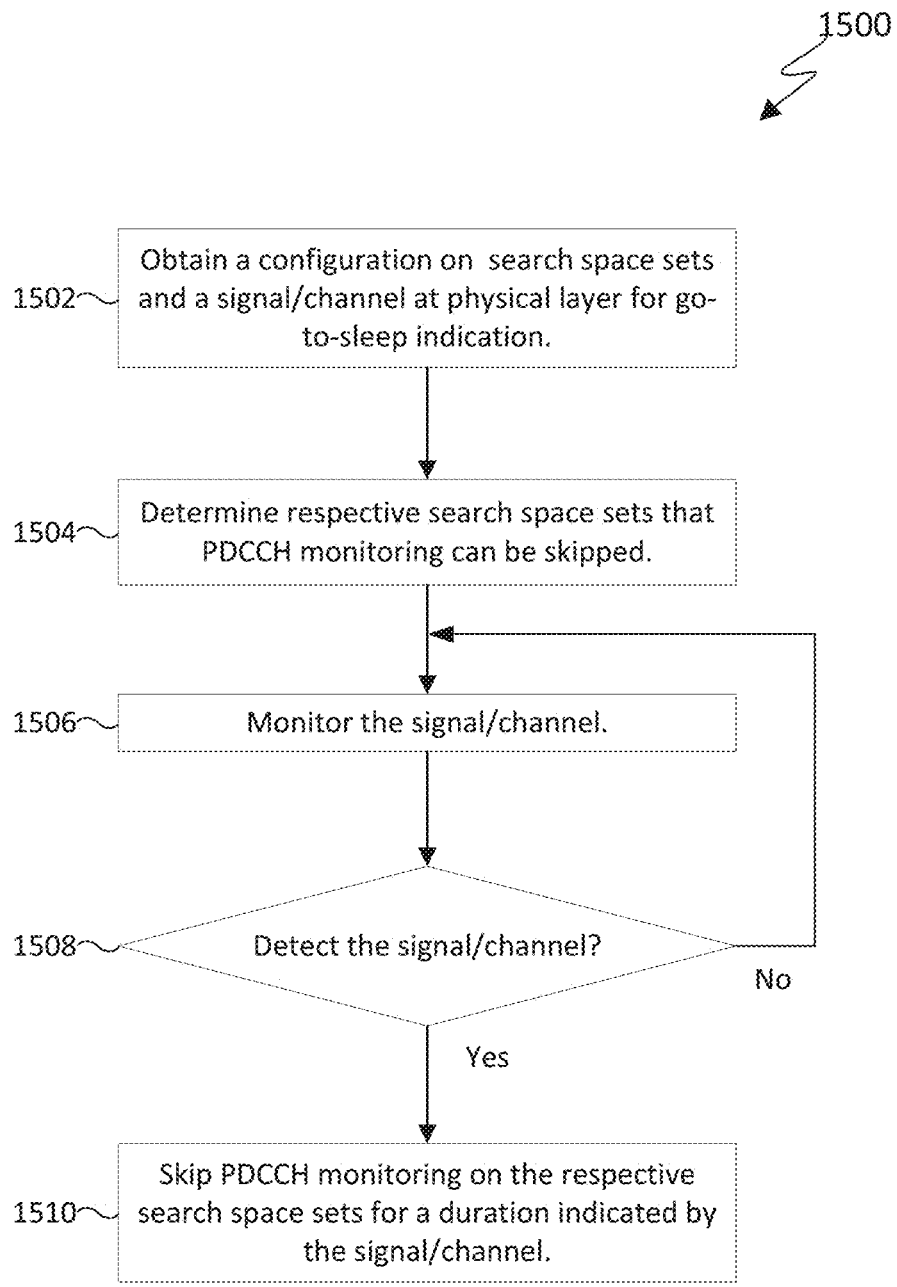
FIG. 15 illustrates a flowchart for skipping PDCCH monitoring triggered by a signal/channel at the physical layer in accordance with various embodiments of this disclosure.

FIG. 15 illustrates a flowchart for skipping PDCCH monitoring triggered by a signal/channel at the physical layer in accordance with various embodiments of this disclosure. Operations of flowchart 1500 can be implemented in a UE, such as UE 116 in FIG. 3.

Flowchart 1500 begins at operation 1502 by obtaining a configuration on search space sets to monitor PDDCH and a physical layer signal/channel for a "go-to-sleep" indicator, i.e., for triggering PDCCH monitoring that can be skipped. In operation 1504, respective search space sets that PDCCH monitoring can be skipped is determined based on the specification of the system operation or the configuration. In operation 1506, the signal/channel is monitored. The signal/channel can be monitored in time/frequency resources based on the configuration.

In operation 1508, a determination is made as to whether the signal/channel is detected. If the signal/channel is not detected, then flowchart 1500 returns to operation 1506. However, if the signal/channel is detected, then flowchart 1500 proceeds from operation 1508 to operation 1510 where PDCCH monitoring is skipped for the respective search space sets for a duration indicated by the detected signal/channel.

Determination of Pdcch Candidates/Non-Overlapping CCEs

Another embodiment of this disclosure considers determination of PDCCH candidates and non-overlapping CCEs per slot for a DL BWP when adaptation on PDCCH monitoring is triggered by a signal/channel at the physical layer.

For an activated search space set s associated with CORESET p, CCE indexes for an activated aggregation level L corresponding to PDCCH candidates $m_{s,n_{CI}}$ of the search space set s in slot $n_{s,f}^{\mu}$ for an active DL BWP of a serving cell corresponding to carrier indicator field value $n_{CI}$ can be given by:

$$L \cdot \left\{ \left( Y_{p,n_{s,f}^{\mu}}^{\mu} + \left\lfloor \frac{m_{s,n_{CI}} \cdot N_{CCE,p}}{L \cdot M'_{s,max}^{(L)}} \right\rfloor + n_{CI} \right) \mod \lfloor N_{CCE,p} / L \rfloor \right\} + i \quad \text{(Equation 3)}$$

where:

$m_{s,n_{CI}} = 0, \ldots, M'_{s,n_{CI}}^{(L)} - 1$;

$M'_{s,n_{CI}}^{(L)}$ is a number of PDCCH candidates the UE monitors for aggregation level L of a search space set s for a serving cell corresponding to $n_{CI}$;

$M'_{s,n_{CI}}^{(L)} = M_{s,n_{CI}}^{(L,PS)}$, if $M_{s,n_{CI}}^{(L,PS)}$ indicated by a signal/channel at physical layer, otherwise $M'_{s,n_{CI}}^{(L)}$ equals to the default value configured by RRC signaling;

for a USS, $M'_{s,max}^{(L)}$ is the maximum PDCCH candidates indicated by a signal/channel at physical layer if the signal/channel triggers the adaptation on the maximum PDCCH candidates, otherwise $M'_{s,max}^{(L)}$ is a maximum of $M'_{s,n_{CI}}^{(L)}$ over all configured $n_{CI}$ values for a CCE aggregation level L of search space set s;

$i = 0, \ldots, L-1$; and other parameters are same as NR Rel-15 in REF 3.

Figure 16:
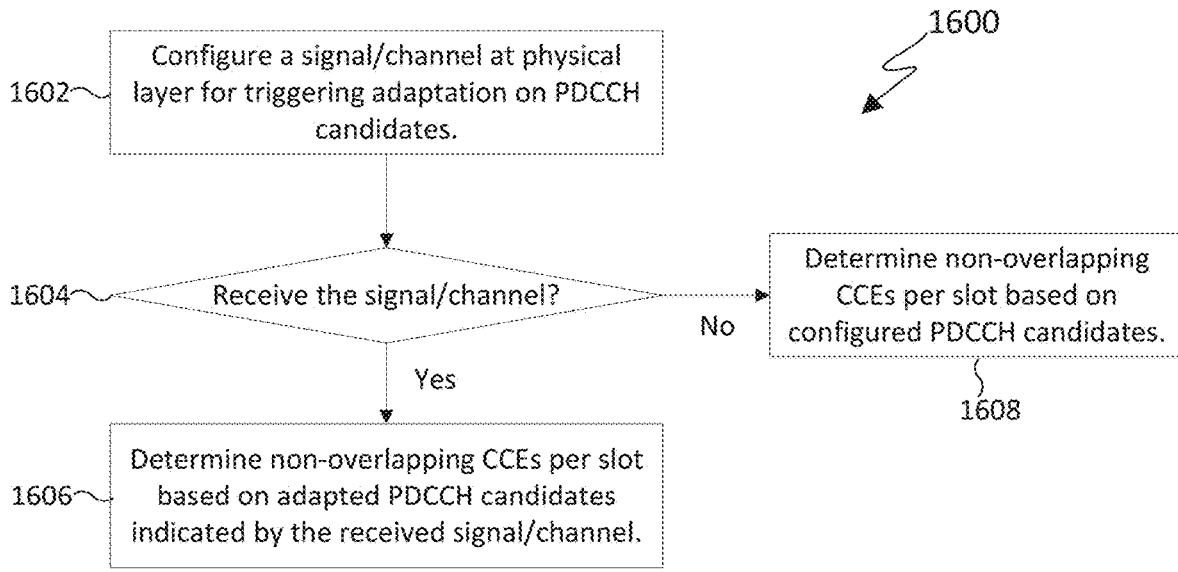
FIG. 16 illustrates a flowchart for determining non-overlapping CCEs with adaptation requests through a signal/channel at the physical layer in accordance with various embodiments of this disclosure.

FIG. 16 illustrates a flowchart for determining non-overlapping CCEs with adaptation requests through a signal/channel at the physical layer in accordance with various embodiments of this disclosure. Operations of flowchart 1600 can be implemented in a UE, such as UE 116 in FIG. 3.

Flowchart 1600 begins at operation 1602 where a signal/channel at a physical layer is configured for triggering adaptation on PDCCH candidates. For example, the UE can be configured with a signal/channel at physical layer for triggering adaptation on PDCCH candidates per CCE AL of search space sets.

In operation 1604 a determination is made as to whether the signal/channel is received. If the signal/channel is received, then flowchart 1600 proceeds to operation 1606 where the non-overlapping CCEs per slot are determined based on adapted PDCCH candidates indicated by the received signal/channel. In one embodiment, non-overlapping CCEs per slot are determined based on adapted PDCCH candidates per AL or maximum PDCCH candidate indicated by the received signal/channel according to Equation 3.

If the signal/channel is not received in operation 1604, then the flowchart 1600 proceeds to operation 1608 where non-overlapping CCEs per slot are determined based on the configured PDCCH candidates, e.g., through RRC signaling.

In some embodiments, a UE can be expected to monitor PDCCH candidates for up to 4 sizes of DCI formats that include up to min($N^{PS}_{DCI}$, 3) sizes of DCI formats with CRC scrambled by C-RNTI per serving cell, where $N^{PS}_{DCI}$ can be indicated by a signal/channel. The UE can count a number of sizes for DCI formats per serving cell based on a number of configured or activated PDCCH candidates in respective search space sets for the corresponding active DL BWP.

Table 1 provides the maximum number of monitored PDCCH candidates, $M'_{PDCCH}^{maxslot,\mu}$, for a DL BWP with SCS configuration µ for a UE per slot for operation with a single serving cell when an adaptation on number of PDCCH candidates per slot, $M_{PDCCH,PS}^{maxslot,\mu}$, is indicated by a signal/channel.

TABLE 1

| $\mu$ | Maximum number of monitored PDCCH candidates per slot and per serving cell $M'_{PDCCH}{}^{max,\,slot,\,\mu}$ |
|---|---|
| 0 | 44 or $M_{PDCCH,\,PS}{}^{maxslot,\,\mu}$ |
| 1 | 36 or $M_{PDCCH,\,PS}{}^{maxslot,\,\mu}$ |
| 2 | 22 or $M_{PDCCH,\,PS}{}^{maxslot,\,\mu}$ |
| 3 | 20 or $M_{PDCCH,\,PS}{}^{maxslot,\,\mu}$ |

$M'_{PDCCH}{}^{maxslot,\mu}=M_{PDCCH,PS}{}^{maxslot,\mu}$ if the maximum number of monitored PDCCH candidates per slot per serving cell is indicated by a signal/channel; otherwise, $M'_{PDCCH}{}^{maxslot,\mu}=M_{PDCCH}{}^{maxslot,\mu}$, where $M_{PDCCH}{}^{maxslot,\mu}$ is the maximum number of monitored PDCCH candidates per slot and per severing cell defined in Table 10.1-2 in REF3. For a number of PDCCH candidates indicated by a signal/channel, $M_{PDCCH,PS}{}^{maxslot,\mu}$ scan either be indicated by signal/channel explicitly, or be derived from a scaling factor $M_s$ provided by a signal/channel such as $M'_{PDCCH}{}^{max,slot,\mu}=M'_{PDCCH}{}^{max,slot,\mu}\cdot M_s$, or a set of values for $M'_{PDCCH}{}^{max,slot,\mu}$ can be provided by higher layers, such as 4 values, and one value can be indicated by a field in a DCI format provided by a PDCCH, such as a field with 2 bits.

A UE can be requested by a signal/channel a capability to monitor PDCCH candidates for $N_{cell}{}^{cap,PS}$ downlink cells. $N_{cell}{}^{cap,PS}$ can override the default value of the maximum number of downlink cells to monitor PDCCH candidates, i.e. 4, or the configured capability $k_{cell}{}^{cap}$ through pdcch-BlindDetectionCA.

In some embodiments, a UE does not monitor, on the active DL BWP of the scheduling cell, more than $M_{PDCCH}{}^{total,slot,\mu}=M'_{PDCCH}{}^{maxslot,\mu}$ PDCCH candidates or more than $C_{PDCCH}{}^{total,slot,\mu}=C_{PDCCH}{}^{max,slot,\mu}$ non-overlapped CCEs per slot for each scheduled cell if the following two conditions are met.

Condition 1: the UE is capable for operation with carrier aggregation with a maximum of 4 downlink cells or indicates through pdcch-BlindDetectionCA a capability to monitor PDCCH candidates for $N_{cells}{}^{cap} \geq 4$ downlink cells or requested through power saving signal/channel a capability to monitor PDCCH candidates for $0 < N_{cell}{}^{cap,PS} < N_{cells}{}^{cap}$; and Condition 2: the UE is configured with $N_{cells}{}^{DL,\mu}$ downlink cells with DL BWPs having SCS configuration $\mu$, where $\Sigma_{\mu=0}^{3} N_{cell}{}^{DL,\mu} \leq 4$ or $\Sigma_{\mu=0}^{3} N_{cell}{}^{DL,\mu} \leq N_{cells}{}^{cap}$, or $\Sigma_{\mu=0}^{3} N_{cell}{}^{DL,\mu} \leq N_{cell}{}^{cap,PS}$ respectively.

In some embodiments, a UE does not monitor more than $M_{PDCCH}{}^{total,slot,\mu}=\lfloor N_{cells}{}^{cap}\cdot M'_{PDCCH}{}^{maxslot,\mu}\cdot N_{active,cells}{}^{DL,\mu}/\Sigma_{j=0}^{j}N_{active,cells}{}^{DL,j}\rfloor$ PDCCH candidates or more than $C_{PDCCH}{}^{total,slot,\mu}=\lfloor N_{cells}{}^{cap}\cdot C_{PDCCH}{}^{maxslot,\mu}\cdot N_{active,cells}{}^{DL,\mu}/\Sigma_{j=0}^{j}N_{active,cells}{}^{DL,j}\rfloor$ non-overlapping CCEs per slot on the active DL BWP(s) of scheduling cell(s) from the $N_{active,cells}{}^{DL,\mu}$ downlink cells if the following two conditions are met.

Condition 1: the UE indicates through pdcch-BlindDetectionCA a capability to monitor PDCCH candidates for $N_{cells}{}^{cap} \geq 4$ downlink cells or requested through a signal/channel a capability to monitor PDCCH candidates for $0 < N_{cell}{}^{cap,PS} < N_{cell}{}^{cap}$ and Condition 2: The UE is configured with $N_{cell}{}^{DL,\mu}$ downlink cells with DL BWPs having SCS configuration $\mu$ where $\Sigma_{\mu=0}^{3} N_{cell}{}^{DL,\mu} > N_{cells}{}^{cap}$ or $\Sigma_{\mu=0}^{3} N_{cell}{}^{DL,\mu} > N_{cells}{}^{cap,PS}$, respectively, a DL BWP of an activated cell a DL BWP of an activated cell is the active DL BWP of the activated cell, and a DL BWP of a deactivated cell is the DL BWP with index provided by firstActiveDownlinkBWP-Id and signal/channel for the deactivated cell.

For each scheduled cell, the UE is not required to monitor on the active DL BWP with SCS configuration $\mu$ of the scheduling cell more than $\min(M'_{PDCCH}{}^{maxslot,\mu}, M_{PDCCH}{}^{total,slot,\mu})$ PDCCH candidates or more than $\min(C_{PDCCH}{}^{maxslot,\mu}, C_{PDCCH}{}^{total,slot,\mu})$ non-overlapped CCEs per slot.

For all activated search space sets within a slot, denote by $S_{CSS}$ a set of CSS sets with cardinality of $I_{CSS}$ and by $S_{USS}$ a set of USS sets with cardinality of $J_{USS}$. The location of USS sets $S_j$, $0 \leq S_j < J_{USS}$, in $S_{USS}$ is according to an ascending order of the search space set index.

Denote by $M'_{CSS(i)}{}^{L}$, $0 \leq i < I_{CSS}$ the number of configured or activated PDCCH candidates for CSS set $S_{CSS}(i)$ and by $M'_{S_{USS}(j)}{}^{L}$, $0 \leq j < J_{USS}$, the number of configured or activated PDCCH candidates for activated USS set $S_{USS}(j)$. For the CSS sets, a UE monitors $M_{PDCCH}{}^{CSS}=\Sigma_{i=0}^{I_{CSS}-1}\Sigma_L M'_{S_{CSS}(i)}{}^{L}$ PDCCH candidates requiring a total of $C_{PDCCH}{}^{CSS}$ non-overlapping CCEs in a slot.

Denote by $V_{CCE}(S_{USS}(j))$ the set of non-overlapping CCEs for search space set $S_{USS}(j)$ and by $\mathcal{C}(V_{CCE}(S_{USS}(j)))$ the cardinality of $V_{CCE}(S_{USS}(j))$ where the non-overlapping CCEs for search space set $S_{USS}(j)$ are determined considering the monitored PDCCH candidates for the activated CSS sets and the monitored PDCCH candidates for all activated search space sets $S_{USS}(k)$, $0 \leq k < j$.

Set $M_{PDCCH}{}^{USS} = \min(M'_{PDCCH}{}^{maxslot,\mu}, M_{PDCCH}{}^{total,slot,\mu}) - M_{PDCCH}{}^{CSS}$
Set $C_{PDCCH}{}^{USS} = \min(C_{PDCCH}{}^{maxslot,\mu}, C_{PDCCH}{}^{total,slot,\mu}) - C_{PDCCH}{}^{CSS}$
Set j = 0
while $\Sigma_L M_{S_{USS}(j)}{}^{(L)} \leq M_{PDCCH}{}^{USS}$ AND $\mathcal{C}(V_{CCE}(S_{USS}(j))) \leq C_{PDCCH}{}^{USS}$
  if search space set j is activated or not deactivated by power saving signal/channel:
    allocate $\Sigma_L M_{S_{USS}(j)}{}^{(L)}$ monitored PDCCH candidates to USS set $S_{USS}(j)$;
    $M_{PDCCH}{}^{USS} = M_{PDCCH}{}^{USS} - \Sigma_L M_{S_{USS}(j)}{}^{(L)}$;
    $C_{PDCCH}{}^{USS} = C_{PDCCH}{}^{USS} - \mathcal{C}(V_{CCE}(S_{USS}(j)))$;
  end if;
  j = j + 1;
end while Additional Timeline for UE Adaptation Another embodiment of this disclosure also considers additional timeline for applying UE adaptation request on one or more adaptive parameter(s). The associated adaptation parameter(s) can be any adaptive parameter in this disclosure. When a UE receives an adaptation indication through a signal/channel at physical layer or MCA CE, a UE can apply the UE adaptation or indicated value(s) on associated adaptive parameter(s) after an application delay.

In first embodiment on determination of application delay, if a UE receives an adaptation request or adaptation indication through MAC CE, the UE can apply the indicated value(s) on associated adaptive parameters at a time $T_{gap}{}^{AR}$ millisecond(s)/slot(s) after the slot when the UE transmits HARQ-ACK information for the PDSCH providing the adaptation request.

Figure 17:
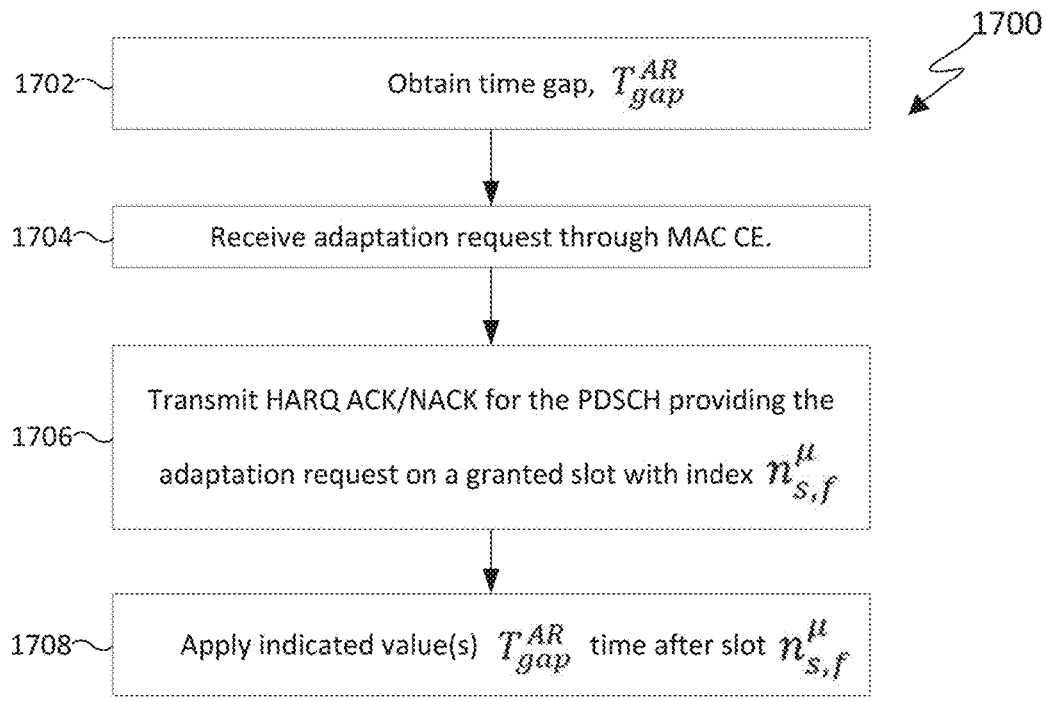
FIG. 17 illustrates a flowchart for applying an adaptation request by a UE when the adaptation request is received through a MAC CE in accordance with various embodiments of this disclosure.

FIG. 17 illustrates a flowchart for applying an adaptation request by a UE when the adaptation request is received through a MAC CE in accordance with various embodiments of this disclosure.

Flowchart 1700 begins at operation 1702 by obtaining a time gap. The time gap, $T\_gap^AR$, can have a unit of one millisecond or one slot. In operation 1704, an adaptation request is received through MAC CE, e.g., in a PDSCH. In operation 1706, a HARQ ACK/NACK is transmitted for the PDSCH providing the adaptation request on a granted slot with an index of $n_{s,f}{}^{\mu}$.

In operation 1708, newly indicated value(s) in the adaptation request can be applied at $T_{gap}^{AR}$ time after the slot $n_{s,f}^{\mu}$. In one example, when $T_{gap}^{AR}$ is in the unit of one slot, the UE can apply the new indicated value(s) starting from a slot with index $n_{s,f}^{\mu}+T_{gap}^{AR}$. In the other words, UE is not expected to apply the new indicated value(s) before slot $n_{s,f}^{\mu}+T_{gap}^{AR}$. In another example, when $T_{gap}^{AR}$ is in the unit of one millisecond, the UE can apply the new indicated value(s) starting from a slot with index $n_{s,f}^{\mu}+T_{gap}^{AR} \cdot 2^{\mu}$, where $\mu=0, 1, 2, 3$ is the SCS index of active DL BWP. In the other words, UE is not expected to apply the new indicated value(s) before slot $n_{s,f}^{\mu}+T_{gap}^{AR} \cdot 2^{\mu}$, where $\mu=0, 1, 2, 3$ is the SCS index of active DL BWP.

In second embodiment on determination of application delay, if a UE receives an adaptation request or indication through a DCI format with CRC scrambled by C-RNTI, the UE can apply the indicated value(s) to associated adaptive parameter(s) at a time $T_{gap}^{AR}$ millisecond(s)/slot(s) after slot $n_{s,f}^{\mu}$. The slot $n_{s,f}^{\mu}$ can be the slot index when UE transmits HARQ-ACK information for the PDSCH granted by the DCI format providing the adaptation request. In this case, UE does not apply the triggered adaptation request or indicated value(s) when UE transmits HARQ-NACK for the PDSCH granted by the DC format. Alternatively, $n_{s,f}^{\mu}$ can be the slot index when UE transmits HARQ-ACK/NACK information for the PDSCH granted by the DCI format providing the adaptation request or indication. In this case, the UE can apply the indicated value(s) or adaptation request with a time gap of $T_{gap}^{AR}$ after feedback the either HARQ-ACK or HARQ-NACK for the PDSCH granted by the same DCI format that provides the adaptation request/indication.

In one example, the UE can apply the new indicated value(s) starting from a slot with index $n_{s,f}^{\mu}+T_{gap}^{AR}$. In the other word, UE is not expected to apply the new indicated value(s) before slot $n_{s,f}^{\mu}+T_{gap}^{AR}$.

In another example, the UE can apply the new indicated value(s) starting from a slot with index $n_{s,f}^{\mu}+T_{gap}^{AR} \cdot 2^{\mu}$, where $\mu=0, 1, 2, 3$ is the SCS index of active DL BWP. In the other word, UE is not expected to apply the new indicated value(s) before slot $n_{s,f}^{\mu}+T_{gap}^{AR} \cdot 2^{\mu}$, where $\mu=0, 1, 2, 3$ is the SCS index of active DL BWP.

Figure 18:
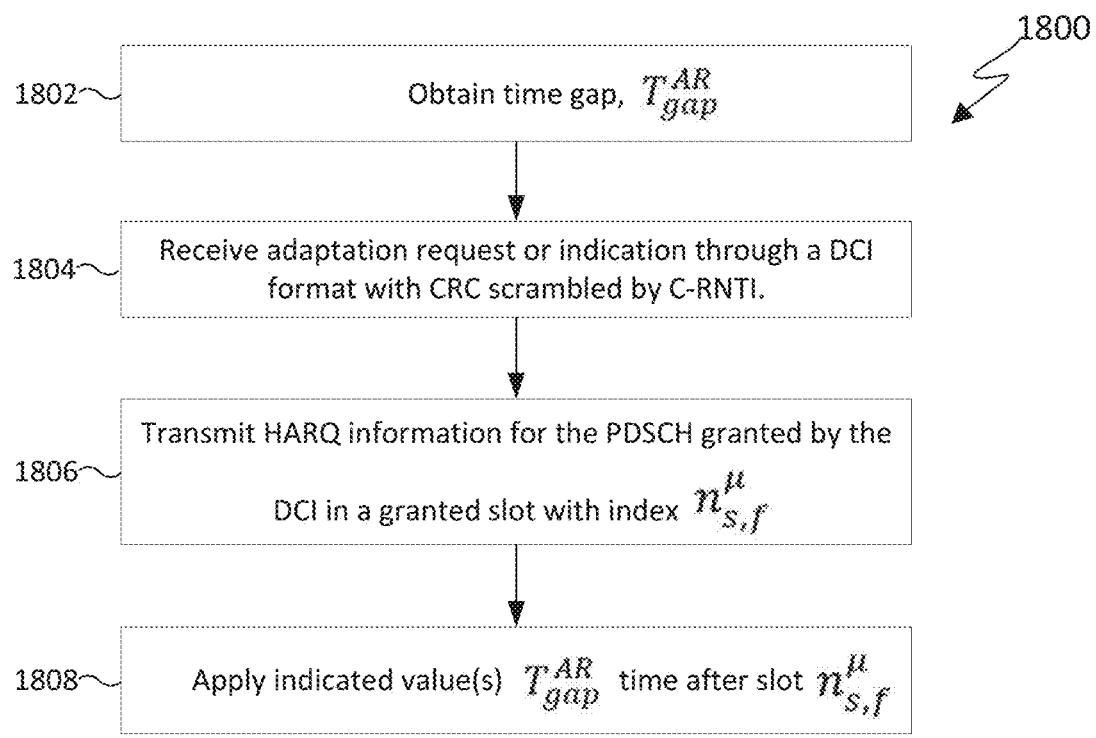
FIG. 18 illustrates a flowchart for applying an adaption request or indication by a UE when the adaptation request or indication is received through a DCI format with CRC scrambled by C-RNTI in accordance with various embodiments of this disclosure.

FIG. 18 illustrates a flowchart for applying an adaption request or indication by a UE when the adaptation request or indication is received through a DCI format with CRC scrambled by C-RNTI in accordance with various embodiments of this disclosure. Operations of flowchart 1800 can be implemented in a UE such as UE 116 in FIG. 3.

Flowchart 1800 begins at operation 1802 by obtaining a time gap. The time gap, $T_{gap}^{AR}$, can have units of one millisecond or one slot. In operation 1804, an adaptation request or indication is received through a DCI format with CRC scrambled by C-RNTI.

In operation 1806, HARQ information is transmitted for the PDSCH granted by the DCI providing the adaptation request/indication in a granted slot with index $n_{s,f}^{\mu}$. In operation 1808, the newly indicated value(s) are applied starting from a slot with index $n_{s,f}^{\mu}+T_{gap}^{AR} \cdot 2^{\mu}$, where $\mu=0, 1, 2, 3$ is the SCS index of active DL BWP. UE is not expected to apply the new indicated value(s) before slot $n_{s,f}^{\mu}+T_{gap}^{AR} \cdot 2^{\mu}$, where $\mu=0, 1, 2, 3$ is the SCS index of active DL BWP.

In a third embodiment on determination of application delay, if a UE receives an adaptation request or indication through a signal/channel at physical layer, the UE can apply the adaptation request or indicated values to associated PDCCH monitoring parameters $T_{gap}^{AR}$ time after the time when the UE receives the adaptation request or indication.

In one example, when the physical layer signal/channel for triggering the adaptation is a scheduling DCI, which also schedule a PDSCH, the UE is not expected to apply the new indicated value(s) before slot $$\left\lceil (n + T_{gap}^{AR}) \cdot \frac{2^{\mu_{PDSCH}}}{2^{\mu_{PDCCH}}} \right\rceil,$$

where n is the slot index when the UE receives the indicated value(s) with DCI CRC check successfully, and $\mu_{PDSCH}$ and $\mu_{PDCCH}$ are the subcarrier spacing configurations for PDSCH and PDCCH, respectively.

In another example, when the physical layer signal/channel for triggering the adaptation is a scheduling DCI, which also schedule a PDSCH, the UE is not expected to apply the new indicated value(s) before slot $$\left\lfloor (n + T_{gap}^{AR}) \cdot \frac{2^{\mu_{PDSCH}}}{2^{\mu_{PDCCH}}} \right\rfloor,$$

where n is the slot index when the UE receives the indicated value(s) with DCI CRC check successfully, and $\mu_{PDSCH}$ and $\mu_{PDCCH}$ are the subcarrier spacing configurations for PDSCH and PDCCH, respectively.

In yet another example, when the physical layer signal/channel for triggering the adaptation is a scheduling DCI, which also schedule a PDSCH, the UE is not expected to apply the new indicated value(s) before slot $$\left\lceil n \cdot \frac{2^{\mu_{PDSCH}}}{2^{\mu_{PDCCH}}} \right\rceil + T_{gap}^{AR},$$

where n is the slot index when the UE receives the indicated value(s) with DCI CRC check successfully, and $\mu_{PDSCH}$ and $\mu_{PDCCH}$ are the subcarrier spacing configurations for PDSCH and PDCCH, respectively.

In yet another example, when the physical layer signal/channel for triggering the adaptation is a scheduling DCI, which also schedule a PDSCH, the UE is not expected to apply the new indicated value(s) before slot $$\left\lfloor n \cdot \frac{2^{\mu_{PDSCH}}}{2^{\mu_{PDCCH}}} \right\rfloor + T_{gap}^{AR},$$

where n is the slot index when the UE receives the indicated value(s) with DCI CRC check successfully, and $\mu_{PDSCH}$ and $\mu_{PDCCH}$ are the subcarrier spacing configurations for PDSCH and PDCCH, respectively.

In yet another example, when the physical layer signal/channel for triggering the adaptation is a scheduling DCI, which also schedule a PUSCH, the UE is not expected to apply the new indicated value(s) before slot $$\left\lceil (n + T_{gap}^{AR}) \cdot \frac{2^{\mu_{PUSCH}}}{2^{\mu_{PDCCH}}} \right\rceil,$$

where n is the slot index when the UE receives the indicated value(s), and $\mu_{PUSCH}$ and $\mu_{PDCCH}$ are the subcarrier spacing configurations for PUSCH and PDCCH, respectively.

In yet another example, when the physical layer signal/channel for triggering the adaptation is a scheduling DCI, which also schedule a PUSCH, the UE is not expected to apply the new indicated value(s) before slot $$\left\lfloor (n + T_{gap}^{AR}) \cdot \frac{2^{\mu_{PUSCH}}}{2^{\mu_{PDCCH}}} \right\rfloor,$$

where n is the slot index when the UE receives the indicated value(s) with DCI CRC check successfully, and $\mu_{PUSCH}$ and $\mu_{PDCCH}$ are the subcarrier spacing configurations for PUSCH and PDCCH, respectively.

In yet another example, when the physical layer signal/channel for triggering the adaptation is a scheduling DCI, which also schedule a PUSCH, the UE is not expected to apply the new indicated value(s) before slot $$\left\lceil n \cdot \frac{2^{\mu_{PUSCH}}}{2^{\mu_{PDCCH}}} \right\rceil + T_{gap}^{AR},$$

where n is the slot index when the UE receives the indicated value(s) with DCI CRC check successfully, and $\mu_{PUSCH}$ and $\mu_{PDCCH}$ are the subcarrier spacing configurations for PUSCH and PDCCH, respectively.

In yet another example, when the physical layer signal/channel for triggering the adaptation is a scheduling DCI, which also schedule a PUSCH, the UE is not expected to apply the new indicated value(s) before slot $$\left\lfloor n \cdot \frac{2^{\mu_{PUSCH}}}{2^{\mu_{PDCCH}}} \right\rfloor + T_{gap}^{AR},$$

where n is the slot index when the UE receives the indicated value(s) with DCI CRC check successfully, and $\mu_{PUSCH}$ and $\mu_{PDCCH}$ are the subcarrier spacing configurations for PUSCH and PDCCH, respectively.

In yet another example, when the physical layer signal/channel for triggering the adaptation is a non-scheduling DCI format, e.g. a DCI format dedicated for power saving with CRC scrambled by PS-RNTI in the means of either USS or CSS, the UE is not expected to apply the new indicated value(s) before slot $n+T_{gap}^{AR} \cdot 2^\mu$, where $\mu=0, 1, 2, 3$ is the SCS index of active DL BWP when UE is ready to apply the triggered adaptation, and n is the slot index when the UE receives the indicated value(s) with DCI CRC check successfully.

In yet another example, when the physical layer signal/channel for triggering the adaptation is a non-scheduling DCI format, e.g. a DCI format dedicated for power saving with CRC scrambled by PS-RNTI in the means of either USS or CSS, the UE is not expected to apply the new indicated value(s) before slot $n+T_{gap}^{AR}$, where n is the slot index when the UE receives the indicated value(s) with DCI CRC check successfully.

Figure 19:
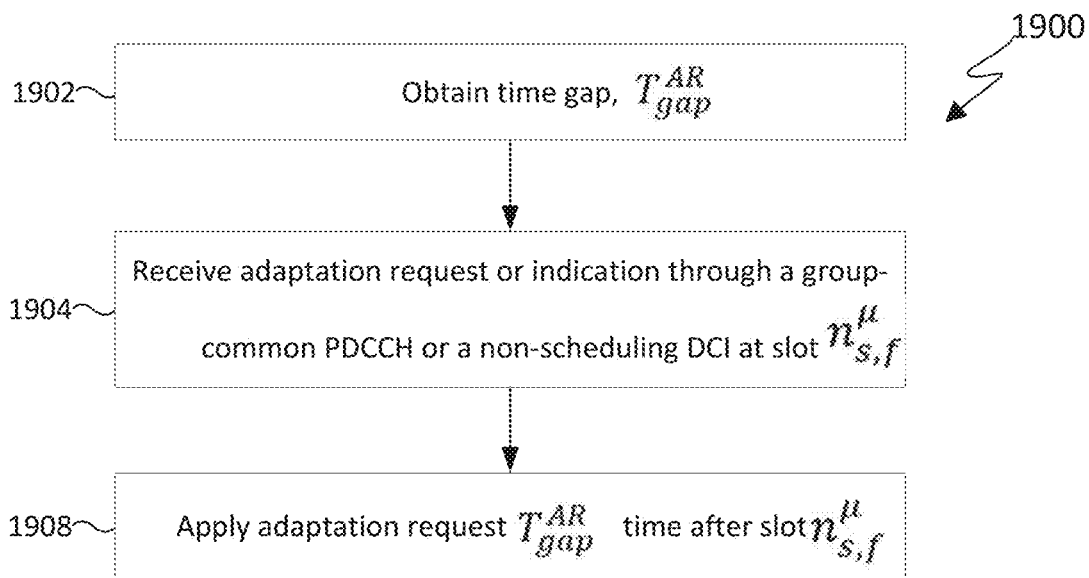
FIG. 19 illustrates a flowchart for applying an adaptation request on PDCCH monitoring in a UE when the adaptation request is received through a group-common PDCCH or non-scheduling DCI without HARQ feedback in accordance with various embodiments of this disclosure.

FIG. 19 illustrates a flowchart for applying an adaptation request on PDCCH monitoring in a UE when the adaptation request is received through a group-common PDCCH or non-scheduling DCI without HARQ feedback in accordance with various embodiments of this disclosure. Operations of flowchart 1900 can be implemented in a UE, such as UE 116 in FIG. 3.

Flowchart 1900 begins at operation 1902 by obtaining a time gap. The time gap, $T_{gap}^{AR}$, can have units of one millisecond or one slot or an OFDM symbol duration. In operation 1904 an adaptation request or indication is received through a group-common PDCCH or a non-scheduling DCI at slot $n_{s,f}^\mu$. In operation 1906, the adaptation request or indication is applied at time or slot that is at least $T_{gap}^{AR}$ after the slot $n_{s,f}^\mu$.

A UE can determine a value for $T_{gap}^{AR}$ through one of the following examples. In a first example, $T_{gap}^{AR}$ is fixed and defined in the specification of the system operation, e.g. $T_{gap}^{AR}=1$ or $T_{gap}^{AR}=0$. In one example, $T_{gap}^{AR}$ can be defined per SCS configuration.

In a second example, $T_{gap}^{AR}=\max(Y, Z)$, where Y is the minimum K0 value before applying newly indicated applicable value or UE adaptation, Z is the smallest feasible non-zero application delay. Z can be fixed and defined in the specification of the system operation, e.g. Z=1 or Z=2. Z can depend on DL SCS, e.g. Z=1 for SCS=15 KHz/30 KHz, Z=2 for SCS=60 KHz, and the Z=3 for Z=120 KHz.

AR In a third example, $T_{gap}^{AR}=\max(Y, Z)$, where Y is maximum KO, and/or minimum K2, and/or minimum aperiodic CSI-RS triggering offset before applying newly indicated applicable value(s) or UE adaptation, Z is the smallest feasible non-zero application delay. Z can be fixed and defined in the specification of the system operation, e.g. Z=1 or Z=2. Z can depend on DL SCS, e.g. Z=1 for SCS=15 KHz/30 KHz, Z=2 for SCS=60 KHz, and the Z=3 for Z=120 KHz.

In a fourth example, $T_{gap}^{AR}$ can be provided to the UE through higher layer signaling.

In a fifth example, $T_{gap}^{AR}$ can be provided to UE through higher layer signaling in response to assistance information of the preferred value on transmitted from UE to gNB.

In a sixth example, $T_{gap}^{AR}$ can be associated with a time gap/offset between the first monitoring occasion of the physical layer signal/channel for triggering the UE adaptation and the start of next DRX ON duration, denoted as OˆMO_DRX1.

In a sub-example of the sixth example, $T_{gap}^{AR}=\max(Z, \text{OˆMO\_DRX1})$, where Z is the smallest feasible non-zero application delay. Z can be defined in the specification of the system operation, e.g. Z=1, or Z=2 or Z=1 for SCS=15 KHz/30 KHz, Z=2 for SCS=60 KHz, and Z=3 for SCS=120 KHz or Z is UE capability of BWP switching delay, i.e. bwp-SwitchingDelay.

In another sub-example of the sixth example, $T_{gap}^{AR}=$OˆMO_DRX1. UE can start applying the triggered UE adaptation or indicated applicable values in the first slot of the next DRX ON duration. UE is not expects to be configured with OˆMO_DRX2<bwp-SwitchingDelay, where bwp-SwitchingDelay is UE capability of BWP switching delay, when the physical layer signal/channel outside of DRX Active Time also triggers BWP switching.

In a seventh example, $T_{gap}^{AR}$ can be associated with a time gap/offset between the last monitoring occasion of the physical layer signal/channel for triggering the UE adaptation and the start of next DRX ON duration, denoted as OˆMO_DRX2.

In a sub-example of the seventh example, $T_{gap}^{AR}=\max(Z, \text{OˆMO\_DRX2})$, where Z is the smallest feasible non-zero application delay. Z can be defined in the specification of the system operation, e.g. Z=1, or Z=2 or Z=1 for SCS=15 KHz/30 KHz, Z=2 for SCS=60 KHz, and Z=3 for SCS=120 KHz or Z is UE capability of BWP switching delay, i.e. bwp-SwitchingDelay.

In another sub-example of the seventh example, $T_{gap}^{AR}$=O^MO_DRX2. UE can start applying the triggered UE adaptation or indicated applicable values in the first slot of the next DRX ON duration. UE is not expects to be configured with O^MO_DRX2<bwp-SwitchingDelay, where bwp-SwitchingDelay is UE capability of BWP switching delay, when the physical layer signal/channel outside of DRX Active Time also triggers BWP switching.

In an eighth example, when a UE adaptation is triggered by a physical layer signal/channel outside of DRX Active Time, $T_{gap}^{AR}$ can be the time gap between the time when the UE receives an adaptation request or indication through a signal/channel at physical layer and the Nth slot within the Active Time of next associated DRX cycle. In this case, the UE is not expected to apply the triggered UE adaptation or indicated value(s) before the Nth slot within the Active Time of next associated DRX cycle. N can be either provided through higher layer signaling or defined in the specification of the system operation, e.g. N=1.

In a ninth example, when a UE adaptation is triggered by a physical layer signal/channel outside of DRX Active Time, $T_{gap}^{AR}$ can be the time gap between the time when the UE receives an adaptation request or indication through a signal/channel at physical layer and the first slot of PDCCH monitoring occasion within the Active Time of next associated DRX cycle. In this case, the UE is not expected to apply the triggered UE adaptation or indicated value(s) before the first slot of PDCCH monitoring within the Active Time of next associated DRX cycle.

For UE adaptation triggered by a physical layer signal/channel, a UE can have a different application delay depending on whether or not the UE detects the physical layer signal/channel outside or within the Active Time when a DRX cycle is configured. The Active Time is defined in REF 6.

Figure 20:
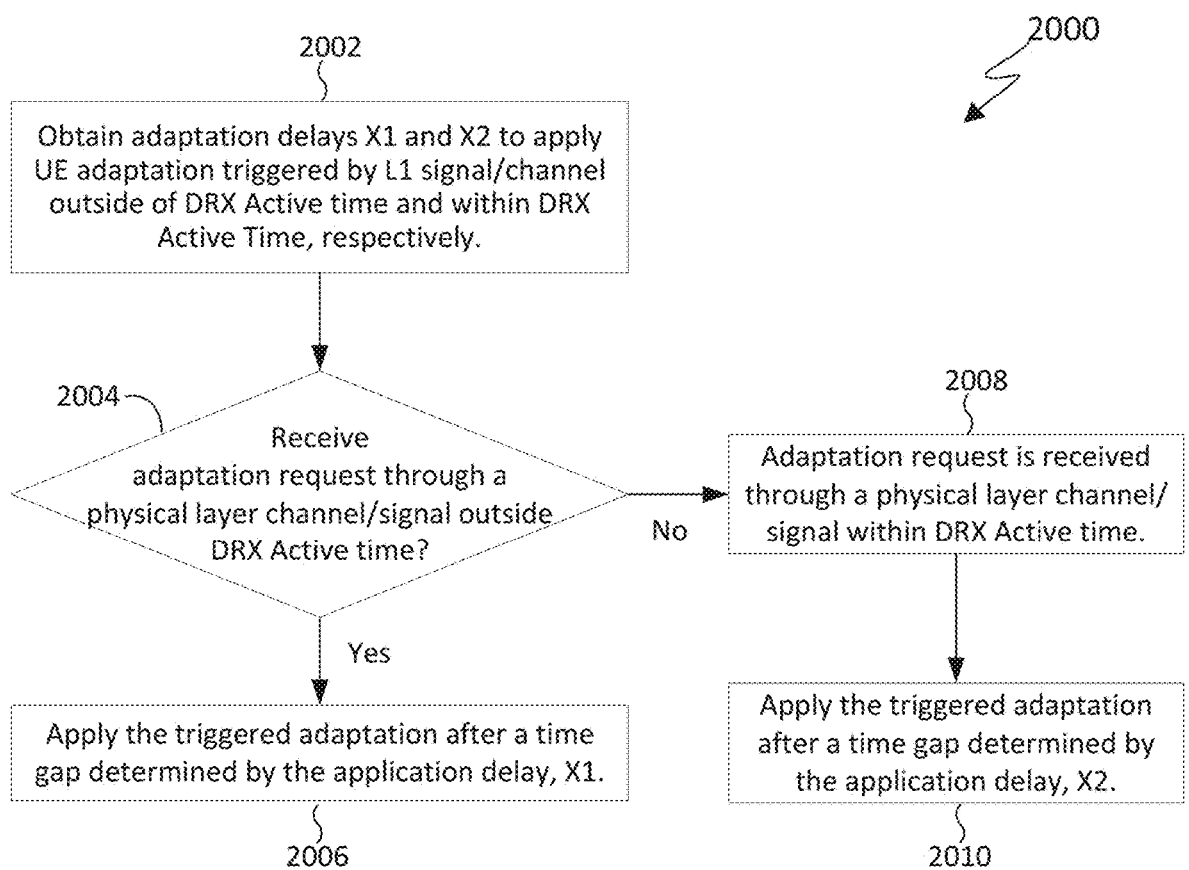
FIG. 20 illustrates a flowchart for applying an application delay by a UE when power saving signal/channel is monitored outside and inside of the DRX active time in accordance with various embodiments of this disclosure.

FIG. 20 illustrates a flowchart for applying an application delay by a UE when power saving signal/channel is monitored outside and inside of the DRX active time in accordance with various embodiments of this disclosure. Operations of flowchart 2000 can be implemented in a UE, such as UE 116 in FIG. 3.

Flowchart 2000 begins at operation 2002 by obtaining one or more application delays for applying UE adaptation triggered by a physical layer signal/channel within and outside Active Time of DRX cycle. In this non-limiting embodiment of FIG. 20, X1 is an adaptation delay outside of DRX Active time and X2 is an adaptation delay within DRX Active time.

In operation 2004 a determination is made as to whether the adaptation request is received through a physical layer channel/signal outside of the DRX Active time.

If the adaptation request is received through a physical layer channel/signal outside of the DRX Active time, e.g., a DCI format with CRC scrambled by a RNTI dedicated for power saving (PS-RNTI) then flowchart 2000 proceeds to operation 2006 where the triggered adaptation is applied after a time gap determined by the application delay X1. In one example, the UE is not expected to apply the applicable value(s) of minimum K0 and/or K2, and/or aperiodic CSI-RS triggering offset indicated by the DCI format, before the first slot index of PDCCH monitoring occasion within the next associated DRX Active Time. In another example, the UE is not expected to operate in the target BWP indicated by the DCI format before the first slot index within the next associated DRX Active Time. In this other example, the time offset between the last PDCCH monitoring occasion of the physical layer signal/channel to trigger the BWP switching outside of DRX Active Time and the start of next associated DRX ON duration should be no less than the BWP switching delay.

Returning to operation 2004, if the determination is made that the adaptation request is not received through a physical layer channel/signal outside of the DRX Active time, then flowchart 2000 proceeds to operation 2008 where the adaptation request is received through a physical layer channel/signal within the DRX Active time, e.g., a scheduling DCI format with CRC scrambled by C-RNTI. In operation 2010, the triggered adaptation is applied after a time gap determined by the application delay X2. For example, the UE is not expected to apply the indicated applicable value(s) of minimum K0 and/or K2, and/or aperiodic CSI-RS triggering offset before the slot where UE transmits HARQ ACK information for the PDSCH scheduled by the DCI format providing the UE adaptation request.

UE adaptation on one or more adaptive parameter(s) based on a signal/channel at physical layer can be reset to default value(s). The default value(s) can be either predefined in the specification or the system operation or configured by higher layer signaling.

In one example, the value(s) for associated adaptive parameter(s) can be reset to the default value(s) every $T_{reset}^{AR}$ milliseconds(s)/slot(s).

In another example, a UE can receives a higher layer command, e.g. MAC CE, to indicate reset of the adaptive parameters to default value(s).

In yet another example, the value(s) for associated adaptive parameter(s) can be reset to default value(s) if UE current value(s) is/are not invalid. For example, after BWP switching, the current value(s), such as minimum K0/K2/aperiodic CSI-RS may be larger than all configured candidate value(s) in the new active DL/UL BWP, and thus is/are not valid. In this case, UE can apply/reset the associated adaptive parameter to default value(s). When the invalid value is minimum K0/K2, the default value can be the minimum value of the used time domain resource allocation (TDRA) table in the new active DL/UL BWP.

A UE can determine a value for $T_{reset}^{AR}$ through one of the following examples.

In a first example, $T_{reset}^{AR}$ is fixed and defined in the specification of the system operation, e.g. $T_{gap}^{AR}$=100 ms.

In a second example, $T_{reset}^{AR}$ can be provided to the UE through higher layer signaling In a third example, $T_{reset}^{AR}$ can be provided to UE through higher layer signaling in response to assistance information of the preferred value on transmitted from UE to gNB.

To avoid an error case resulting from a UE failing to detect a signal/channel that can lead to the UE and a serving gNB having a different understanding of PDCCH candidates or search spaces sets that the UE monitors, such as the UE failing to detect a DCI format in a PDCCH that included a field providing an adaptation for a number of PDCCH candidates or for search space sets for the UE to monitor PDCCH, one of the following two examples can be implemented.

In one example, activation or deactivation of PDCCH candidates or of search space sets can be achieved according to a descending search space set index starting from the largest activated search space set index. The index of the search space set, s, that is triggered to be adapted by a DCI format transmitted by gNB, can be carried in a field of the DCI format. For example, one field with size of c1 in a DCI format for triggering the adaptation on PDCCH monitoring can be used to carry the information of mod(s, 2^c1), where c1 is either defined in the specification of the system operation, such that c1=1, or provided to a UE through higher layer signaling.

In another example, the DCI format can include a field with c2 bits, and the c2 bits can carry a counter, $x=0, 1, \ldots 2^{c2}-1$, such that $x=\mod(x'+1, 2^{c2})$, where $x'$ is the counter in previous DCI format transmitted by gNB.

Interpretation of DCI Content for UE Adaptation Signaling

Another embodiment of this disclosure considers interpretation of a DCI format for triggering UE adaptation at least for power saving purpose. A UE can receive a DCI format providing an adaptation for at least a power saving purpose. The UE can be configured with a location in the DCI format for one or more fields corresponding to the UE. One or more DCI fields can be bundled together to associated with a power saving scheme/technology. The bundled DCI fields can be activated or deactivated by higher layer signaling.

The fields of a DCI format for triggering UE adaptation can have a different interpretation depending on whether or not the UE detects the DCI format outside or during a DRX ON duration period or a location within a DRX ON duration period. When the UE detects a DCI format with fields for power saving before a DRX ON duration period, a first field of 1 bit can indicate whether or not the UE should wake up for next X>=1 DRX ON duration(s) or next X>=1 DRX cycles. In other words, the first field can indicate whether or not the UE skips PDCCH monitoring at a next X>=1 DRX ON duration(s)/cycles. X is a positive integer and can be defined in the specification of the system operation, e.g. X=1 or can be provided to the UE through higher layer signaling, or can be the number of DRX cycles within current periodicity of the DCI format and before the next monitoring occasion in the next periodicity. For example, "1" of the first field can indicate wake up and do not skip PDCCH monitoring for the next X DRX ON duration(s)/cycle(s); "0" of the first field can indicate go-to-sleep and skip PDCCH monitoring for the next X DRX ON duration(s)/cycle(s). For another example, "0" of the first field can indicate wake-up and do not skip PDCCH monitoring for the next X DRX ON duration(s)/cycle(s); "1" of the first field can indicate go-to-sleep and skip PDCCH monitoring for the next X DRX ON duration(s)/cycle(s). The remaining fields of a DCI format for triggering UE adaptation which is detected outside of DRX cycle can be interpreted based on the result of the first field according to the following rules.

Rule 1. When the UE does not wake up or skips PDCCH monitoring for next X DRX ON duration, another field or a second field of one or more bit(s) after the first field can indicate whether the UE wakes up for a number of next N1*Y DRX ON duration(s)/cycle(s) after the next X DRX ON duration(s)/cycle(s). In this case, the second field can consists of N1 binary bits wherein each bit indicate whether or not a UE should wake up for the ith set of Y consecutive DRX ON duration(s)/cycle(s) after the next X DRX ON duration(s)/cycle(s), i=0, ..., N1-1. N1 can be either predefined in the specification, e.g. N1=1, or provided to the UE through higher layer signaling. Y>=N1, can be either predefined in the specification of the system operation, e.g. Y=1, or provided to the UE through higher layer signaling.

Rule 2. When the UE wakes up or does not skip PDCCH monitoring for next X DRX ON duration, another field or a second field of N1' bits after the first field can indicate the active DL BWP. N1' can be either predefined in the specification of the system operation, e.g. N1'=1, or provided to the UE through higher layer signaling. When the UE wakes up or does not skip PDCCH monitoring for next X DRX ON duration, yet another field or a third field of N2' bits after the first or second field can indicate minimum K0/K2 for cross-slot scheduling, wherein K0/K2 indicate the slot offset between DCI and its scheduled PDSCH/PUSCH. N2' can be either predefined in the specification of the system operation, e.g. N2'=1, or provided to the UE through higher layer signaling. When the UE wakes up or does not skip PDCCH monitoring for the next X DRX ON duration, yet another field after the first field can be a joint adaptation indicator to trigger adaptation on multiple power consumptions aspects. In this case, a UE can be provided with an adaptation table to address adaptation on RRC parameters that are not configured per BWP but are essential to define different power consumption levels or power saving states. The joint adaptation indicator is the row index of the adaptation table, which indicate an adaptation on associated adaptive parameters. Table 2 shows an example an adaptation table with adaptation signaling on minimum K0/K2, maximum MIMO layers/ports, and active CC group. The configured active cells can be grouped by gNB, and the cell group index can be included in the adaptation table.

TABLE 2

| Joint adaptation indicator | Mini K0/K2 | Maximum MIMO layers/ports | Active CC group Index | Notes |
| --- | --- | --- | --- | --- |
| 0 | 4 | 1 | 1 | Very high power saving state/level |
| 1 | 2 | 2 | 2 | High power saving state/level |
| 2 | 1 | 3 | 3 | medium power saving state/level |
| 3 | 0 | 4 | 4 | low power saving state |

Figure 21:
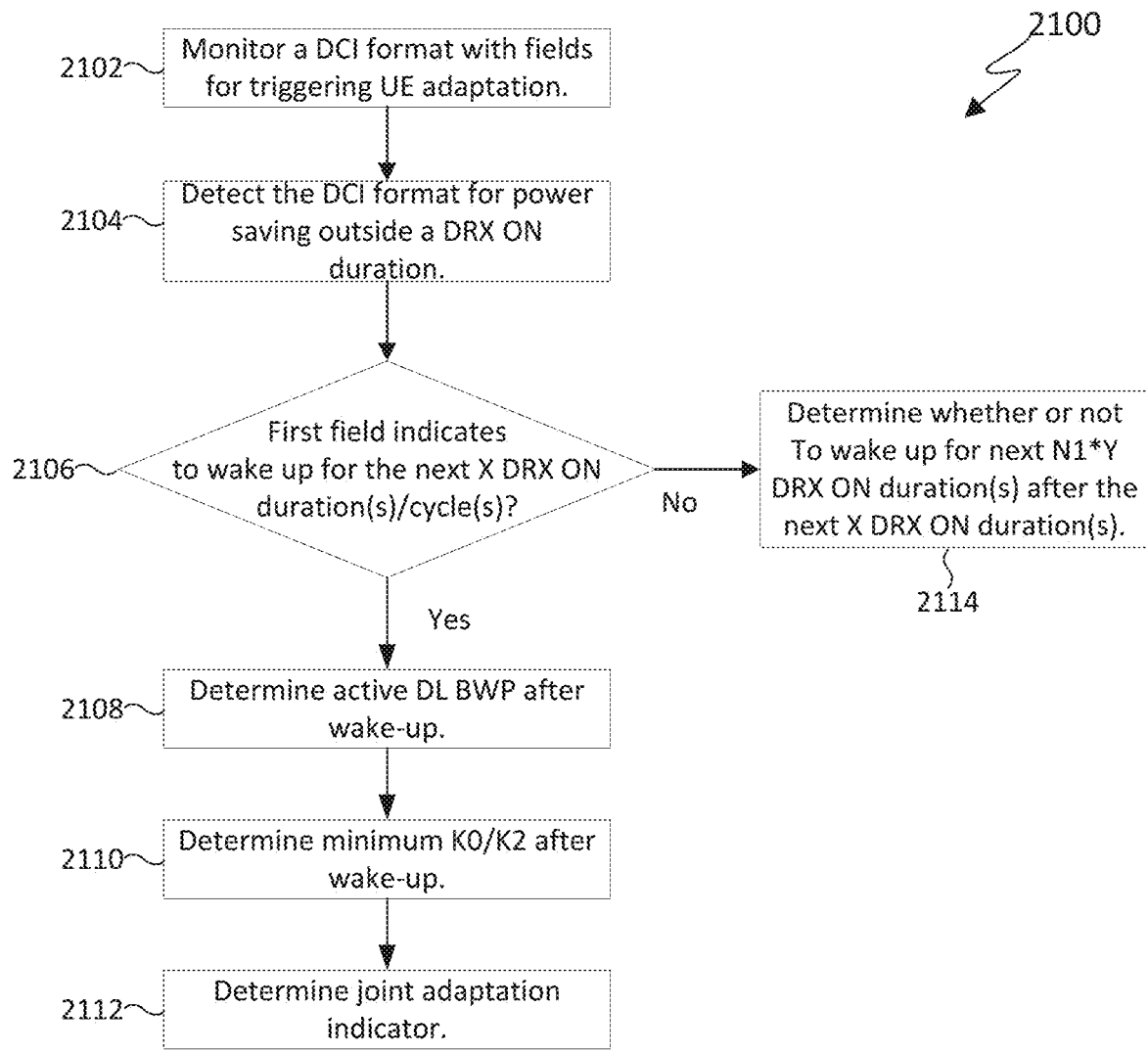
FIG. 21 illustrates a flowchart for interpretation of a PS-DCI detected outside of the DRX active time by a UE in accordance with various embodiments of this disclosure.

FIG. 21 illustrates a flowchart for interpretation of a PS-DCI detected outside of the DRX active time by a UE in accordance with various embodiments of this disclosure. Operations of flowchart 2100 can be implemented in a UE, such as UE 116 in FIG. 3.

Flowchart 2100 begins at operation 2102 by monitoring a DCI format with fields for triggering UE adaptation. In one embodiment, the UE adaptation can be for power savings. In operation 2104, a DCI format for power saving is detected outside of a DRX ON duration. The DCI format can be detected with a successful CRC check. A determination is made in operation 2106 as to whether a first field indicates to wake up for the next X DRX ON duration(s)/cycle(s). In one embodiment, the first field can include a binary bit that triggers the UE adaptation for power savings.

If the determination made in operation 2106 indicates that a UE should wake up for the next X DRX ON duration(s)/cycle(s), then flowchart 2100 proceeds to operation 2108 where an active DL BWP is determined after wake-up. In operation 2110, a minimum K0/K2 is determined after wakeup, and in operation 2112, a joint adaptation indicator is determined. The active DL BWP, the minimum K0/K2, and the joint adaptation indicator can be determined based on binary bits included in the same field, e.g., a second field. Alternatively, the binary bits can be in different fields in the detected DCI formats.

Returning to operation 2106, when the first field indicates the UE not to wake up for the next X DRX ON duration(s)/cycle(s), i.e., to skip PDCCH monitoring or go to sleep for next X DRX ON duration(s), then flowchart 2100 proceeds to operation 2114 where the UE determines whether or not to wake up for the next N1*Y DRX ON duration(s)/cycle(s) after the next X DRX ON duration(s). The determination can be made based on the binary bits in same field as the one that includes the active DL BWP, the minimum K0/K2, and the joint adaptation indicator, i.e., in the second field. Alternatively, the binary bits can be in a different field.

When the UE detects a DCI format with fields for triggering UE adaptation at the beginning of a DRX ON duration period or within the first K slots/milliseconds of the DRX on duration, a field or first field of 1 bit can indicate whether or not the UE go to sleep or skips PDCCH monitoring for the remaining Active Time of current DRX cycle. In one example, "1" of the first field can indicate go-to-sleep and skip PDCCH monitoring for the remaining Active Time of current DRX cycle; "0" of the first field can indicate continue PDCCH monitoring and do not go to sleep for the remaining Active Time of current DRX cycle. In another example, "0" of the first field can indicate go-to-sleep and skip PDCCH monitoring for the remaining Active Time of current DRX cycle; "1" of the first field can indicate continue PDCCH monitoring and do not go to sleep for the remaining Active Time of current DRX cycle. K slots/milliseconds can be either defined in the specification of the system operation, for example, K=1, or provided to the UE through higher layer signaling. The remaining fields of the DCI format for triggering UE adaptation which is detected at the beginning of a DRX ON duration period or within the first K slots/milliseconds of the DRX on duration can be interpreted based on the result of the first field according to the following rules.

Rule 1. When the UE goes to sleep or skips PDCCH monitoring for the remaining Active Time of current DRX cycle, another field or a second field of N1 bit(s) can indicate whether the UE skips PDCCH monitoring for a number of next N1*Y DRX ON durations after the Active Time of current DRX cycle. The field can consists of N1 binary bit, and each of the N1 bit indicates whether or not the UE can skip PDCCH monitoring for the ith set, i=0, 1, . . . , N1−1, of Y consecutive DRX ON duration(s)/cycle(s). Any of N1/Y can be either predefined in the specification of the system operation, e.g. N1=1/Y=1, or provided to the UE through higher layer signaling.

Rule 2. When the UE does not go to sleep or skip PDCCH monitoring for the remaining Active Time of current DRX cycle, another field or a second field of N1' bits after the first field can indicate the active DL BWP. N1' can be either predefined in the specification of the system operation, e.g. N1'=1, or provided to the UE through higher layer signaling. When the UE does not go to sleep or skip PDCCH monitoring for the remaining Active Time of current DRX cycle, yet another field or a third field of N2' bits after the first or second field can indicate minimum K0/K2 for cross-slot scheduling, wherein K0/K2 indicate the slot offset between DCI and its scheduled PDSCH/PUSCH. N2' can be either predefined in the specification of the system operation, e.g. N2'=1, or provided to the UE through higher layer signaling. When the UE does not go to sleep or skip PDCCH monitoring for the remaining Active Time of current DRX cycle, yet another field after the first field can be a joint adaptation indicator to trigger adaptation on multiple power consumptions aspects. In this case, a UE can be provided with an adaptation table to address adaptation on RRC parameters that are not configured per BWP but are essential to define different power consumption levels or power saving states.

Figure 22:
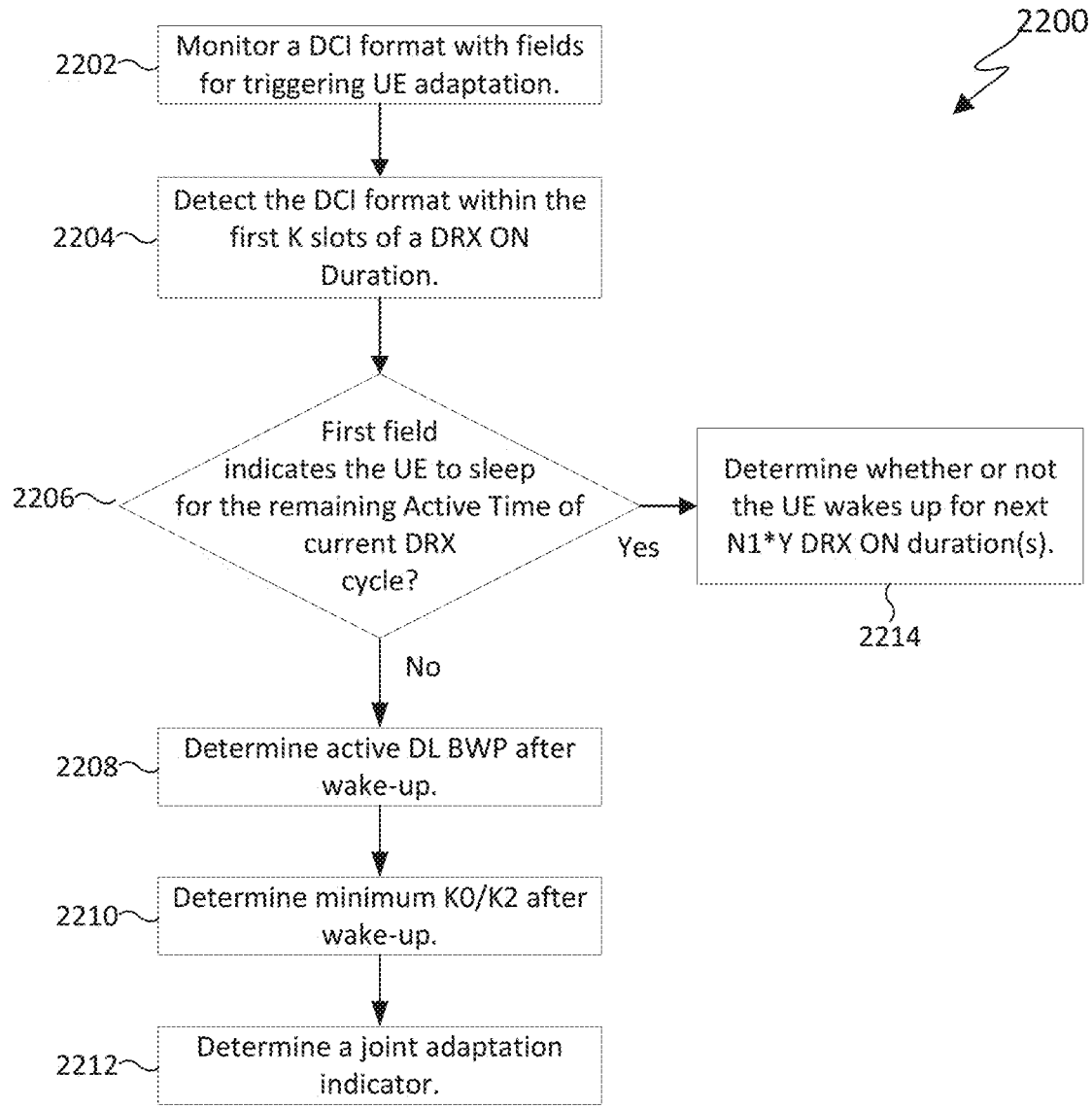
FIG. 22 illustrates a flowchart for detecting a DCI format by a UE at the beginning of a DRX ON duration for triggering UE adaptation in accordance with various embodiments of this disclosure.

FIG. 22 illustrates a flowchart for detecting a DCI format by a UE at the beginning of a DRX ON duration for triggering UE adaptation in accordance with various embodiments of this disclosure. Operations of flowchart 2200 can be implemented in a UE, such as UE 116 in FIG. 3.

Flowchart 2200 begins at operation 2202 by monitoring a DCI format with fields for triggering UE adaptation. In operation 2204, the DCI format is detected within the first K slots of a DRX ON duration. In operation 2206, a determination is made whether to go to sleep for the remaining Active Time of current DRX cycle. In one embodiment, the determination is made based on a binary bit in the first field for triggering UE adaptation.

If the first field indicates that a UE should not go to sleep for the remaining Active Time of current DRX cycle, i.e., continue PDCCH monitoring, then flowchart 2200 proceeds from operation 2206 to operation 2208 where the active DL BWP is determined after wake-up. In operation 2210, a minimum K0/K2 is determined after wake-up, and in operation 2212, a joint adaptation indicator is determined. The active DL BWP, minimum K0/K2, and the joint adaptation indicator can be determined based on an information bit in the same field, i.e., a second field, or based on information bits in different fields.

Returning to operation 2206, if the determination is made that the first field indicates that the UE should go to sleep for the remaining Active Time of the current DRX cycle, i.e., skip PDCCH monitoring, then flowchart 2200 proceeds from operation 2206 to operation 2214 where a determination is made whether to wake up for the next N1*Y DRX ON duration(s) after the Active Time of current DRX cycle. In one embodiment, this determination can be made based on the information bits in another field/second field.

When a UE detects a DCI format with fields for triggering UE adaptation during a DRX Active Time or after the first K slots/milliseconds of a DRX ON duration or when a DRX is not configured, the fields in the DCI format can be interpreted as indicating UE adaptation without association from DRX operation. K can be either defined in the specification of the system operation, for example, K=1, or provided to the UE by higher layer. The content of DCI format can be any of the following examples.

In a first example, a field or first field of 1 binary bit can indicate whether or not the UE skips PDCCH monitoring for X PDCCH monitoring occasions, periodicities, milliseconds, and/or slots in respective search space sets that can be adapted by the DCI format. X can be either predefined in the specification of the system operation, e.g. X=10, or can be provided to the UE through higher layer signaling. For example, "1" of the first field can indicate UE skips PDCCH monitoring for X PDCCH monitoring occasions, periodicities, milliseconds, and/or slots; "0" of the first field can indicate UE does not skip PDCCH monitoring for X PDCCH monitoring occasions, periodicities, milliseconds, and/or slots. For another example, "0" of the first field can indicate UE skips PDCCH monitoring for X PDCCH monitoring occasions, periodicities, milliseconds, and/or slots; "1" of the first field can indicate UE does not skip PDCCH monitoring for X PDCCH monitoring occasions, periodicities, milliseconds, and/or slots. The remaining fields of the DCI format for triggering UE adaptation can be interpreted based on the result of the first field according to the following rules.

Rule 1. When the UE is triggered to skip PDCCH monitoring for X PDCCH monitoring occasions, periodicities, milliseconds, and/or slots, another field or a second field of N1 bit(s) can indicate whether the UE skips PDCCH monitoring for additional time period after the X PDCCH monitoring occasions, periodicities, and/or slots. For example, the second field can be N1 bits and indicates whether or not the UE can skip PDCCH monitoring for a number of next N1*Y PDCCH monitoring occasions and/or periodicities after the X PDCCH monitoring occasions, periodicities, and/or slots. In this case, each of the N1 bits can indicate whether or not the UE can skip PDCCH monitoring for the ith (i=0,1, . . . , N1−1) set of Y consecutive PDCCH monitoring periodicities/occasions Any of N1/Y can be either predefined in the specification of the system operation, e.g. N1=1/Y=1, or provided to the UE through higher layer signaling. For another example, the second field can be N1 bits, and can indicate one of $2^{N1}$ preconfigured time periods that the UE can skip PDCCH monitoring in the respective search space set after.

Rule 2. When the UE is triggered to not go to sleep or continue PDCCH monitoring for X PDCCH monitoring occasions/periodicities, another field or a second field of N1' bits after the first field can indicate adaptation on PDCCH monitoring periodicity. N1' can be either predefined in the specification of the system operation, e.g. N1'=1, or provided to the UE through higher layer signaling. When the UE does not go to sleep or skip PDCCH monitoring for the remaining Active Time of current DRX cycle, yet another field or a third field of N2' bits after the first or second field can indicate minimum K0/K2 for cross-slot scheduling, wherein K0/K2 indicate the slot offset between DCI and its scheduled PDSCH/PUSCH. N2' can be either predefined in the specification of the system operation, e.g. N2'=1, or provided to the UE through higher layer signaling. When the UE does not go to sleep or skip PDCCH monitoring for the remaining Active Time of current DRX cycle, yet another field or a third field of N3' bits after the first or second field can indicate adaptation on PDCCH candidates per CCE AL for respective search space sets. The respective search space sets can be either defined in the specification of system operation or provided to the UE through higher layer signaling. N3' can be either predefined in the specification of the system operation, e.g. N3'=1, or provided to the UE through higher layer signaling.

In a second example, a field of N1>=1 bits can indicate one of $2^{N1}$ joint candidate adaptations associated with multiple adaptive parameters related to PDCCH monitoring in respective search space sets that can be adapted by the DCI format. The $2^{N1}$ candidate adaptations can be either predefined in the specification of the system operation, for example, N1=2, Table 3, or provided to the UE through higher layer signaling. A related adaptive parameter can be minimum PDCCH monitoring periodicity for respective search space sets. In this case, for a respective search space s with a PDCCH monitoring periodicity less than X, UE will assume the PDCCH monitoring periodicity is adapted to X when the UE receives the DCI format indicating the minimum PDCCH monitoring periodicity of X. Another related adaptive parameter can be maximum number of PDCCH candidates per CCE AL in respective search space sets. In this case, for a respective search space s with PDCCH candidates per CCE AL that is larger than Y, UE will assume the PDCCH candidates per CCE AL is adapted to Y when the UE receives the DCI format indicating the maximum PDDCH candidates of Y.

TABLE 3

| DCI field | Minimum PDCCH monitoring periodicity,/slot | Maximum PDCCH candidates per AL |
| --- | --- | --- |
| 00 | T = 1 | 16 |
| 01 | T = 2 | 8 |
| 10 | T = 3 | 4 |
| 11 | T = 4 | 2 |

In a third example, a field can indicate a minimum scheduling delay offset, i.e. minimum applicable value of K0 or K2.

In a fourth example, a field can indicate a minimum processing timeline offset. The field can be c1 bit to indicate $2^{c1}$ preconfigured a list of candidate values. The minimum processing time offset can indicate any of the following:
  minimum applicable value of K0;
  minimum applicable value of K2;
  minimum applicable value of aperiodic CSI-RS triggering offset;
  minimum applicable value of SRS slot offset; and/or
  minimum applicable value of K1.

In a fifth example, the DCI format can include any of the following fields to trigger adaptation on PDCCH monitoring associated with a search space set s in CORESET p:
  a field with c1 bit to indicate the associated search space set index, s, for adaptation. For example, mod(s, $2^{c1}$) is carried in the DCI, where c1 can either be defined in the specification of the system operation, for example, c1=1, or provided to a UE by higher layer signaling;
  a field with 1 bit to indicate deactivation or activation of search space set s;
  a field with 1 bit to indicate deactivation or activation of CORESET p, associated with search space set s;
  a field with 1 bit to indicate scaling of the monitoring periodicity of search space set s, e.g., "0" indicate reduce the monitoring periodicity of search space set by half, "1" indicate double the monitoring periodicity of search space set s;
  a field with 1 bit to indicate scaling on the monitoring duration of search space set s, e.g., "0" indicate reduce the monitoring duration of search space set by half, "1" indicate double the monitoring duration of search space set s;
  a field with c2 bits to indicate the activated or deactivated CCE ALs, where c2 can either be defined in the specification of the system operation, for example, c2=2, or provided to a UE by higher layer signaling; and/or
  a field with c3 bits to indicate the activated or deactivated PDCCH candidates per CCE AL, where c3 can either be defined in the specification of the system operation, for example, c3=2, or provided to a UE by higher layer signaling.

In a sixth example, the DCI format can include any of the following fields to trigger adaptation on PDCCH monitoring in one or more respective search space set(s):
  a field with c4 bits to indicate the number of cells to monitoring PDCCH candidates, where c4 can either be defined in the specification of the system operation, for example, c4=2, or provided to a UE by higher layer signaling;
  a field with c5 bits to indicate the scaling on maximum number of monitored PDCCH candidates per slot and per serving cell, where c5 can either be defined in the specification of the system operation, for example, c5=2, or provided to a UE by higher layer signaling;

a field with c6 bits to indicate the active DL BWP, where c6 can either be defined in the specification of the system operation, for example, c6=2, or provided to a UE by higher layer signaling;

a field with 1 bit to indicate whether or not UE skips monitoring PDCCH for N slots/milliseconds, where N can be defined in the specification of the system operation, such that N=1, or provided to a UE by higher layer signaling; and/or a field with c7 bits to indicate a sleep duration, T_sleep, where UE do not monitor PDCCH in any respective search space sets within the indicated sleep duration. For example, c7 bit can indicate 2^c7 candidate sleep durations, where c7 and candidate sleep durations can be either defined in the specification of the system operation or provided to a UE by higher layer signaling.

Figure 23:
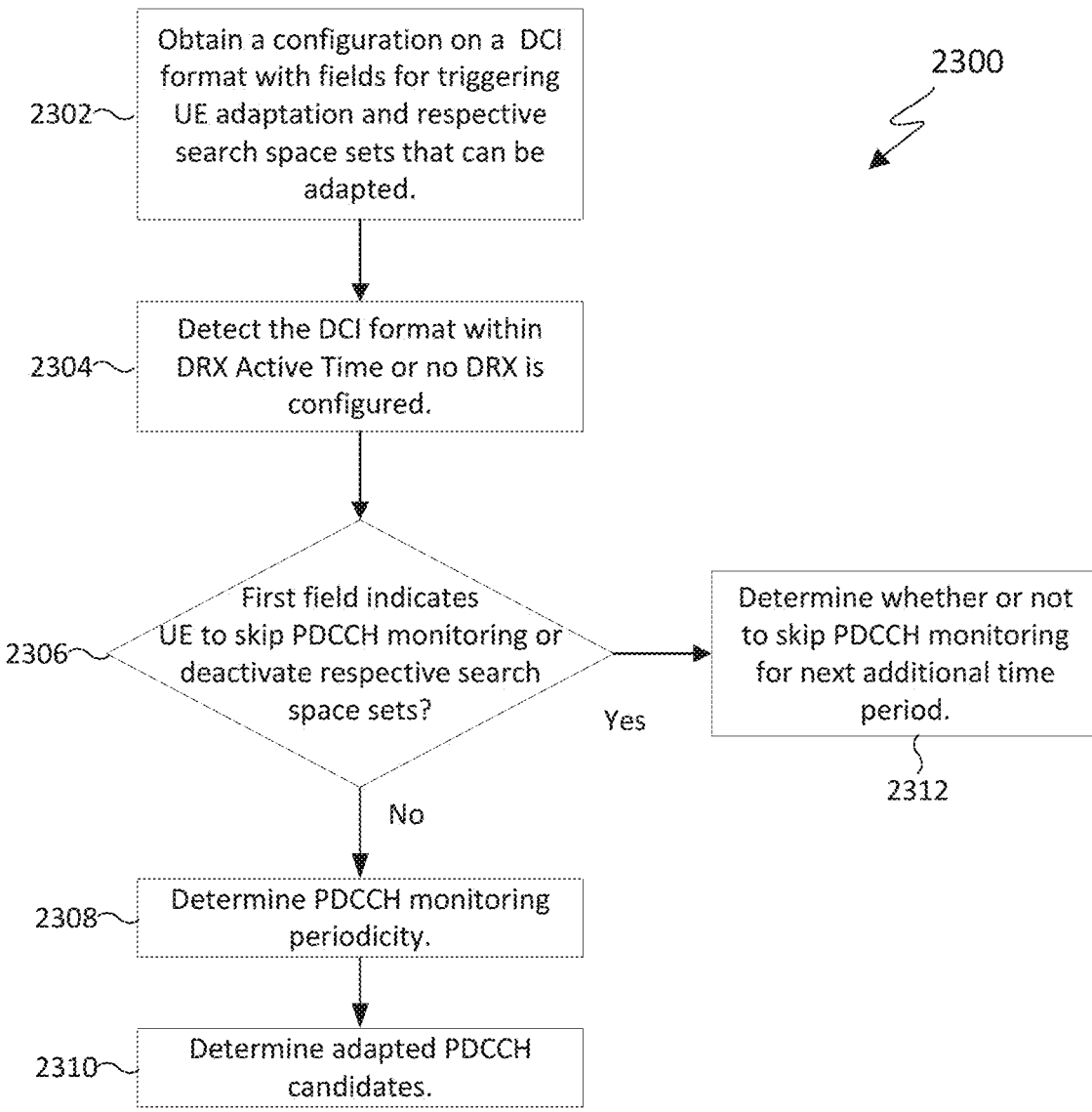
FIG. 23 illustrates a flowchart for detecting a DCI format by a UE within the DRX Active Time for power saving in accordance with various embodiments of this disclosure.

FIG. 23 illustrates a flowchart for detecting a DCI format by a UE within the DRX Active Time for power saving in accordance with various embodiments of this disclosure. Operations of flowchart 2300 can be implemented in a UE, such as UE 116 in FIG. 3.

Flowchart 2300 begins at operation 2302 by obtaining a configuration on a DCI format with fields for triggering UE adaptation and respective search space sets that can be adapted. In operation 2304, a DCI format within the DRX Active Time is detected or no DRX is configured. In one embodiment, the DCI format is detected with a successful CRC check within the DRX Active Time. In operation 2306 a determination is made as to whether a first field indicates to skip PDCCH monitoring or deactivate respective search space sets. For example, the determination can be for skipping PDCCH monitoring in the respective search space set(s) for a time period, such as X PDCCH monitoring occasions, periodicities, slots, and/or milliseconds.

If the first field associated with adaptation signaling indicates not to skip PDCCH monitoring, then flowchart 2300 proceeds from operation 2306 to operation 2308 where the PDCCH monitoring periodicity is determined, and then to operation 2310 where the adapted PDCCH candidates per CCE AL is determined for the respective search space sets that are not deactivated.

If the first field associated with adaptation signaling indicates to skip PDCCH monitoring, then flowchart 2300 proceeds to operation 2312 to determine whether PDCCH monitoring should be skipped for an additional time period, such as the next N1*Y PDCCH monitoring occasions/periodicities/slots/milliseconds after the deactivated time period indicated by the first field. The determination can be made based on information bits included in a second field, or another field.

Determination of PDCCH Monitoring Occasion for Triggering UE Adaptation Associated with DRX Operation Another embodiment of this disclosure considers determination of monitoring occasion of signal/channel at physical layer for triggering UE adaptation associated with DRX operation in RRC_CONNECTED state. For example, the signal/channel can be a DCI format transmitted to UE through PDCCH.

A UE can be configured with a PDCCH based signal/channel in a search space set s for triggering UE adaptation with association with DRX operation in RRC_CONNECTED state, the UE can determine a PDCCH monitoring occasion on an active DL BWP from the PDCCH monitoring periodicity, the PDCCH monitoring offset, and the PDCCH monitoring pattern within a slot. The UE determines that a PDCCH monitoring occasion(s) for the signal/channel in the respective search space sets exists in a slot with number $n_{s,f}^{\mu}$ REF1 in a frame with number $n_f$ if $(n_f N_{slot}^{frame,\mu} + n_{s,f}^{\mu} - o_s)$ mod $k_s=0$. The value X is applicable as candidate value for PDCCH monitoring periodicity of search space set s, i.e. monitoringSlotPeriodicityAndOffset in REF7, only if X is multiples of configured DRX cycle in the unit of slots, T_DRX, such that MOD(X,T_DRX)=0. The value Y is applicable as candidate value for PDCCH monitoring offset of search space set s, only if $o_s<=O\_DRX$, where O_DRX is the configured delay/offset of a DRX cycle. The signal/channel can be applied to long DRX cycle only. In this case, when only short DRX cycle is configured, UE does not expect to monitor the signal/channel for triggering adaptation associated with DRX operation. When a UE is configured to monitor a DCI format for triggering UE adaptation associated with DRX operation in search space set s, with duration $T_s$, the UE monitors the DCI format in search space set s for $T_s$ consecutive slots, starting from slot $n_{s,f}^{\mu}$, and does not monitor the DCI format in search space set s for the next $k_s-T_s$ consecutive slots.

A UE can determine the number of PDCCH monitoring occasions for transmitting a PS-DCI to trigger UE adaptation associated with DRX operation per a PDCCH monitoring periodicity, N_MOs, according to the configured duration, $T_s$, and PDCCH monitoring pattern within a slot of associated search space set s, such that N_MOs=$T_s$*N^MOs_slot, where N^MOs_slot is the number of PDCCH monitoring occasions within a slot indicated by the configured PDCCH monitoring pattern, or the number of start OFDM symbol within a slot associated with search space set s.

The UE can expect only same content of a PS-DCI for triggering UE adaptation associated with DRX operation can be transmitted within a PDCCH periodicity. Regarding the number of repetitions, the number of repetitions of the DCI format can be transparent to the UE. In this case, the UE can skip PDCCH monitoring for the DCI format in the remaining monitoring occasions within a periodicity if the UE detects the DCI format from one of the N_MOs monitoring occasions. Alternatively, the UE can assume that the DCI format for triggering UE adaptation associated with DRX operation is repeated over the N_MOs monitoring occasions within a periodicity.

When the number of PDCCH monitoring occasions within a periodicity, N_MOs, is larger than one, a multi-beam operation can be supported to transmit the DCI format for triggering UE adaptation associated with DRX operation. In multi-beam operation, a UE can determine the QCL assumptions for the N_MOs>1 PDCCH monitoring occasions through one of the following examples.

In a first example, the UE can assume that QCL assumption of PDCCH for transmitting the DCI format changes every C1 monitoring occasions within a PDCCH periodicity. In this case, the maximum of [N_MOs/C1] different QCL assumptions can be transparent to the UE. Alternatively, the UE can be provided with a list of [N_MOs/C1] TCI states through higher layer signaling to indicate the QCL assumption of the [N_MOs/C1] subset of PDCCH monitoring occasions wherein the ith (i=0,1, [N_MOs/C1]-1) TCI state from the list indicate the QCL assumption for the ith (I=0,1, . . . , [N_MOs/C1]-1) subset with maximum of C1 monitoring occasions. C1 is a positive integer, and can be either defined in the specification, e.g. C1=1, or be provided to the UE through higher layer signaling.

In a second example, the UE can assume that QCL assumption of PDCCH for transmitting the DCI format cycles every C1 monitoring occasions within a PDCCH periodicity. In this case, a UE can be provided with a list of

[N_MOs/C1] TCI states by higher layer signaling, and a UE can be provided with the index of the first TCI state, I_0, by higher layer signaling. The UE can determines the QCL assumption for the ith (i=0,1, [N_MOs/C1]−1) subset of maximum of C1 monitoring occasions based on I_0, such that the (I_0+i)th TCI state from the list indicate the QCL assumption for the ith subset of maximum of C1 monitoring occasions. I_0 can be reconfigured by a MAC CE. C1 is a positive integer, and can be either defined in the specification, e.g. C1=1, or be provided to the UE through higher layer signaling.

In a third example, the UE can assume N_MOs equals to the number of actual transmitted SS/PBCH blocks determined according to ssb-PositionsInBurst in SIB1. The $i^{th}$ PDCCH monitoring occasion for the DCI format within a periodicity corresponds to the $i^{th}$ transmitted SS/PBCH block, and is QCLed with the $i^{th}$ transmitted SS/PBCH block. The QCL type between the $i^{th}$ transmitted SS/PBCH block and the $i^{th}$ PDCCH monitoring occasion can be QCL-TypeA/QCL-TypeB/QCL-TypeC/QCL-TypeD, and can be provided to the UE through higher layer signaling.

Figure 24:
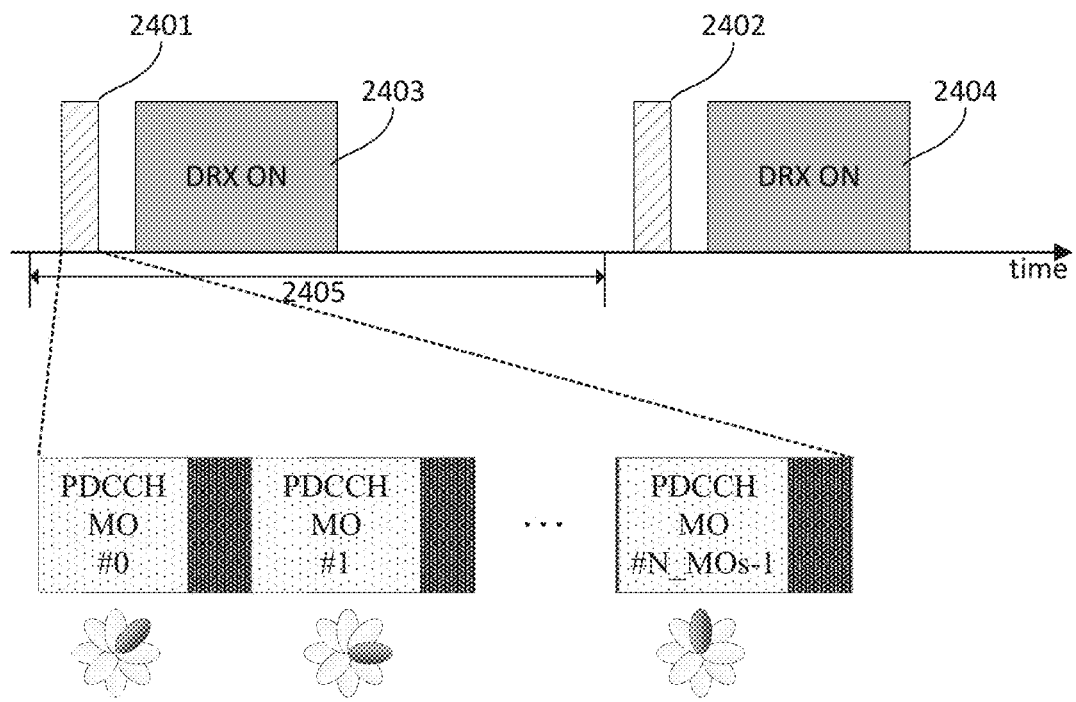
FIG. 24 illustrates a multibeam transmission on the DCI format for triggering UE adaptation associated with DRX operation through N_MOs>1 PDCCH monitoring occasions per PDCCH monitoring periodicity in accordance with various embodiments of this disclosure.

FIG. 24 illustrates a schematic of multibeam transmission on the DCI format for triggering UE adaptation associated with DRX operation through N_MOs>1 PDCCH monitoring occasions per PDCCH monitoring periodicity in accordance with various embodiments of this disclosure. A UE, such as UE 116 in FIG. 3, can be configured with a search space set for transmitting DCI format to trigger UE adaptation associated with DRX operation.

The UE can be configured with N_MOs>1 PDCCH monitoring occasions within a PDCCH monitoring periodicity. For example, monitoring periodicity 2405 can include monitoring occasion 2401 and an associated DRX ON duration 2403. A subsequent monitoring periodicity can include monitoring occasion 2402 and an associated DRX ON duration 2404. The UE expects that a DCI format for triggering UE adaptation associated with DRX operation is repeated over the N_MOs>=1 PDCCH monitoring occasions within a PDCCH monitoring periodicity. The QCL assumptions for the N_MOs>1 PDCCH monitoring occasions can be different, for example, with beam direction directions or different spatial parameters.

For a PDCCH monitoring occasion outside of DRX ON duration/Active Time for transmitting a DCI format to trigger UE adaptation associated with DRX operation, a UE can skip monitoring the PDCCH occasion when the PDCCH monitoring occasion is overlapped with the Active Time of the previous DRX cycle.

In one aspect of skipping monitoring physical layer signal/channel for triggering UE adaptation associated with DRX operation in RRC_CONNECTED state. When a UE is configured with N>=1 PDCCH monitoring occasions prior to an ON duration of a DRX cycle for transmitting a DCI format to trigger UE adaptation associated with the DRX cycle. An ON duration is time period with duration indicated by a drx-onDurationTimer parameter. In one example of UE adaptation, the UE adaptation can be whether or not to wake up for the ON duration, i.e. whether or not to start the drx-onDurationTimer of the ON duration. The UE skips decoding the DCI format in a PDCCH monitoring occasion from the N>=1 PDCCH monitoring occasions if the PDCCH monitoring occasion is overlapped with extended Active Time of an ON duration from a previous DRX cycle. When all the N>=1 PDCCH monitoring occasions are skipped due to overlapping with the extended Active Time of ON duration from the previous DRX cycle, the UE assume no any UE adaptation for the DRX cycle. In one example when all the N>=1 PDCCH monitoring occasions are skipped, if the UE adaptation is whether or not to wake up for the ON duration, the UE wakes up for the ON duration, i.e. starts the drx-onDurationTimer of the ON duration.

When a UE is configured with more than one drx-onDurationTimer parameters corresponding to more than one DRX ON durations, the UE assumes any of the following approaches if a PDCCH monitoring occasion out from the N>=1 PDCCH monitoring occasions is overlapped with extended Active Time of an ON duration from the more than one ON durations associated with previous DRX cycle:

In a first approach, the UE skips the PDCCH monitoring occasion out from the N>=1 PDCCH monitoring occasions, if the extended Active is from a predetermined ON duration, wherein the UE doesn't expect to receive PDCCH for triggering UE adaptation associated with DRX operation in any Active Time of the predetermined ON duration. For example, the predetermined ON duration is the ON duration on the primary cell.

In a second approach, the UE skips the PDCCH monitoring occasion out from the N>=1 PDCCH monitoring occasions if the extended Active Time is from any ON duration out from the more than one ON durations.

Figure 25:
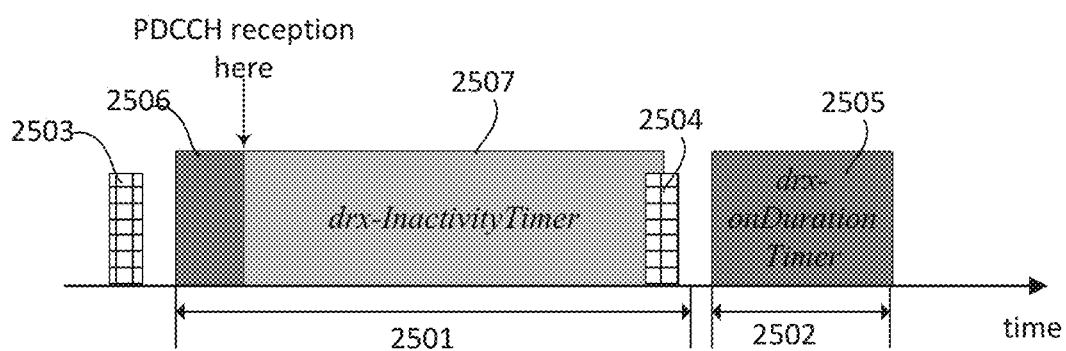
FIG. 25 illustrates a PDCCH monitoring occasion outside of DRX ON duration that is overlapped by the dynamic Active Time of the previous DRX cycle in accordance with various embodiments of this disclosure.

FIG. 25 illustrates a schematic diagram for a PDCCH monitoring occasion outside of DRX ON duration that is overlapped by the dynamic Active Time of the previous DRX cycle in accordance with various embodiments of this disclosure. The monitoring can be performed by a UE, such as UE 116 in FIG. 3.

The UE determines a PDCCH monitoring occasion 2503/2504 outside of DRX ON duration 2505/2506. When an Active Time of a DRX cycle is extended, for example drx-InactivityTimer 2507 is restarted, and the extended Active Time of a DRX cycle overlaps with PDCCH monitoring occasion 2504 associated with next DRX cycle, the UE can skip monitoring the overlapped PDCCH monitoring occasion 2504, and the UE does not expect to receive any DCI format to trigger UE adaptation associated with DRX operation.

In another aspect of skipping monitoring physical layer signal/channel for triggering UE adaptation associated with DRX operation in RRC_CONNECTED state. When a UE is configured with N>=1 PDCCH monitoring occasions within a time period prior to an ON duration of a DRX cycle for transmitting a DCI format to trigger UE adaptation associated with the DRX cycle. An ON duration is time period with duration indicated by a drx-onDurationTimer parameter. In one example of UE adaptation, the UE adaptation can be whether or not to wake up for the ON duration, i.e. whether or not to start the drx-onDurationTimer of the ON duration. The UE skips decoding the DCI format in any of the N>=1 PDCCH monitoring occasions within the time period if the time period is overlapped with extended Active Time of an ON duration from a previous DRX cycle, and the UE assume no any UE adaptation for the DRX cycle. In one example, if the UE adaptation is whether or not to wake up for the ON duration, when the N>=1 PDCCH monitoring occasions during the time period are skipped, the UE wakes up for the ON duration, i.e. starts the drx-onDurationTimer of the ON duration.

When a UE is configured with more than one drx-onDurationTimer parameters corresponding to more than one DRX ON durations, the UE assumes any of the following approaches if the time period for N>=1 PDCCH monitoring occasions prior to an ON duration of a DRX cycle is overlapped with extended Active Time of an ON duration from the more than one ON durations associated with previous DRX cycle:

In a first approach, the UE skips the N>=1 PDCCH monitoring occasions if the extended Active is from a predetermined ON duration, wherein the UE doesn't expect to receive PDCCH for triggering UE adaptation associated with DRX operation in any Active Time of the predetermined ON duration. For example, the predetermined ON duration is the ON duration on the primary cell.

In a second approach, the UE skips the N>=1 PDCCH monitoring occasions if the extended Active Time is from any ON duration out from the more than one ON durations.

For a PDCCH monitoring occasion outside of DRX ON duration for transmitting a DCI format to trigger UE adaptation associated with next one or more DRX cycle(s), a UE can skip monitoring the PDCCH occasion when the UE detects a DCI format in previous PDCCH monitoring occasion that triggers the UE to skip waking up for at least one of the associated DRX cycle(s).

For N_MOs>=1 PDCCH monitoring occasions outside DRX ON duration or Active Time for transmitting a DCI format to trigger UE adaptation associated with DRX operation, if there is partial overlap between SS/PBCH blocks and the N_MOs PDCCH monitoring occasions, the UE can start monitoring PDCCH in the first PDCCH monitoring occasion after the SS/PBCH blocks. The overlapped PDCCH occasions can be skipped but is still counted as PDCCH monitoring occasions when UE determines the index of the PDCCH monitoring occasions. Alternatively, when there is an overlap between SS/PBCH blocks and the N_MOs PDCCH monitoring occasions, the first occasion after the SS/PBCH blocks can be counted as the first PDCCH monitoring occasion, and UE monitors up to N_MOs consecutive PDCCH monitoring occasions before the start of a the first associated DRX ON duration.

Determination of PDCCH Monitoring Occasion for Triggering UE Adaptation without Association with DRX Operation Another embodiment of this disclosure considers determination of monitoring occasion of signal/channel at physical layer for triggering UE adaptation without association with DRX operation in RRC_CONNECTED state. For example, the signal/channel can be a DCI format transmitted to UE through PDCCH.

A UE can be configured with a PDCCH based signal/channel in a search space set s for triggering UE adaptation without association with DRX operation in RRC_CONNECTED state, the UE can determine a PDCCH monitoring occasion on an active DL BWP from the PDCCH monitoring periodicity, the PDCCH monitoring offset, and the PDCCH monitoring pattern within a slot. The UE determines that a PDCCH monitoring occasion(s) for the signal/channel in the respective search space sets exists in a slot with number $n_{s,f}^{\mu}$ REF 1 in a frame with number $n_f$ if $(n_f N_{slot}^{frame,\mu} + n_{s,f}^{\mu} - o_s)$ mod $k_s=0$. When the respective search space set s is configured with duration $T_s$, the UE monitors the DCI format in search space set s for $T_s$ consecutive slots, starting from slot $n_{s,f}^{\mu}$, and does not monitor the DCI format in search space set s for the next $k_s-T_s$ consecutive slots.

A UE can determine the number of PDCCH monitoring occasions for transmitting a DCI format to trigger UE adaptation per a PDCCH monitoring periodicity, N_MOs, according to the configured duration, $T_s$, and PDCCH monitoring pattern within a slot of associated search space set s, such that N_MOs=$T_s$*N^MOs_slot, where N^MOs_slot is the number of PDCCH monitoring occasions indicated by the configured PDCCH monitoring pattern within a slot, or the number of start OFDM symbol within a slot associated with search space set s. The UE can expect only same content of a DCI format for triggering UE adaptation can be transmitted within a PDCCH periodicity. Regarding the number of repetitions, the number of repetitions of the DCI format can be transparent to the UE. In this case, the UE can skip PDCCH monitoring for the DCI format in the remaining monitoring occasions within a periodicity if the UE detects the DCI format from one of the N_MOs monitoring occasions. Alternatively, the UE can assume that the DCI format for triggering UE adaptation is repeated over the N_MOs monitoring occasions within a periodicity.

Figure 26:
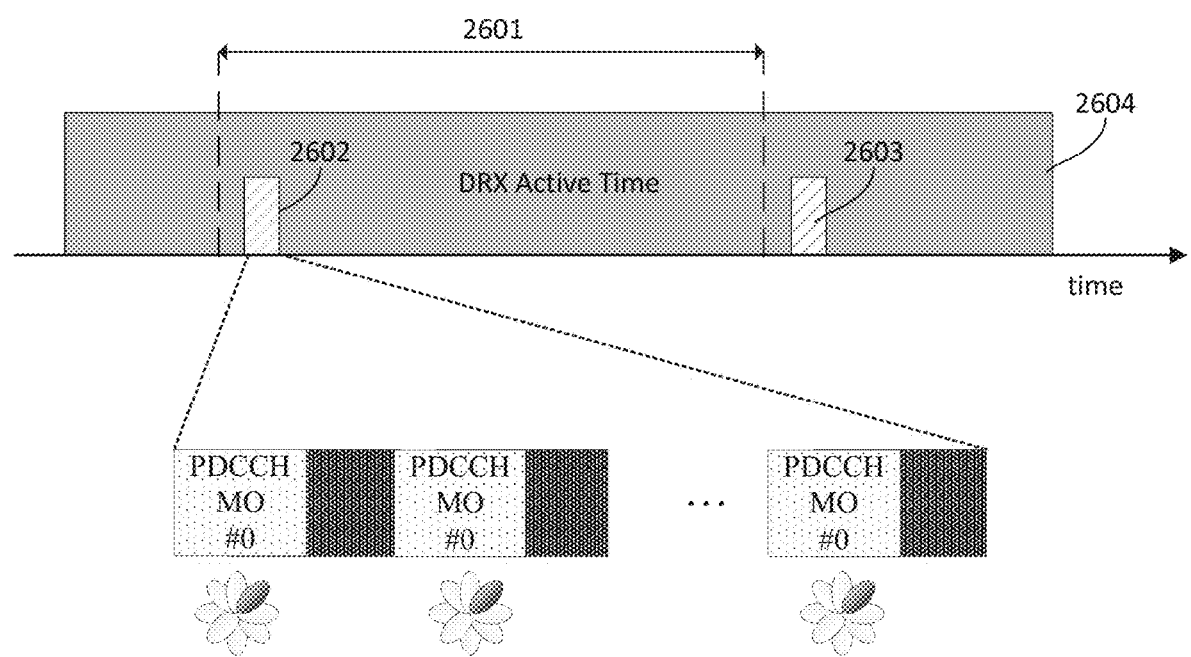
FIG. 26 illustrates repetitions on a DCI format for triggering UE adaptation within DRX Active Time in accordance with various embodiments of this disclosure.

FIG. 26 illustrates repetitions on a DCI format for triggering UE adaptation within DRX Active Time in accordance with various embodiments of this disclosure. A UE, such as UE 116 in FIG. 3, can be configured with a search space set s for transmitting DCI format to trigger UE adaptation without association with DRX operation.

The UE can be configured with N_MOs>=1 PDCCH monitoring occasions 2602 and 2603 within a PDCCH monitoring periodicity 2601. The UE can assume that the DCI format for triggering UE adaptation is repeated over the N_MOs>=1 PDCCH monitoring occasions. The QCL assumptions for the N_MOs>1 PDCCH monitoring occasions is indicated by the activated TCI state of the respective CORESET.

For a PDCCH monitoring occasion for transmitting the DCI format to trigger UE adaptation associated with next one or more PDCCH monitoring periodicity/occasion(s), a UE can skip monitoring the PDCCH occasion when the UE detects a DCI format in a previous PDCCH monitoring occasion that triggers the UE to skip PDCCH monitoring for at least one of the associated PDCCH monitoring periodicity/occasion(s).

Figure 27:
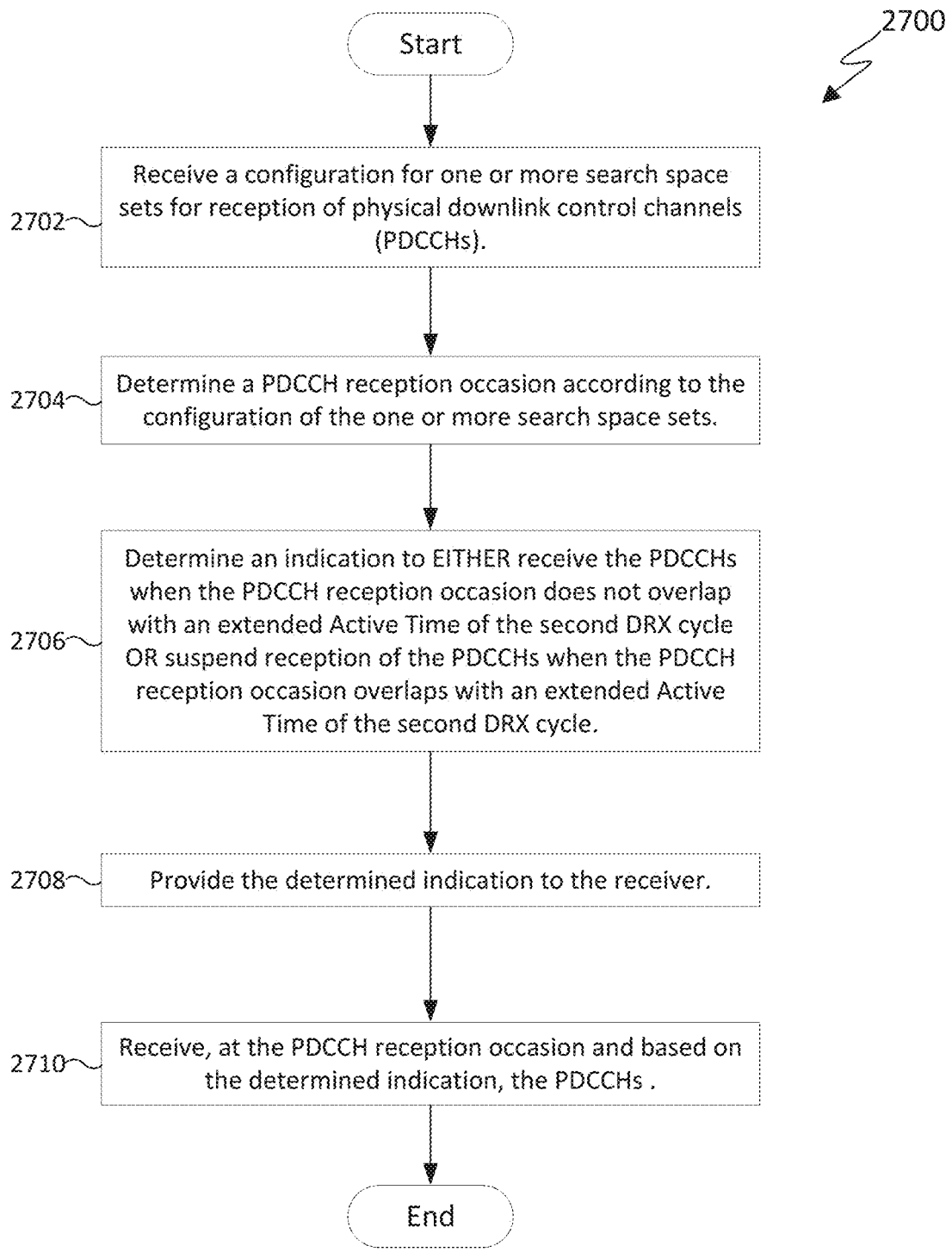
FIG. 27 illustrates a flowchart for receiving PDCCHs in accordance with various embodiments of this disclosure.

FIG. 27 illustrates a flowchart for for receiving PDCCHs in accordance with various embodiments of this disclosure. Operations of flowchart 2700 can be implemented in a UE, such as UE 116 in FIG. 3.

Flowchart 2700 begins at operation 2702 by receiving a configuration for one or more search space sets for reception of physical downlink control channels (PDCCHs).

In operation 2704, a PDCCH reception occasion is determined according to the configuration of the one or more search space sets. In one embodiment, the PDCCH reception occasion is prior to an ON duration of a discontinuous reception (DRX) cycle that is after a second DRX cycle.

In operation 2706, an indication is determined to either receive the PDCCHs when the PDCCH reception occasion does not overlap with an extended Active Time of the second DRX cycle or to suspend reception of the PDCCHs when the PDCCH reception occasion overlaps with an extended Active Time of the second DRX cycle. In operation 2708, the determined indication is provided to the receiver, and in operation 2710 PDCCHs are received at the PDCCH reception occasion based on the determined indication.

In some embodiments, flowchart 2700 can include determining to start a drx-onDurationTimer for the ON duration of the DRX cycle when (i) the PDCCH reception occasion overlaps with the extended Active Time of the second DRX cycle, and (ii) the PDCCH reception occasion is a last PDCCH reception occasion prior to the ON duration of the DRX cycle.

In some embodiments, the one or more search space sets include only a downlink control information (DCI) format with cyclic redundancy check (CRC) bits that are scrambled by a power saving radio network temporary identifier (PS-RNTI).

In some embodiments, flowchart 2700 can include the additional operations of receiving a configuration for a long DRX cycle and a short DRX cycle, and determining that the DRX cycle is the long DRX cycle.

In some embodiments, flowchart 2700 can include the additional operations of receiving more than one value for a drx-onDurationTimer parameter corresponding to more than one ON durations; determining the second DRX cycle is associated with the more than one ON durations; and determining the extended Active Time of the second DRX cycle is extended Active Time from an ON duration from the more than one ON durations of the second DRX cycle. The ON duration can be predetermined.

In some embodiments, flowchart 2700 can include the additional operations of receiving more than one value of a drx-onDurationTimer parameter corresponding to more than one ON durations; determining the second DRX cycle is associated with more than one ON durations; and determining the extended Active Time of the second DRX cycle is extended Active Time from the maximum of the more than one ON durations of the second DRX cycle.

Although this disclosure has been described with an exemplary embodiment, various changes and modifications may be suggested to one skilled in the art. For example, this disclosure includes several embodiments that can be used in conjunction or in combination with one another, or individually.

It is intended that this disclosure encompass such changes and modifications as fall within the scope of the appended claims.

What is claimed is:

1. A user equipment (UE) comprising:
a receiver configured to receive a configuration for one or more search space sets for reception of physical downlink control channels (PDCCHs); and
a processor operably connected to the receiver, the processor configured to:
determine a PDCCH reception occasion according to the configuration of the one or more search space sets, wherein the PDCCH reception occasion is prior to an ON duration of a discontinuous reception (DRX) cycle that is after a second DRX cycle, and
determine an indication to either receive the PDCCHs when the PDCCH reception occasion does not overlap with an extended Active Time of the second DRX cycle, or to suspend reception of the PDCCHs when the PDCCH reception occasion overlaps with the extended Active Time of the second DRX cycle; and
provide the determined indication to the receiver,
wherein the receiver is further configured to receive the PDCCHs at the PDCCH reception occasion according to the determined indication.

2. The UE of claim 1, wherein the processor is further configured to start a drx-onDurationTimer for the ON duration of the DRX cycle when (i) the PDCCH reception occasion overlaps with the extended Active Time of the second DRX cycle, and (ii) the PDCCH reception occasion is a last PDCCH reception occasion prior to the ON duration of the DRX cycle.

3. The UE of claim 1, wherein the one or more search space sets include only a downlink control information (DCI) format with cyclic redundancy check (CRC) bits that are scrambled by a power saving radio network temporary identifier (PS-RNTI).

4. The UE of claim 1, wherein:
the receiver is further configured to receive a configuration for a long DRX cycle and a short DRX cycle, and
the processor is further configured to determine that the DRX cycle is the long DRX cycle.

5. The UE of claim 1, wherein:
the receiver is further configured to receive more than one values for a drx-onDurationTimer parameter corresponding to more than one ON durations, and
the processor is further configured to:
determine the second DRX cycle is associated with the more than one ON durations; and
determine the extended Active Time of the second DRX cycle is extended Active Time from an ON duration from the more than one ON durations of the second DRX cycle, wherein the ON duration is predetermined.

6. The UE of claim 5, wherein the predetermined ON duration is an ON duration on a primary cell.

7. The UE of claim 1, wherein:
the receiver is further configured to receive more than one values for a drx-onDurationTimer parameter corresponding to more than one ON durations, and
the processor is further configured to:
determine the second DRX cycle is associated with the more than one ON durations; and
determine the extended Active Time of the second DRX cycle to be the maximum of the more than one ON durations of the second DRX cycle.

8. A base station (BS) comprising:
a transmitter configured to transmit a configuration for one or more search space sets for transmission of physical downlink control channels (PDCCHs); and
a processor operably connected to the transmitter, the processor configured to:
determine a PDCCH transmission occasion according to the configuration of the one or more search space sets, wherein the PDCCH transmission occasion is prior to an ON duration of a discontinuous reception (DRX) cycle that is after a second DRX cycle, and
determine an indication to either transmit the PDCCHs when the PDCCH transmission occasion does not overlap with an extended Active Time of the second DRX cycle, or to suspend transmission of the PDCCHs when the PDCCH transmission occasion overlaps with the extended Active Time of the second DRX cycle; and
provide the determined indication to the transmitter,
wherein the transmitter is further configured to transmit the PDCCHs at the PDCCH transmission occasion according to the determined indication.

9. The BS of claim 8, wherein the processor is further configured to determine a drx-onDurationTimer for the ON duration of the DRX cycle when (i) the PDCCH transmission occasion overlaps with the extended Active Time of the second DRX cycle, and (ii) the PDCCH transmission occasion is a last PDCCH transmission occasion prior to the ON duration of the DRX cycle.

10. The BS of claim 8, wherein the one or more search space sets include only a downlink control information (DCI) format with cyclic redundancy check (CRC) bits that are scrambled by a power saving radio network temporary identifier (PS-RNTI).

11. The BS of claim 8, wherein:
the transmitter is further configured to transmit a configuration for a long DRX cycle and a short DRX cycle, wherein a recipient of the configuration for the long DRX cycle or the short DRX cycle is configured to determine that the DRX cycle is the long DRX cycle; and the processor is further configured to generate the configuration for the long DRX cycle or the short DRX cycle.

12. The BS of claim 8, wherein:

the transmitter is further configured to transmit more than one values for a drx-onDurationTimer parameter corresponding to more than one ON durations, wherein the drx-onDurationTimer parameter is usable by a recipient to determine (i) the second DRX cycle is associated with the more than one ON durations, and (ii) the extended Active Time of the second DRX cycle is extended Active Time from an ON duration from the more than one ON durations of the second DRX cycle, wherein the ON duration is predetermined; and the processor is further configured to generate the more than one values for the drx-onDurationTimer parameter corresponding to the more than one ON durations.

13. The BS of claim 12, wherein the predetermined ON duration is an ON duration on a primary cell.

14. The BS of claim 8, wherein:

the transmitter is further configured to transmit more than one values of a drx-onDurationTimer parameter corresponding to more than one ON durations, wherein the drx-onDurationTimer parameter is usable by a recipient to determine (i) the second DRX cycle is associated with the more than one ON durations, and (ii) the extended Active Time of the second DRX cycle to be the maximum of the more than one ON durations of the second DRX cycle, and the processor is further configured to generate the more than one values of the drx-onDurationTimer parameter corresponding to the more than one ON durations.

15. A method for receiving physical downlink control channels (PDCCHs), the method comprising:

receiving a configuration for one or more search space sets for reception of the PDCCHs;

determining a PDCCH reception occasion according to the configuration of the one or more search space sets, wherein the PDCCH reception occasion is prior to an ON duration of a discontinuous reception (DRX) cycle that is after a second DRX cycle, determining an indication to either receive the PDCCHs when the PDCCH reception occasion does not overlap with an extended Active Time of the second DRX cycle, or to suspend reception of the PDCCHs when the PDCCH reception occasion overlaps with the extended Active Time of the second DRX cycle; and providing the determined indication to the receiver; and receiving the PDCCHs at the PDCCH reception occasion according to the determined indication.

16. The method of claim 15, further comprising:

determining to start a drx-onDurationTimer for the ON duration of the DRX cycle when (i) the PDCCH reception occasion overlaps with the extended Active Time of the second DRX cycle, and (ii) the PDCCH reception occasion is a last PDCCH reception occasion prior to the ON duration of the DRX cycle.

17. The method of claim 15, wherein the one or more search space sets include only a downlink control information (DCI) format with cyclic redundancy check (CRC) bits that are scrambled by a power saving radio network temporary identifier (PS-RNTI).

18. The method of claim 15, further comprising:

receiving a configuration for a long DRX cycle and a short DRX cycle; and determining that the DRX cycle is the long DRX cycle.

19. The method of claim 15, further comprising:

receiving more than one values for a drx-onDurationTimer parameter corresponding to more than one ON durations;

determining the second DRX cycle is associated with the more than one ON durations; and determining the extended Active Time of the second DRX cycle is extended Active Time from an ON duration from the more than one ON durations of the second DRX cycle, wherein the ON duration is predetermined.

20. The method of claim 15, further comprising:

receiving more than one values of a drx-onDurationTimer parameter corresponding to more than one ON durations;

determining the second DRX cycle is associated with the more than one ON durations; and determining the extended Active Time of the second DRX cycle to be the maximum of the more than one ON durations of the second DRX cycle.

* * * * *